US008646717B2

(12) United States Patent
Choi et al.

(10) Patent No.: US 8,646,717 B2
(45) Date of Patent: Feb. 11, 2014

(54) SEAT BELT RETRACTOR

(75) Inventors: In-Su Choi, Gyeonggi-do (KR);
Jung-Min Lee, Seoul (KR); Byung-Jin Lee, Daegu (KR); Dong-Sub Lee, Gangwon-do (KR); Sang-Hong Bai, Gangwon-do (KR); Gi-Young Bae, Gangwon-do (KR); Jong-Kag Kim, Gangwon-do (KR); Do-Shik Kim, Seoul (KR)

(73) Assignee: Autoliv Development AB, Vårgårda (SE)

( * ) Notice: Subject to any disclaimer, the term of this patent is extended or adjusted under 35 U.S.C. 154(b) by 519 days.

(21) Appl. No.: 12/152,640

(22) Filed: May 15, 2008

(65) Prior Publication Data

US 2009/0057466 A1 Mar. 5, 2009

(30) Foreign Application Priority Data

May 18, 2007 (KR) .................. 10-2007-0048823

(51) Int. Cl.
*B65H 75/48* (2006.01)

(52) U.S. Cl.
USPC ............... 242/379.1; 242/382; 192/54.52; 192/71

(58) Field of Classification Search
USPC ............ 242/374, 383.1, 383.2, 383.5, 384, 242/384.5, 384.6; 280/805, 806, 807; 297/472, 475–478; 475/302, 149, 150, 475/343, 331; 192/54.52, 71, 76
See application file for complete search history.

(56) References Cited

U.S. PATENT DOCUMENTS

| | | | |
|---|---|---|---|
| 4,244,600 A | 1/1981 | Takada | |
| 4,278,216 A | 7/1981 | Takada | |
| 4,392,620 A | 7/1983 | Takada | |
| 4,401,282 A | 8/1983 | Miki | |
| 4,726,540 A | 2/1988 | Ches et al. | |
| 4,750,685 A * | 6/1988 | Frei | 242/374 |
| 5,071,194 A | 12/1991 | Fohl | |

(Continued)

FOREIGN PATENT DOCUMENTS

| | | |
|---|---|---|
| JP | 11-222100 | 8/1999 |
| JP | 2000-302008 | 10/2000 |

(Continued)

*Primary Examiner* — Sang Kim
*Assistant Examiner* — Juan Campos, Jr.
(74) *Attorney, Agent, or Firm* — Brinks Gilson & Lione

(57) ABSTRACT

Provided is a seat belt retractor capable of having its assembly readily performed to increase assembly efficiency, simplifying shapes of components to readily manufacture the retractor and reduce manufacturing cost, and preventing a webbing from being hooked when the webbing is rewound. The seat belt retractor includes a housing constituting a main body of the seat belt retractor, a guide drum rotatably installed in the housing, a connector inserted into one side of the guide drum, a base member surrounding the connector, a gear member inserted into the base member, a cylinder for operating the gear member, a torsion bar inserted into the guide drum, a locking member fixedly inserted between the torsion bar and the guide drum, a locking clutch installed at one surface of the locking member, a mechanism cover installed at one surface of the locking clutch, and a friction spring installed in the mechanism cover to stop operation of a lock arm fixed to the locking clutch.
Therefore, an operator can assemble the base member and the gear member while viewing them. In addition, the clutch rollers rotate while moving outwardly along the slant surfaces of the slant gear to rotate the connector and rewind the webbing. Thus, shock applied to a passenger is lessened.

73 Claims, 35 Drawing Sheets

(56) References Cited

U.S. PATENT DOCUMENTS

| | | | |
|---|---|---|---|
| 5,375,787 A * | 12/1994 | Fujimura et al. | 242/384.5 |
| 5,443,224 A | 8/1995 | Patterson et al. | |
| 5,495,994 A | 3/1996 | Rumpf et al. | |
| 5,568,941 A | 10/1996 | Woydick et al. | |
| 5,617,937 A * | 4/1997 | Zettner et al. | 192/45 |
| 5,687,926 A * | 11/1997 | Park et al. | 242/383.4 |
| 5,794,876 A | 8/1998 | Morizane et al. | |
| 5,826,813 A * | 10/1998 | Hibata | 242/383.1 |
| 5,984,223 A * | 11/1999 | Hiramatsu | 242/379.1 |
| 6,283,398 B1 | 9/2001 | Specht | |
| 6,299,093 B1 | 10/2001 | Harte et al. | |
| 6,318,662 B1 | 11/2001 | Hori et al. | |
| 6,354,528 B1 * | 3/2002 | Nagata et al. | 242/374 |
| 6,641,077 B2 | 11/2003 | Hanna et al. | |
| 6,698,677 B1 * | 3/2004 | Happ et al. | 242/374 |
| 7,290,730 B2 * | 11/2007 | Nagata et al. | 242/374 |
| 7,401,815 B2 | 7/2008 | Clute et al. | |
| 2001/0004094 A1 * | 6/2001 | Hanna et al. | 242/382.2 |
| 2005/0211816 A1 * | 9/2005 | Takamatsu et al. | 242/374 |

FOREIGN PATENT DOCUMENTS

| | | | |
|---|---|---|---|
| JP | 2000-309249 | 11/2000 | |
| JP | 2003212086 A * | 7/2003 | B60R 22/40 |
| JP | 2003-341473 | 12/2003 | |
| JP | 2006-213112 | 8/2006 | |

* cited by examiner

SEAT BELT RETRACTOR

CROSS-REFERENCE TO RELATED APPLICATION

This application claims the benefit of Korean Patent Application No. 2007-0048823, filed May 18, 2007, the disclosure of which is hereby incorporated herein by reference in its entirety.

BACKGROUND OF THE INVENTION

1. Field of the Invention

The present invention relates to a seat belt retractor, and more particularly, to a seat belt retractor capable of adhering a driver and a passenger to their seats by backwardly rotating a seat belt operating on vehicle collision.

2. Description of the Prior Art

A seat belt or an airbag is installed in a vehicle to safely protect a driver and a passenger from traffic accidents.

Such a seat belt is a basic safety device installed to operate upon vehicle accidents such as front collision, side collision, roll, and so on, to thereby maximally protect a driver and a passenger.

A widely used seat belt is a three-point safety belt constituted of a waist belt for protecting the waist of the passenger (hereinafter, including "driver"), and a shoulder belt for protecting the shoulder and the breast. A guide pulley is coupled with the shoulder belt, a retractor is installed at a center pillar of a vehicle to release or wind the belt, and the waist belt is fastened to a locker panel.

In addition, a tongue is inserted in a mid-portion of the belt, and the tongue can be locked to or released from a buckle fixed to a floor of the vehicle.

Further, the retractor for winding or releasing the seat belt is classified into a non-locking retractor (NLR), an emergency locking retractor (ELR), and a web locking retractor (WLR).

The non-locking retractor is locked after adjusting lengths of the shoulder belt and the waist belt. On the other hand, in the emergency locking retractor, the belt is freely retracted and rewound during stoppage or movement of the vehicle, and the belt is locked only when a vehicle collision causing abrupt deceleration occurs or when the belt is rapidly extracted.

In addition, in the web locking retractor, a clamp directly grips the belt upon vehicle collision to stop extraction of the belt, thereby preventing serious injury to the passenger due to abrupt forward movement of the passenger.

Meanwhile, Japanese Patent Laid-open Publication No. H8072671 discloses a "Seat Belt Retractor with Pretensioner attached thereto," which will be described in brief.

The seat belt retractor having a pretensioner attached thereto includes a pretensioner for moving a rack, which can transmit a rotation torque to a winding shaft of the retractor, to rotate the winding shaft through a gas pressure upon collision of a vehicle in a direction of removing extraction of the seat belt using a pinion gear.

The pretensioner includes rotary drive members which are not connected to the winding shaft when the pretensioner is not operated and connected to the winding shaft when the pretensioner is operated to transit a rotation torque to the winding shaft a pinion gear for dependently rotating the rotary drive members using rotation of the pinion gear normally meshed with the rack, and a driven gear mechanism installed between the rotary drive members.

In addition, Japanese Patent Laid-open Publication No. H8-133015 discloses a "Seat Belt Retractor with Pretensioner attached thereto," which will be described in brief.

The seat belt retractor includes a pretensioner for driving a rotary drive member, which can transmit a rotation torque to a winding shaft, to rotate the winding shaft in a direction of removing extraction of a seat belt using rotation thereof upon collision of a vehicle.

The pretensioner includes a cam surface in which a sleeve installed at the winding shaft and the rotary drive member relatively rotatably supported around a shaft center define a wedgewise space between the rotary drive shaft and the outer periphery of the sleeve, a drive force transmission member installed in the wedgewise space and movable in a sleeve coupling direction, and a support means for restricting movement of the drive force transmission member in the sleeve coupling direction.

The support means is engaged with a retractor body by interposing a breakable connection means in which a breakable part is formed at a portion thereof except a sliding surface when the rotary drive member is rotated, the rotary drive member is rotated to a certain angle upon collision of a vehicle to engage the drive force transmission member with the sleeve and the cam surface, and then, the breakable part of the support means is broken to release engagement of the support means with the retractor body.

Meanwhile, Japanese Patent Laid-open Publication No. H11-222100 discloses a "Seat Belt Retractor," which will be described in brief.

The seat belt retractor, which includes a winding drum for winding a webbing and a spindle shaft having one end functioning as a torsion bar coupled to the winding drum in a relatively non-rotatable manner, to absorb energy using distortion of the spindle shaft upon emergency of a vehicle, is characterized in that the seat belt retractor includes a fastening mechanism for allowing distortion of the spindle shaft until a rotation amount of the distortion of one end of the spindle shaft adjacent to the other end reaches a predetermined value upon emergency of the vehicle, and fastened to prevent relative rotation between the other end proximity part of the spindle shaft and the winding drum when a rotation amount of the distortion reaches the predetermined value.

In addition, Japanese Patent Laid-open Publication No. 2000-289571 discloses a "Webbing Winding Device," which will be described in brief.

The webbing winding device includes a frame supported at a vehicle body, a winding shaft rotatably supported by the frame and winding a webbing for restricting a passenger using a bias force in a layered manner, and a lock means for preventing rotation of the winding shaft in a webbing extraction direction upon abrupt deceleration of a vehicle.

The lock means includes a first lock part concentrically disposed with respect to the winding shaft to be rotated along the winding shaft and preventing rotation of the winding shaft in the webbing extraction direction upon abrupt deceleration of the vehicle, and a plastic second lock part concentrically disposed with respect to the winding shaft to be integrally rotated with the winding shaft and causing relative rotation between the second lock part and the first lock part when the rotation in the webbing extraction direction of the first lock part is prevented.

In addition, the lock means further includes a third lock part formed of a single body having a high strength lock gear movably supported by the second lock part in a radial direction and moving outward in the radial direction when a relative rotation between the first lock part and the second lock part occurs, and a fourth lock part having a high strength lock gear installed at the frame and meshed with the lock gear of the third lock part when the third lock part moves outward in the radial direction.

The lock means further includes a guide part using repulsion generated when the lock gear of the third lock part is engaged with the lock gear of the fourth lock part to move a predetermined part of the second lock part in a direction opposite to the engagement position and plastically deform the predetermined part to be directly engaged with the fourth lock part.

Further, Japanese Patent Laid-open Publication No. 2000-289572 discloses a "Webbing Winding Device," which will be described in brief.

The webbing winding device includes a winding shaft winding a webbing for restricting a passenger using a bias force in a layered manner, a cylindrical base member constituting a portion of a lock means mounted in a recess formed in a shaft center end of the winding shaft and locking rotation in a webbing extraction direction of the winding shaft upon abrupt deceleration of a vehicle, and an anti-slip-off member press-fitted between an outer periphery of the base member and an inner periphery of the winding shaft in both radial directions of the base member in a state that the base member is mounted in the recess of the winding shaft.

Furthermore, Japanese Patent Laid-open Publication No. 2000-302012 discloses a "Webbing Winding Device," which will be described in brief.

The webbing winding device includes a winding shaft to which a base end of a long strip-shaped webbing belt for restricting a passenger's body is fixed and biased in a direction winding the webbing belt, a pretensioner for rotating the winding shaft in the winding direction under a predetermined condition, a bearing means disposed on a shaft having an inner diameter larger than an outer diameter of the winding shaft having an inner periphery into which the winding shaft is inserted, and a projection projecting from one of the inner periphery of the bearing means and the outer periphery of the winding shaft toward the other and contacting the other at a very small area in comparison with the area of the other opposite to the one.

In addition, Japanese Patent Laid-open Publication No. 2000-302013 discloses a "Pretensioner," which will be described in brief.

The pretensioner is integrally formed with a webbing winding device for winding a webbing for restricting a passenger on a winding shaft in a layered manner to rapidly rotate the winding shaft in a webbing winding direction to a predetermined extent using a rack/pinion type drive mechanism upon rapid deceleration of a vehicle. The drive mechanism includes a piston movably disposed in a cylinder in an axial direction and having a rack bar to be moved upon rapid deceleration of the vehicle, and a pinion disposed to be meshed with a rack gear of the piston and directly connected to a shaft end of the winding shaft through the medium of a clutch connected to the winding shaft upon rapid deceleration of the vehicle.

Meanwhile, Japanese Patent Laid-open Publication No. 2000-302008 discloses a "Webbing Winding Apparatus," which will be described in brief.

The webbing winding apparatus includes a frame having a pair of rectangular plates opposite to each other, and a winding shaft, to which one end of an elongated strip shape of webbing belt is fixed to restrain a passenger, for biasing the webbing belt in a winding direction, and supported at both sides of a portion of the fastened webbing belt by the pair of rectangular plates in an axial direction.

In addition, the webbing winding apparatus has a fixing part fixed to a vehicle body and connecting the respective lateral ends of the pair of rectangular plates. In addition, a connection part having a plurality of hexagonal parts is installed at the frame. The plurality of hexagonal parts have empty parts or thin parts, respectively, such that the plurality of hexagonal parts are continuously or intermittently arranged in a tension direction applied between the winding shaft and the pair of rectangular plates when the webbing belt is extracted, and simultaneously aligned parallel to each other depending on the tension direction.

Although the webbing winding apparatus has advantages in that uniform tension is applied to the frame connection part in the tension direction when the webbing belt is extracted and elastic deformation of the connection part is uniformized, since the flame is deformed due to the tension applied to the frame, the webbing winding apparatus cannot be normally operated.

In addition, Japanese Patent Laid-open Publication No. 2000-309249 discloses a "Safety Belt Retractor," which will be briefly described below.

The safety belt retractor includes a spool rotatably biased in one direction to wind a webbing, a ratchet wheel rotated with the spool, and an emergency lock mechanism meshed with the ratchet wheel in response to emergency detection by an inertia detection means and having a pawl for locking the spool using the corresponding ratchet wheel.

In addition, a torsion bar is installed between the spool and the ratchet wheel. One end of the torsion bar is coupled to the spool, and the other end of the torsion bar is coupled to the ratchet wheel. Therefore, the torsion bar is twisted when the webbing extraction force is applied during operation of the emergency lock mechanism, thereby absorbing impact.

Further, the torsion bar has a polygonal coupling part coupled to the ratchet wheel, and the ratchet wheel has a polygonal fastening hole to which the polygonal coupling part is fastened. A rib-shaped projection is formed at an inner surface of the polygonal fastening hole in an axial direction of the torsion bar to thereby bias the torsion into the fastening hole in a direction that the torsion bar is rotated during extraction of the webbing, in order to press fit the surfaces of the torsion bar and the ratchet wheel to each other in the direction that the torsion bar is rotated.

Although the seat belt retractor has an advantage in that there is no assembly error since the torsion bar and the ratchet wheel are assembled at a predetermined angle, because both ends of the torsion bar have a polygonal shape it is difficult to manufacture the torsion bar, and thus manufacturing cost may increase.

In addition, Japanese Patent Laid-open Publication No. 2003-146183 discloses a "Webbing Winding Device," which will be described in brief.

The webbing winding device includes a spool for winding a webbing for restricting a passenger using a bias force in a layered manner, an energy absorption member concentrically connected to the spool to be rotated together with the spool and allowing a predetermined amount of rotation of the spool deformed depending on application of a load more than a predetermined value in a webbing extraction direction through the medium of the spool in a state that the rotation in the webbing extraction direction is restricted, a lock means partially and concentrically inserted between the energy absorption member and the spool and stopping rotation of the energy absorption member in the webbing extraction direction upon abrupt deceleration of a vehicle, and an anti-slip-off-member inserted between a portion of an outer periphery of the lock means and an inner periphery of the spool in a direction perpendicular to the shaft and assembled therebetween, and applying both a compression load in a thrust direction and a compression load in a radial direction between a portion of the lock means and the spool.

In addition, Japanese Patent Laid-open Publication No. 2003-212085 discloses a "Seat Belt Retractor," which will be described in brief.

The seat belt retractor includes a "C" shaped housing body having a pair of opposite side plates having through-holes, respectively, a shaft body rotatably connected to a winding drum, on which a webbing is wound, and passing through the through-holes to be rotatably supported by the side plates and rotatably biased in a webbing extraction direction, an emergency lock mechanism for stopping rotation of the shaft body in the webbing extraction direction, and first and second lock start mechanisms for operating the emergency lock mechanism.

The emergency lock mechanism includes a lock gear formed at an inner periphery of one of the through-hole of the housing body, a lock base mounted inside the lock gear to be rotated with the lock gear, and a pawl located at the lock base and meshed with the lock gear projecting from an outer periphery of the lock base.

The emergency lock mechanism includes a lock clutch relatively rotatably mounted on the shaft body adjacent to the outer periphery of the lock base, mounted to be synchronously rotated with the lock base in a state of being biased in the webbing extraction direction, having a ratchet wheel part having a ratchet at its outer periphery, slidably guiding a link pin projecting from the pawl through relative rotation with respect to the lock base, and having a projection guide groove projecting from the pawl.

In addition, the first lock start mechanism includes an inertia mass body swung in response to abrupt variation in acceleration of a vehicle, and a sensor lever engaged with the latchet of the latchet wheel to stop rotation of the lock clutch body depending on swing of the inertia mass body.

Further, the second lock start mechanism includes a cover body covering portions of the first and second lock start mechanisms, disposed inside a ratchet wheel, and having a coupling inner periphery wall having inner periphery teeth projecting therefrom, and a lock arm rotatably supported by one side of the lock clutch body with respect to the cover body and stopping rotation of the lock clutch coupled to an internal gear of the inner periphery due to rotation delay in a direction opposite to the bias direction caused by abrupt rotation of the lock clutch body biased in a direction opposite to the separation of the internal gear from the inner periphery.

Meanwhile, Japanese Patent Laid-open Publication No. 2003-212086 discloses a "Safety Belt Retractor," which will be described in brief.

Such a safety belt retractor includes an emergency lock start device for starting a lock mechanism reacting to rapid variation in acceleration of a vehicle and stopping extraction of a webbing. The emergency lock start device includes a box-shaped holder having a concave part formed at its bottom surface, an inertia mass disposed in the concave part of the holder and swinging in response to acceleration larger than a predetermined value, and a sensor lever for rotatably supporting a shaft part installed at one end thereof in the holder and operating the lock mechanism rotated around an axial center of the shaft part depending on swing of the inertial mass. A guide groove is formed at an outer periphery of the shaft part of the sensor lever, and a rotation restriction projection projects from the outer periphery to be inserted into the guide groove of the holder and restricts a rotation range of the sensor lever.

Further, Japanese Patent Laid-open Publication No. 2003-335217 discloses a "Safety Belt Retractor," which will be described in brief.

The safety belt retractor includes a housing having a pair of side plates, a winding shaft rotatably supported between the side plates of the housing and rotatably biased in a webbing winding direction, and a pretensioner mechanism attached to one side plate of the housing to rotate the winding shaft in the webbing winding direction and wind the webbing upon rapid deceleration of a vehicle.

The pretensioner mechanism includes a gas generator for generating a gas, a cylinder having one end on which the gas generator is mounted and the other end installed at an outer surface of the one side plate of the housing at its one side, and a pinion gear interlocked with the winding shaft to be rotatably supported by the winding shaft.

In addition, a piston is installed at a base end to be movably accommodated in the cylinder to be driven by a gas pressure, and a rack is formed at a front end of the piston to be meshed with the pinion gear. The rack is meshed with the pinion gear depending on the compression driving of the piston to rotate the winding shaft in the winding direction.

Further, the retractor includes a cover body for forming a movement guide path of the rack disposed on an extension line of the other end of the cylinder and projecting from the other end of the cylinder, a first adhesion part installed at the one side plate of the housing to cover an opening at the other side of the cylinder part in a manner adhered to the piston, and a second adhesion part installed at the cover body to cover the opening of the other side of the cylinder in a manner adhered to the piston.

In addition, Japanese Patent Laid-open Publication No. 2003-341473 discloses a "Seat Belt Retractor," which will be briefly described below.

The seat belt retractor includes a winding drum on which a webbing is wound, a torsion bar inserted into the winding drum and coupled to one end of the winding drun at its one end in a non-relative rotation manner and simultaneously biased in a webbing winding direction, and an emergency lock mechanism operated in an emergency and stopping rotation of the other end of the torsion bar in the webbing extraction direction.

In addition, the seat belt retractor includes a winding part adjacent to the other end of the winding drum, a plate coupled to the other end of the torsion bar in a non-relative rotation manner, and a wire coupled to the plate at its one end and disposed along a curved path installed at the middle part of the other end surface of the winding drum.

Further, in a vehicle emergency, when an extraction force more than a predetermined value is applied to the webbing after operation of the emergency lock mechanism, the torsion bar absorbs distortion and impact energy due to extraction resistance of the wire from the curved path by relative rotation between the plate and the winding drum.

The wire is extracted from the curved path by the relative rotation between the plate and the winding drum, and an outer diameter of the winding part of the plate, on which the wire is wound, is twisted to reduce extraction resistance of the wire being gradually varied from a start time.

Although the seat belt retractor has an advantage in that the wire absorbs distortion of the torsion bar, since a curved path should be formed at the winding drum, the manufacturing process is difficult and therefore manufacturing cost of the retractor is also increased.

In addition, Japanese Patent Laid-open Publication No. 2004-1777 discloses a "retensioner," which will be described in brief.

The pretensioner is integrally formed with a webbing winding device for winding a webbing for restricting a passenger on a winding shaft in a layered manner to rapidly rotate the winding shaft in a webbing winding direction to a predetermined extent using a rack/pinion type drive mechanism upon rapid deceleration of a vehicle.

The drive mechanism includes a piston movably disposed in a cylinder in an axial direction and having a rack bar to be moved upon rapid deceleration of the vehicle, and a pinion disposed to be meshed with a rack gear of the piston and directly connected to a shaft end of the winding shaft through the medium of a clutch connected to the winding shaft upon rapid deceleration of the vehicle.

The pinion includes a gear part having a pinion gear meshed with the rack gear, and a clutch part integrally formed with the gear part in a concentric manner and having the clutch formed at an inner periphery thereof.

Further, Japanese Patent Laid-open Publication No. 2004-175279 discloses a "Pretensioner Device," which will be described in brief.

The pretensioner device includes a piston movable by operation of a gas generation means upon abrupt deceleration of a vehicle, and a winding shaft, on which a webbing for restricting a passenger is wound in a layered manner, rapidly rotated in a webbing extraction direction to an extent corresponding to a moving stroke of the piston.

A clutch mechanism of the pretension includes a cylindrical sleeve inserted into one axial end of the winding shaft in a relatively non-rotatable manner and having a knurled surface formed at its periphery, a plate-shaped base part concentrically installed on the sleeve, a clutch member including a plurality of lift parts relatively rotatably installed at the sleeve and having a coupling surface opposite to the knurled surface in a normal state to be coupled to the knurled surface, and a clutch operation member disposed to be clutched to the clutch member to operate the gas generation means upon abrupt deceleration of a vehicle, moving the piston to rotate the winding shaft in a webbing winding direction, and deforming the lift part in a direction in which the coupling surface is coupled to the knurled surface.

In addition, an arm part is installed to be supported on both sides of the base part and support the lift part by forming a cutout part, a slit part or an aperture at the base part, and moves the lift part in a coupling direction of the sleeve within a formation range of the cutout part, the slit part or the aperture.

In addition, Japanese Patent Laid-open Publication No. 2006-213112 discloses a "Pretensioner Device." The pretensioner device has a first protrusion protruding from the other side of a cam part in a peripheral direction thereof, and a meshing claw of a clutch plate has a second protrusion formed so that one circumferential cross-section of the cam part opposes the first protrusion.

As described above, the second protrusion formed at the clutch plate may be broken, and its assembly is very difficult and time-consuming.

In addition, assembly of the seat belt retractor requires much assembly time, thereby decreasing assembly efficiency. Further, complexity of the parts constituting the seat belt retractor makes it difficult to manufacture the seat belt retractor, thereby increasing manufacturing cost. Furthermore, when the webbing of the seat belt retractor is to be rewound, it may not successfully operate, and a passenger may misconceive that the seat belt could be out of order.

Further, in the conventional arts, the respective components have complicated shapes to increase the complexity of the manufacturing process thereof, and an increase in the number of assembly processes of the seat belt retractor results in a long assembly time. As a result, manufacturing cost of the seat belt retractor is also increased.

Furthermore, since each component constituting the seat belt retractor is heavy, the total weight of the seat belt retractor is increased.

SUMMARY OF THE INVENTION

An object of the present invention is to provide a seat belt retractor capable of simplifying a manufacturing process and reducing the weight of the seat belt retractor.

Another object of the present invention is to provide a seat belt retractor capable of being securely fixed to a vehicle body and readily assembling components thereof.

Still another object of the present invention is to provide a seat belt retractor capable of simplifying an assembly structure between components and reducing the total weight of the seat belt retractor with maintaining its strength.

Yet another object of the present invention is to provide a seat belt retractor capable of increasing durability by removing stress concentration and securely fixing a locking member without any shaking.

A further object of the present invention is to provide a seat belt retractor capable of simplifying an assembly structure between components to improve assembly performance of the product.

Still further object of the present invention is to provide a seat belt retractor capable of seating a clutch roller on a base member to securely perform function of a pretensioner.

Yet further object of the present invention is to provide a seat belt retractor capable of securely preventing separation of the clutch roller to surely perform function of the pretensioner.

Yet further object of the present invention is to provide a seat belt retractor capable of maintaining the clutch roller fixed to the base member in a stable state to readily assemble a gear member.

Yet further object of the present invention is to provide a seat belt retractor capable of rotating a gear member coupled to the base member to drive the clutch roller to be rotated and expanded outside the base member.

Yet further object of the present invention is to provide a seat belt retractor capable of increasing an upward force by applying a sufficient pressure onto a pressure receiving plate and the strength against a high pressure injection gas.

Yet further object of the present invention is to provide a seat belt retractor capable of returning a lock arm using elasticity of a leaf spring, and not installing a release spring, which is difficult to assemble.

Yet further object of the present invention is to provide a seat belt retractor capable of simplifying constitution of a locking base, a locking clutch, and a lock arm to facilitate assembly thereof.

Yet further object of the present invention is to provide a seat belt retractor capable of rapidly performing extraction and stopping of a webbing, and preventing separation of a pawl.

Yet further object of the present invention is to provide a seat belt retractor capable of coupling support members to both ends of a rotating torsion bar to smoothly rotate the torsion bar and prevent deformation of the torsion bar due to moment applied thereto.

Yet further object of the present invention is to provide a seat belt retractor capable of being closely fixed to one side of a locking member, and readily performing assembly and disassembly thereof.

Yet further object of the present invention is to provide a seat belt retractor capable of readily stopping operation of a lock arm.

Yet further object of the present invention is to provide a seat belt retractor capable of readily manufacturing a mechanism cover and conveniently separating the mechanism cover from a housing without damage or breakage.

Yet further object of the present invention is to provide a seat belt retractor capable of reducing an assembly time of a vehicle sensor.

An aspect of the invention provides a seat belt retractor including a housing constituting a main body of the seat belt retractor, a guide drum rotatably installed in the housing, a connector inserted into one side of the guide drum, a base member surrounding the connector, a gear member inserted into the base member, a cylinder for operating the gear member, a torsion bar inserted into the guide drum, a locking member fixedly inserted between the torsion bar and the guide drum, a locking clutch installed at one surface of the locking member, a mechanism cover installed at one surface of the locking clutch, and a friction spring installed in the mechanism cover to stop operation of a lock arm fixed to the locking clutch.

In addition, a plurality of clutch rollers fixed to the base member may expand outward by rotation of the gear member to be meshed with the connector.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EXEMPLARY EMBODIMENTS

Hereinafter, exemplary embodiments of the present invention will be described with reference to the accompanying drawings.

Figure 1:
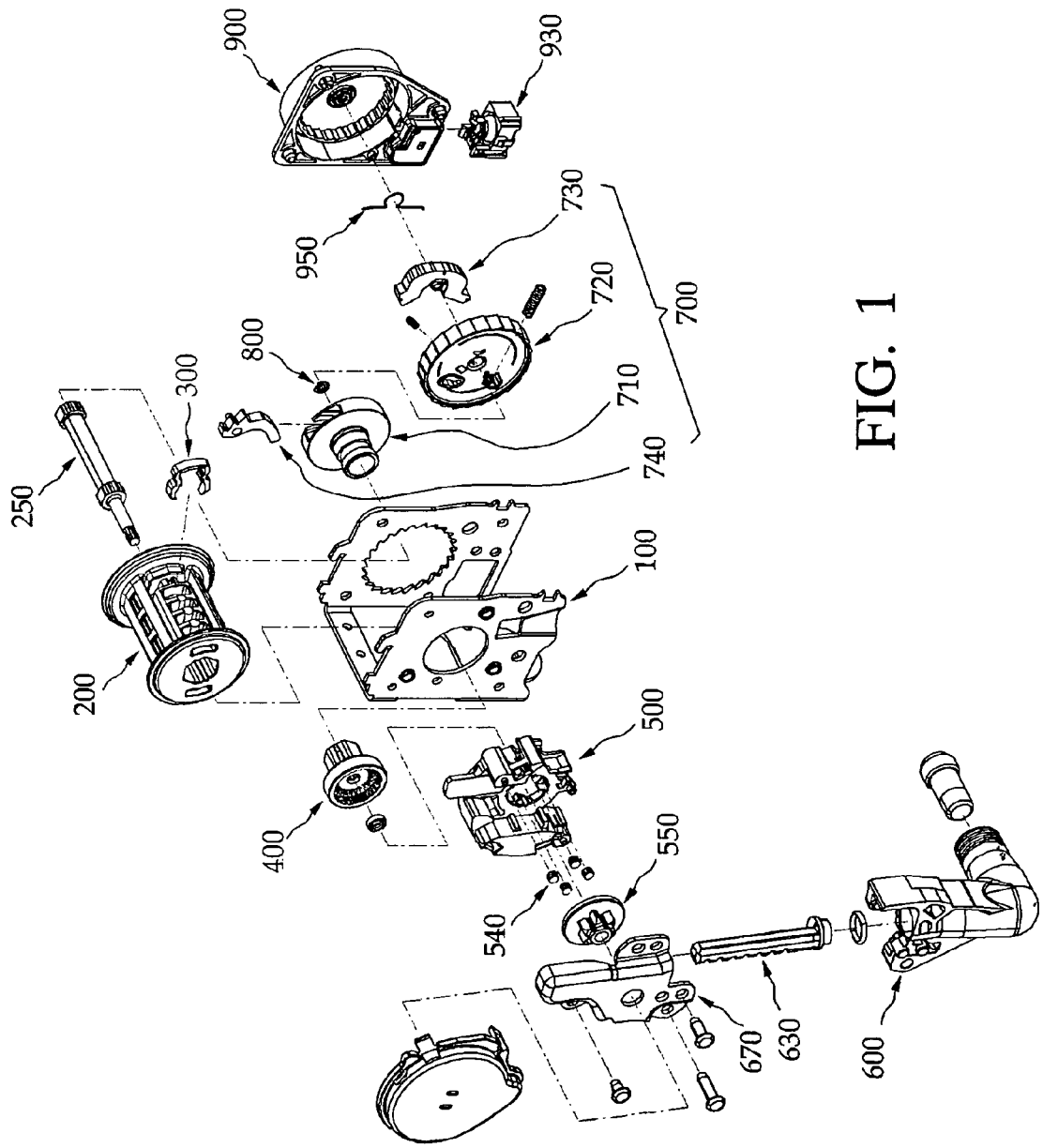
FIG. 1 is an exploded perspective view of a seat belt tractor in accordance with the present invention.
Figure 2:
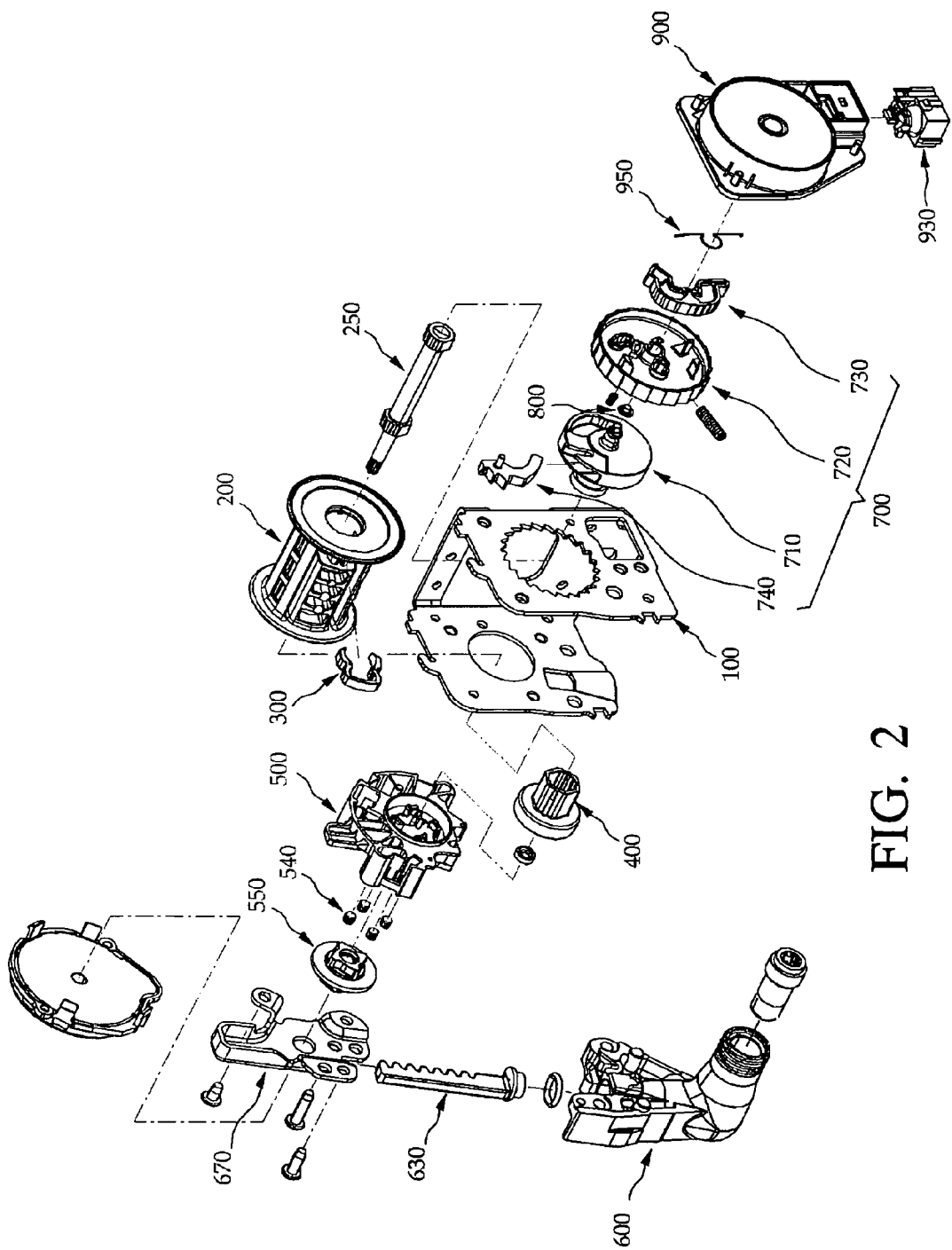
FIG. 2 is an exploded perspective view of the seat belt retractor in accordance with the present invention.

As shown in FIGS. 1 and 2, a seat belt retractor includes a housing 100 constituting a main body of the seat belt retractor, a guide drum 200 installed in the housing 100, a connector 400 inserted into one side of the guide drum 200, a base member 500 surrounding the connector 400, and a gear member 550 inserted into the base member 500.

In addition, the seat belt retractor further includes a cylinder 600 for operating the gear member 550, a torsion bar 250 inserted into the guide drum 200, a locking member 700 inserted and coupled between the torsion bar 250 and the guide drum 200, a locking clutch 720 installed at one surface of the locking member 700, and a mechanism cover 900 installed at one surface of the locking clutch 720.

Figure 3:
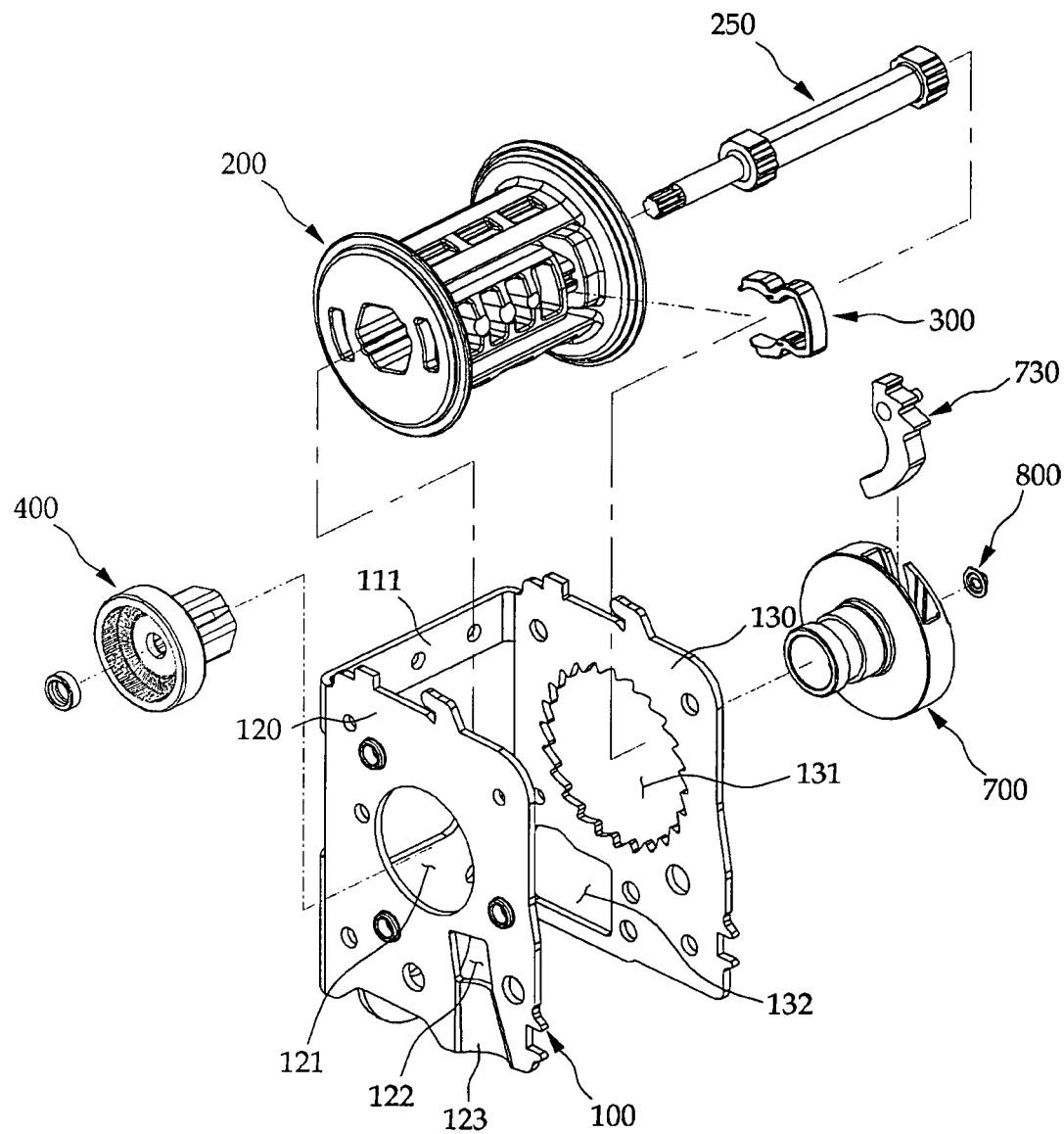
FIG. 3 is an exploded perspective view of a housing, a guide drum, and a locking clutch in accordance with the present invention.
Figure 4:
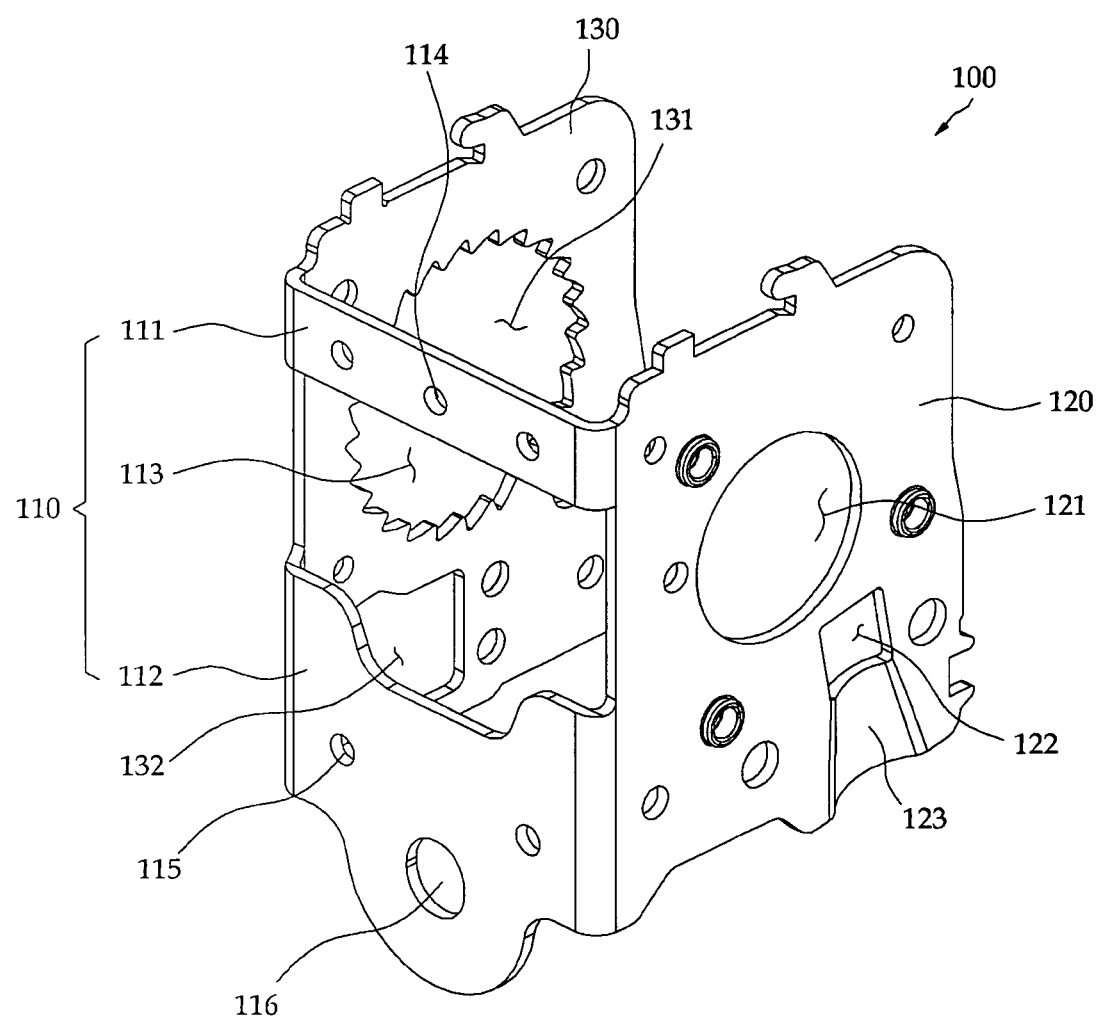
FIG. 4 is a perspective view of a housing in accordance with the present invention.
Figure 5:
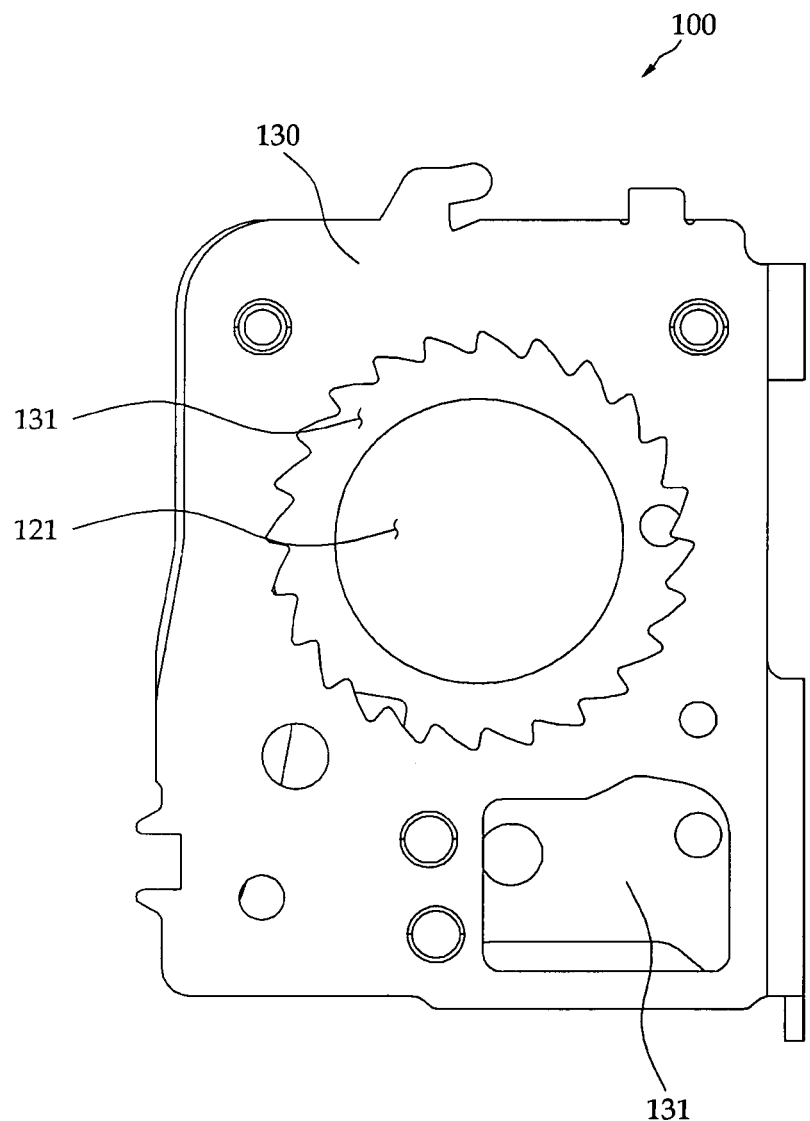
FIG. 5 is a side plate in accordance with the present invention.
Figure 6:
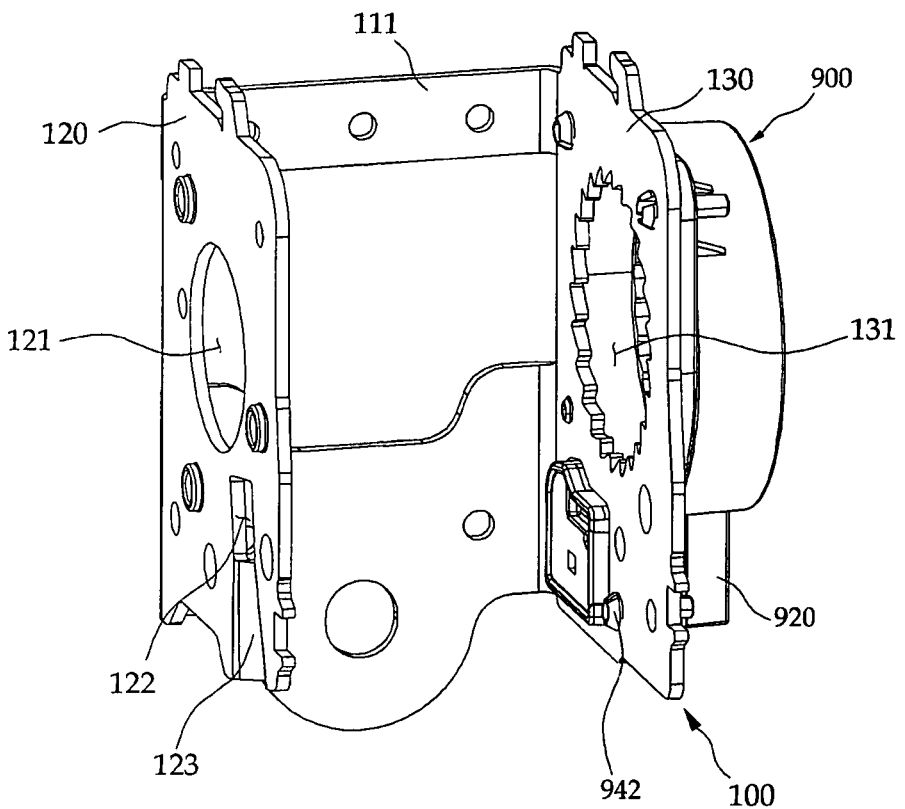
FIG. 6 is a perspective view of a housing and a vehicle sensor in accordance with the present invention, which are assembled.

As shown in FIG. 3, the housing 100 has first and second side plates 120 and 130 bent toward both sides. The first side plate 120 has a connector insertion hole 121, and the second side plate 130 has a locking member insertion hole 131.

In addition, the guide drum 200 has a cylindrical shape, on which a webbing is wound. The guide drum 200 is configured to maximally reduce the weight of the seat belt retractor. Inserted in the guide drum 200 is the torsion bar 250 having strength resisting a torque applied to the retractor and rotated backward in a plastically deformed manner when release of the webbing is stopped or the webbing is rewound.

Figure 13:
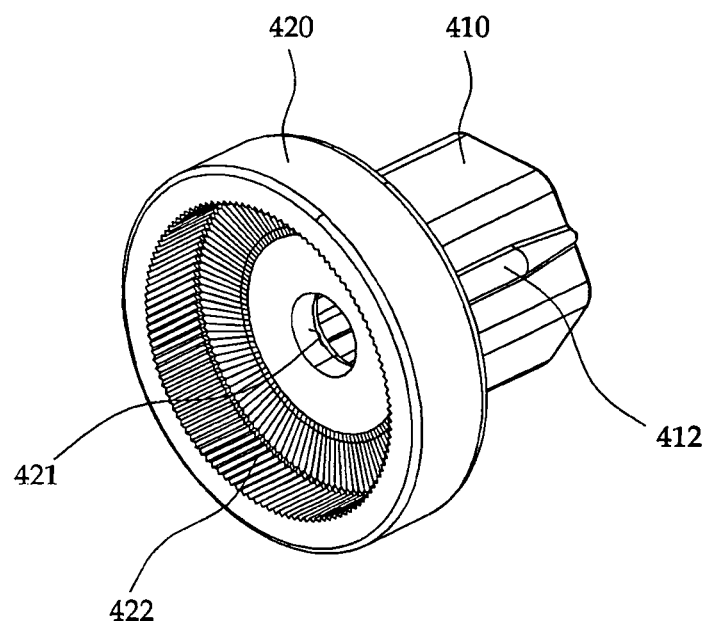
FIGS. 13A and 13B are perspective views of the connector of the seat belt retractor in accordance with the present invention.
Figure 13:
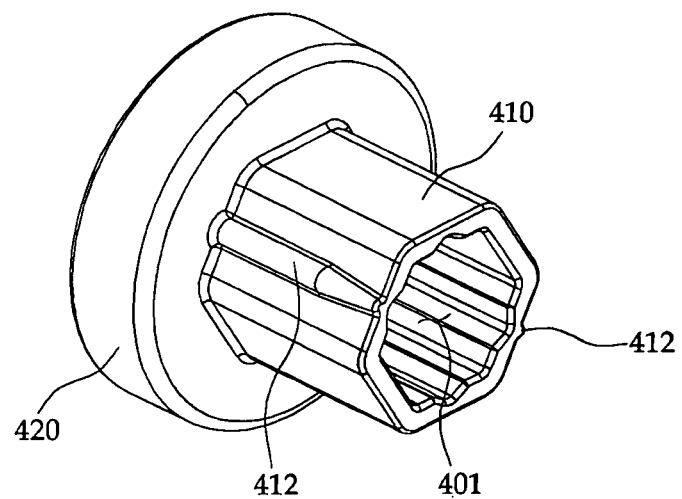

Further, as shown in FIG. 13, the connector 400 has a torsion bar coupling pipe 410 to which the torsion bar 250 is coupled to one side thereof and the torsion bar coupling pipe 410 has an internal gear 422 formed at an inner surface of a roller engagement part 420 extending therefrom.

The base member 500 has a plurality of clutch rollers 540 disposed therein. The gear member having a pinion gear and a slant gear is inserted into the clutch rollers 540 to be rotatably coupled therewith.

In addition, a piston 630 is installed in the cylinder 600 to be raised by a pressure of an ignited gas to rotate the gear member 550. A locking base 710 of the locking member 700 is coupled to the torsion bar 250.

A pawl 740 is movably installed in the locking base 710. A locking clutch 720 and a lock arm 730 are pivotally coupled to one side of the locking base 710. A cap is coupled to the locking base 710 to prevent wearing with the mechanism cover 900 and to facilitate assembly thereof.

The mechanism cover 900, in which a vehicle sensor 930 is installed, is coupled to one side of the locking clutch 720.

Hereinafter, the seat belt retractor in accordance with the present invention will be described with reference to the accompanying drawings.

First, as shown in FIGS. 3 to 6, the housing 100 is formed of a single "C"-shaped plate having a fixing part 110 for fixing the housing 100 to a vehicle body, and a first side plate 120 and a second side plate 130 bent from both sides of the fixing part 110 and opposite to each other.

The guide drum 200, on which the webbing is wound, is inserted between the first side plate 120 and the second side plate 130. While not shown, the base member 500 having the cylinder 600 is assembled to an outer surface of the first side plate 120, and the mechanism cover 900 is assembled to an outer surface of the second side plate 130.

Fixing holes 115 and a bolt hole 116 are formed in the fixing part 110 to fix the housing 100 to the vehicle body. A lower end of the fixing part 110 partially extends from its lower center to form a semi-circular shape, excluding predetermined both side sections thereof.

Since the fixing holes 115 have a circular shape, the housing 100 can be securely fixed in place.

The bolt hole 116 is formed in the center part extended in semi-circular shape, and the fixing holes 115 having a smaller diameter than the bolt hole 116 are formed at both sides of the bolt hole 116. The fixing holes 115 have a certain angle with respect to the bolt hole 116 in a symmetrical manner. In addition, a plurality of auxiliary holes 114 are formed in an upper connection part 111 of the fixing part 110 to help securely fix the housing 100 to the vehicle body.

At this time, an empty space 113 is formed between the lower connection part 112 having the fixing holes 115 and the bolt hole 116 and the upper connection part 111 having the auxiliary holes 114 to reduce the weight of the housing 100, thereby preventing unnecessary consumption of material.

In addition, the empty space 113 may extend downward toward the lower connection part 112 under the condition that the empty space 112 is not interfered with the fixing holes 115.

A connector insertion hole 121, through which the connector 400 is inserted, is formed in the first side plate 120 such that the torsion bar inserted into a center of the guide drum 200 is connected to the base member 500 connected to the cylinder 600.

Further, an assembly hole 122, into which a projection of the base member 500 is assembled, is formed under a right side of the connector insertion hole 121. A curved part 123 is formed under the assembly hole 122 and projects inside the housing 100 to conform to an outer surface of the cylinder 600.

Therefore, the cylinder 600 assembled to the base member 500 can be fixed to the housing 100 without any interference.

In addition, an upper surface of the assembly hole 122 projects beyond the curved part 123 to function as a stopper for limiting upward movement of the cylinder 600.

Meanwhile, a locking member insertion hole 131 is formed in the second side plate 130 opposite to the first side plate 120. The torsion bar 250 inserted into the center of the guide drum 200 passes through the locking member insertion hole 131, and then, the locking member 700 is inserted between the torsion bar 250 and the locking member insertion hole 132.

At this time, the pawl 740 inserted into the locking member 700 is hooked by a periphery of the locking member insertion hole 131 to limit rotation of the guide drum 200.

One-directional teeth are formed at the periphery of the locking member insertion hole 131. An insertion hole 132 is formed under a right side of the locking member insertion hole 131 to insert a vehicle sensor assembly 920 of the mechanism cover 900.

The insertion hole 132 having a wide rectangular shape extends upward from a right upper end thereof to conform to the vehicle sensor assembly part 920 of the mechanism cover 900. That is, the vehicle sensor assembly part 920 can be securely fixed through the insertion hole 132 to simplify assembly structure thereof.

The guide drum 200 is inserted between the first side plate 120 and the second side plate 130 of the housing 100, and the torsion bar 250 is inserted into the center of the guide drum 200. Meanwhile, the base member 500, to which the cylinder is assembled, is assembled to an outer surface of the first side plate 120, and the mechanism cover 900 is assembled to an outer surface of the second side surface 130.

At this time, one side of a lower end of the base member 500 is inserted into the assembly hole 122, and an outer surface of the cylinder 600 is in contact with the curved part 123. In addition, the vehicle sensor assembly part 920 of the mechanism cover 900 is inserted into the insertion hole 132.

Figure 7:
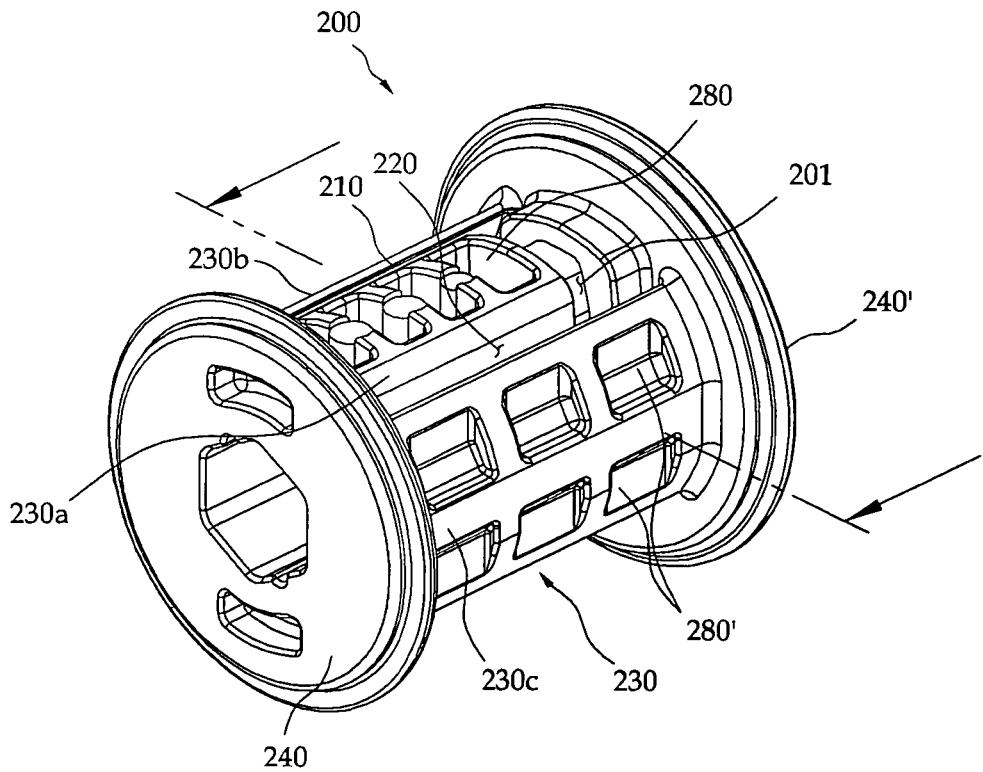
FIG. 7 is a perspective view of a guide drum of the seat belt retractor in accordance with the present invention.
Figure 8:
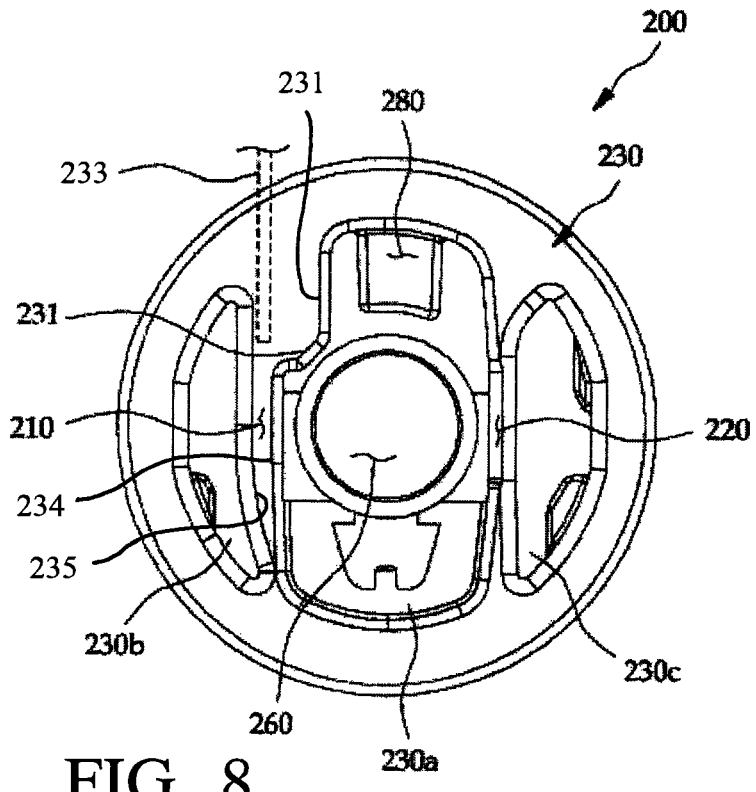
FIG. 8 is a cross-sectional view of FIG. 7.
Figure 9:
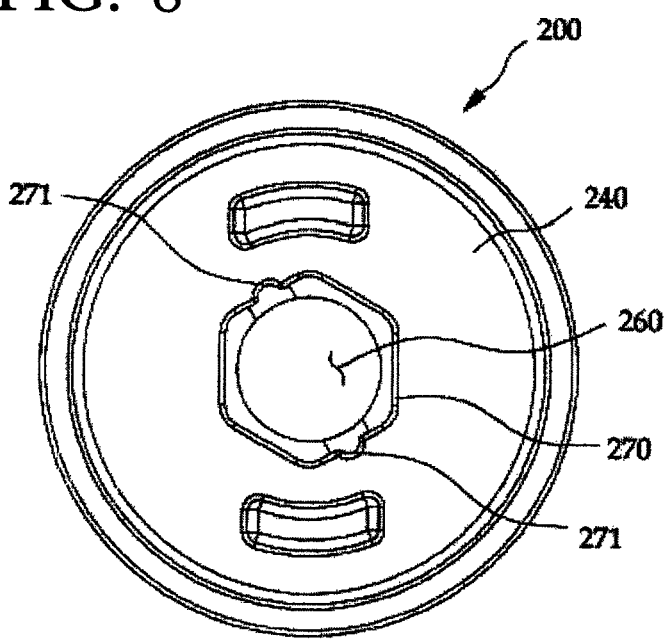
FIG. 9 is a side view of FIG. 7

As shown in FIGS. 7 to 9, the guide drum 200 of the seat belt retractor in accordance with the present invention includes a winding roller 230 having two webbing through-holes 210 and 220 through which the webbing passes and a stopper coupling groove 201, and flanges 240 and 240' formed at both ends of the winding roller 230.

First, the winding roller 230 has a length corresponding to a width of the webbing, and the two webbing through-holes 210 and 220 for fastening and winding the webbing.

The two webbing through-holes 210 and 220 parallelly extend between the flanges 240 and 240', and are constituted of the first webbing through-hole 210 and the second webbing through-hole 220.

In particular, the winding roller 230 includes a first fastening bar 230a formed by the first webbing through-hole 210 and the second webbing through-hole 220, and a second fastening bar 230b and a third fastening bar 230c formed with the first fastening bar 230a interposed therebetween.

In addition, as shown in FIG. 8, when the winding roller 230 is seen from a lateral cross-sectional view, a hooking threshold 231 is formed at one guide surface 231 of the first fastening bar 230a to accommodate a fastening rod (not shown) inserted into one end of the webbing 233. The guide surface 231 is formed as a flat portion 234 under the hooking threshold 231. A guide surface 235 of the second fastening bar 230b opposite to the flat portion of the guide surface 231 of the first fastening bar 230a is narrowed toward one surface of the first fastening bar 230a to form the first webbing through-hole 210.

Specifically, the guide surface of the second fastening bar 230b parallelly extends with respect to one surface of the first fastening bar 230a and forms a smooth arcuate shape toward a corner of the first fastening bar 230a.

That is, the guide surface of the second fastening bar 230b narrows toward the one surface of the first fastening bar 230a such that one end of the webbing inserted during fastening operation of the webbing can smoothly pass through the first webbing through-hole 210, without being interfered with the guide surface of the second fastening bar 230b.

In addition, recessed parts 280 and 280' are formed in an outer surface of the fastening bars 230a, 230b and 230c to reduce the total weight of the guide drum 200 of the seat belt retractor, thereby rapidly transmitting a rotational force for extracting or winding the webbing and increasing friction force thereof.

In this case, the recessed parts 280 and 280' may have a rectangular shape, and may be provided in plural.

Specifically, the recessed parts 280 formed in the fastening bar 230a have long sides disposed perpendicular to a longitudinal direction of the winding roller 230, and the recessed parts 280' formed in the second fastening bar 230b and the third fastening bar 230c have long sides disposed in the same direction as the longitudinal direction of the winding rollers 230.

The recessed parts 280 formed in the outer surface of the first fastening bar 230a function to reduce the weight of the guide drum 200, and the recessed parts 280' formed in the second fastening bar 230b and the third fastening bar 230c function to prevent the webbing from being slipped on the winding roller 230.

The recessed parts 280 and 280' formed at the first fastening bar 230a, the second fastening bar 230b and the third fastening bar 230c may have the same depth, or may have different depths.

Meanwhile, through-holes 260 are formed in the center of the flanges 240 and 240' formed at both ends of the winding roller 230.

In particular, as shown in FIG. 9, a connector coupling groove 270 to which a hexagonal connector (not shown) is coupled is formed in the one flange 240, and a plurality of semi-spherical coupling grooves 271 project outward from an inner periphery of the connector coupling groove 270 and are disposed opposite to each other.

That is, during assembly of the connector to the connector coupling groove 270 of the flange 240, a coupling projection (not shown) of the connector is disposed to correspond to the coupling grooves 271 of the flange 240 and inserted inside the coupling groove 270 such that the guide drum 200 and the connector can be readily assembled to each other.

Therefore, it is possible for an operator to conveniently perform the assembly process, thereby increasing productivity.

Figure 10:
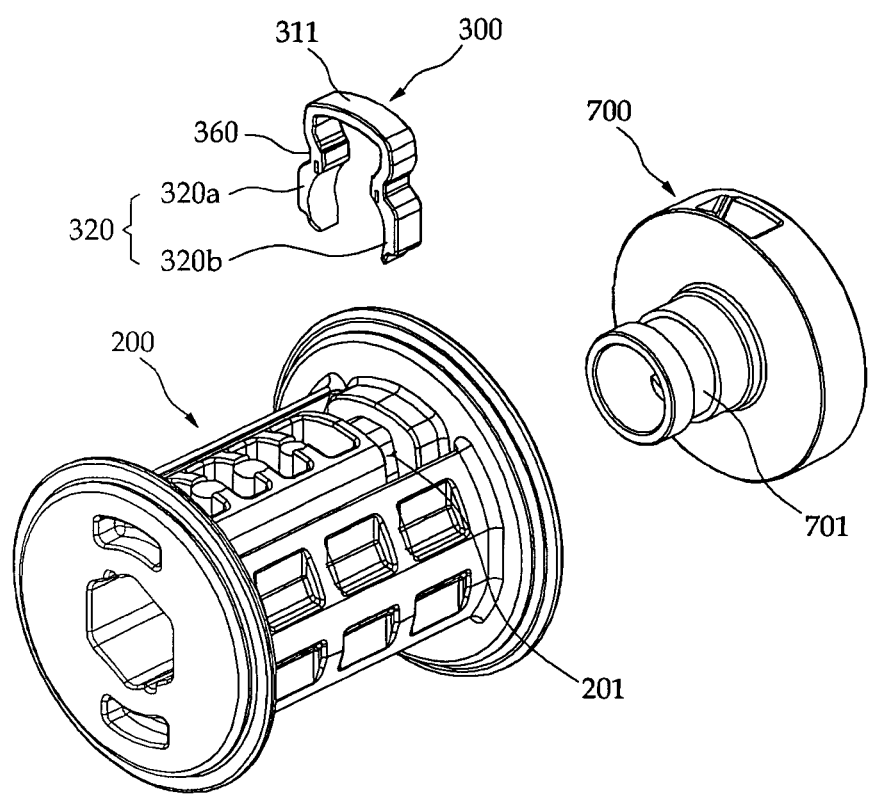
FIG. 10 is an exploded perspective view showing a process of coupling a base stopper to a guide drum of the seat belt retractor in accordance with the present invention.

As shown in FIG. 10, the base stopper 300 of the seat belt retractor in accordance with the present invention functions to prevent the locking member 700 coupled to the guide drum 200 from being moved therein, and includes an elastic piece 310 inserted into a stopper coupling groove 201 of the guide drum 200, and two grip pieces 320 coupled to a coupling part 701 of the locking member 700 inserted into the guide drum 200 and connected to the elastic piece 310.

The base stopper 300 is formed of a synthetic resin material to be resiliently coupled to the guide drum 200 and the coupling part 701 of the locking member 700, with one side of the base stopper 300 being opened.

Figure 11:
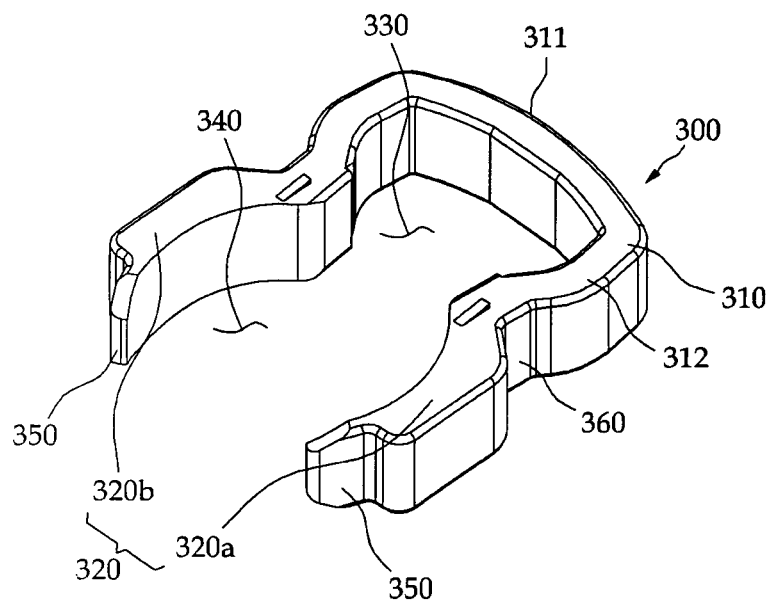
FIGS. 11A and 11B are a perspective view and a front view of the base stopper in accordance with the present invention.
Figure 11:
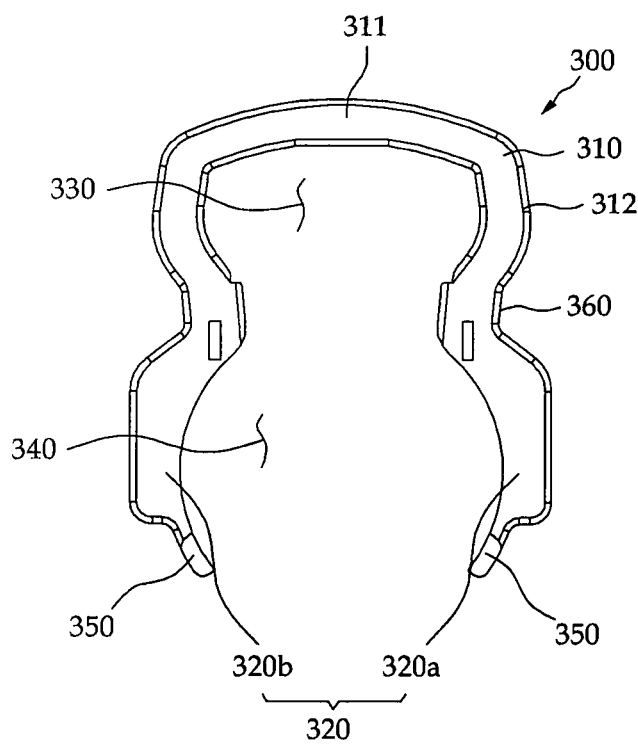

As shown in FIG. 11, the elastic piece 310 has a substantially "C" shape, and closely inserted into the stopper coupling groove 201 of the guide drum 200. In particular, since a web 311 of the elastic piece 310 is bent outward in a convex shape, elasticity of the flange 312 of the elastic piece 310 can be more effectively provided.

Moreover, since the web 311 of the elastic piece 310 has an arcuate inner surface, the elastic piece 310 can be readily manufactured and press-fitted into the stopper coupling groove 201 of the guide drum 200.

In addition, the two grip pieces 320 are constituted of the first grip piece 320a and the second grip piece 320b extending from both ends of the elastic piece 310.

According to the embodiment, concaved interface parts 360 are formed between the elastic piece 310 and the grip pieces 320. The interface parts 360 are configured to smoothly connect outer surfaces and inner surfaces of the elastic piece 310 and the grip pieces 320.

Therefore, the interface parts 360 can prevent stress concentration of the elastic piece 310 and the grip pieces 320 to maintain a predetermined durability, and fix the stopper coupling groove of the guide drum 200 and the coupling part 701 of the locking member 700 with elasticity and durability.

In particular, the first grip piece 320a and the second grip piece 320b are opposite to each other, and have arcuate inner surfaces to be in close contact with the coupling part 701 of the locking member 700.

As a result, a first insert space 330 and a second insert space 340 are formed inside the elastic piece 310 and inside the grip pieces 320 to be coupled to the stopper coupling groove 201 of the guide drum 200 and the coupling part 701 of the locking member 700.

In addition, two inner surfaces of the interface parts 360 opposite to each other between the elastic piece 310 and the grip pieces 320 are parallel to each other. This is because it is possible to increase durability against vibrations caused by rotation of the guide drum 200 and the locking member 700.

Further, the two opposite grip pieces 320 have outer surfaces parallel to each other to increase durability against vibrations on rotation thereof.

Meanwhile, the elastic piece 310 and the grip pieces 320 may have the same width to prevent concentration due to different widths.

Furthermore, support pieces 350 may extend from ends of the grip pieces 320 to more stably support the coupling part 701 of the locking member 700.

The support pieces 350 have arcuate inner surfaces to substantially stably support the cylindrical coupling part 701 of the locking member 700 on rotation or stoppage of the locking member 700.

Figure 12:
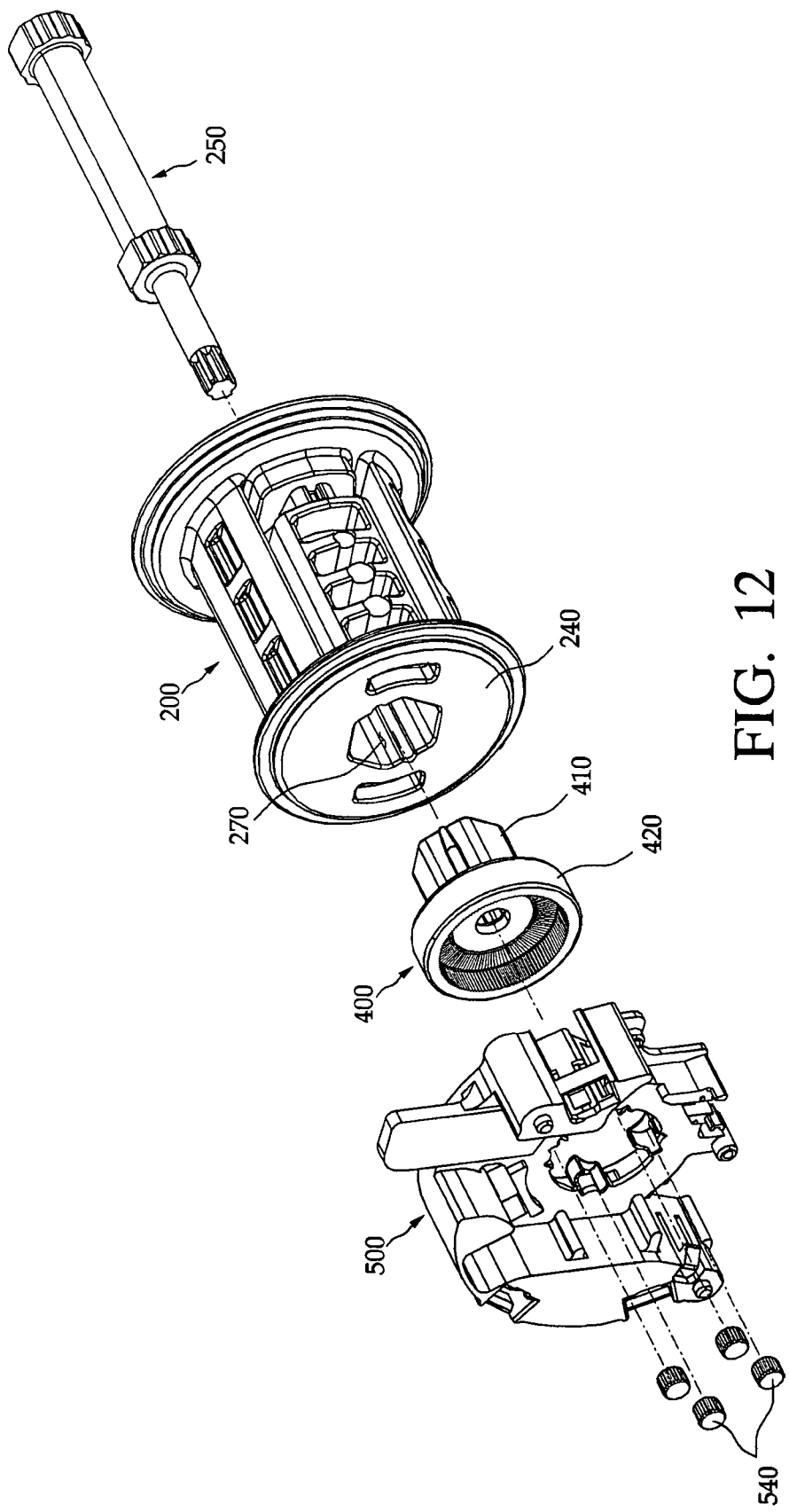
FIG. 12 is an exploded perspective view of coupling components coupled to a connector of the seat belt retractor in accordance with the present invention.

As shown in FIGS. 12 and 13, the connector 400 of the seat belt retractor in accordance with the present invention includes a torsion bar coupling pipe 410 coupled to the guide drum 200 in a non-rotation manner, and a roller engagement part 420 integrally formed with one end of the torsion bar coupling pipe 410 and engaged with a plurality of clutch rollers 540.

First, the torsion bar coupling pipe 410 is coupled to the one flange 240 of the guide drum 200, and has a hexagonal outer shape having a hollow part 401 in which the torsion bar 250 is accommodated.

In addition, coupling projections 412 project outward from both opposite sides of the torsion bar coupling pipe 410. The coupling projections 412 may be formed in a longitudinal direction of the torsion bar coupling pipe 410.

Further, the coupling projections 412 may narrow toward a distal end of the coupling pipe opposite to the roller engagement part 420.

The coupling projections 412 have the size corresponding to the connector coupling groove 270 formed in the one flange 240 of the guide drum 200. That is, the torsion bar coupling pipe 410 has the coupling projections 412 corresponding to the connector coupling groove 270 formed in the one flange 240 of the guide drum 200 to be readily assembled to the guide drum 200.

Meanwhile, the roller engagement part 420 has a circular cup shape and is coupled to one side of the base member 500. The roller engagement part 420 has a through-hole 421 formed at its bottom and an internal gear 422 formed at its inner surface and engaged with the plurality of clutch rollers 540 to transmit a rotational force.

The internal gear 422 and the clutch rollers 540 of the roller engagement part 420 are not meshed with each other in a normal state. When vehicle collision is detected, the cylinder 600 is operated to transmit a rotational power to the clutch rollers 540, and the clutch rollers 540 transmit the rotational power to the internal gear 422 of the roller engagement part 420.

Then, the roller engagement part 420 is rotated in the same direction as the rotation direction of the clutch rollers 540 to plastically deform the torsion bar 250 coupled to the torsion bar coupling pipe 410, thereby rewinding the webbing wound on the guide drum 200 to a predetermined length.

In addition, the torsion bar coupling pipe 410 and the roller engagement part 420 may have strength and durability higher than a certain lever.

As shown in FIGS. 14 to 18, the retractor in accordance with the present invention includes the base member 500, the plurality of clutch rollers 540 having teeth formed on a surface thereof and coupled to the base member 500, the gear member 550 installed at one surface of the base member 500 to rotate the clutch rollers 540, and the cylinder 600 for raising the connector 400 installed at the other surface of the base member 500 and the piston 630 installed therein.

In this embodiment, the base member 500 refers to a component coupled to one side of the housing 100 constituting the retractor, and the gear member 550 refers to a component for rotating the clutch rollers 540 coupled to the base member 500. The base member 500 is formed of plastic to provide good elasticity.

Figure 15:
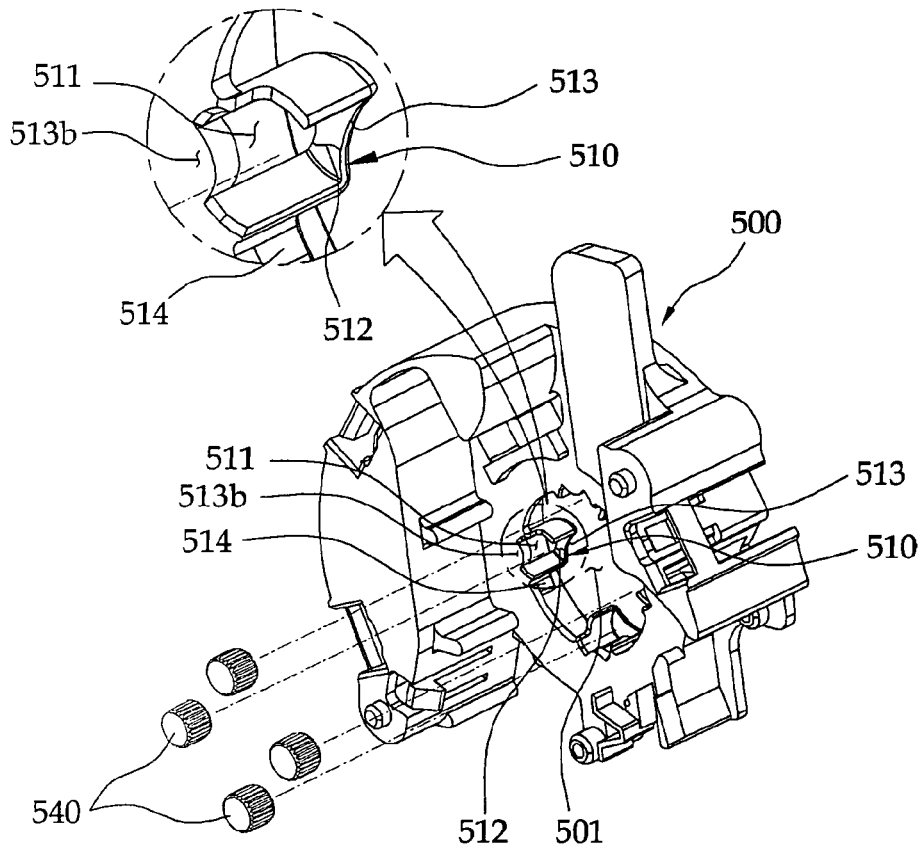
FIGS. 15A and 15B are exploded perspective views of the base member of the seat belt retractor in accordance with the present invention.
Figure 15:
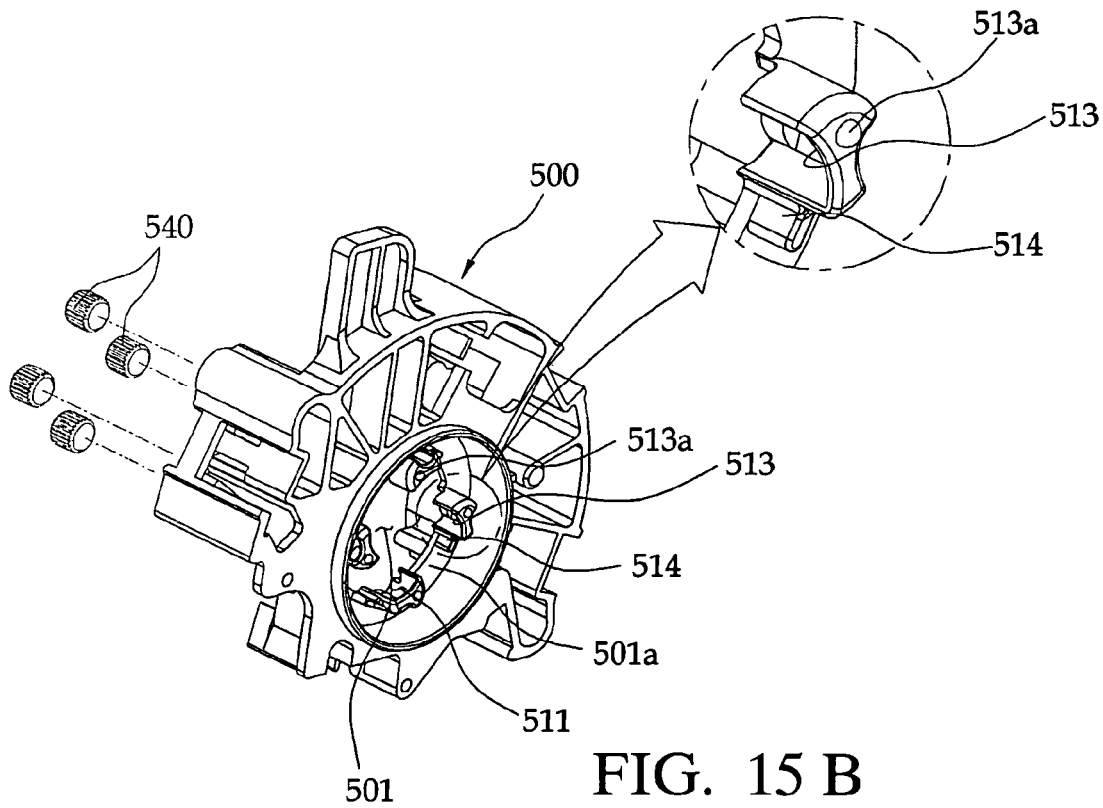
Figure 16:
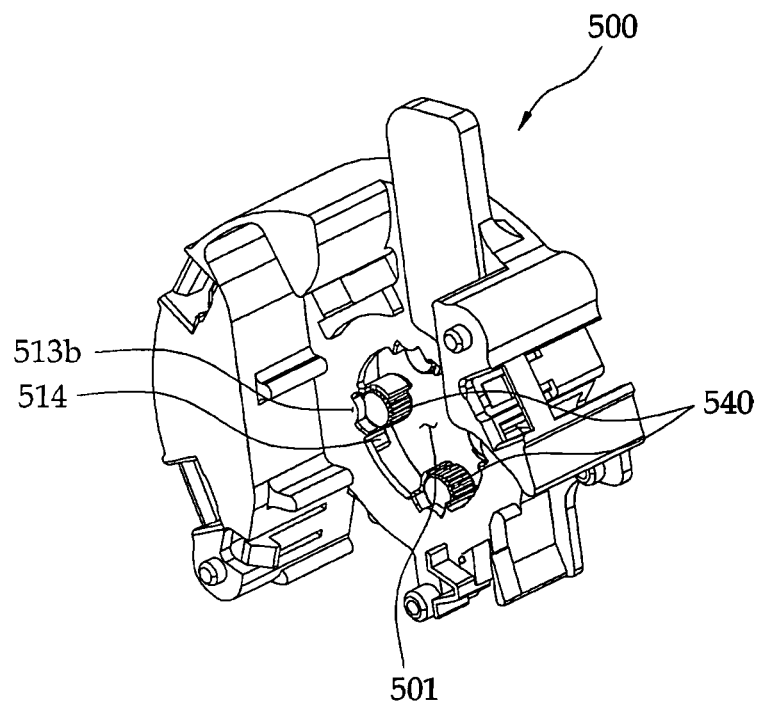
FIGS. 16A and 16B are enlarged perspective views of the base member of the seat belt retractor in accordance with the present invention.
Figure 16:
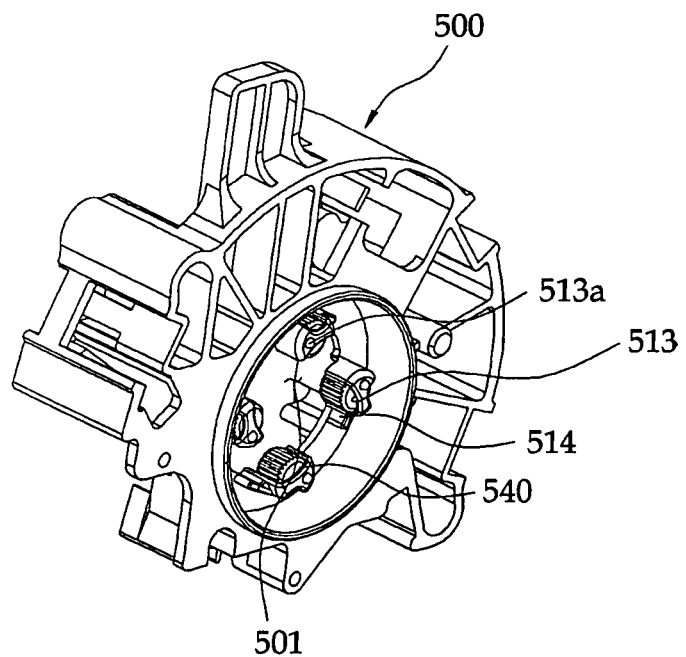
Figure 17:
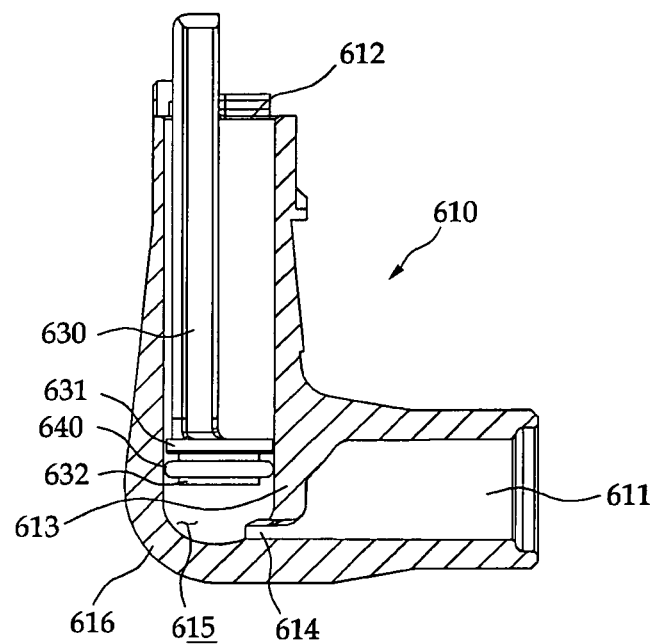
FIG. 17 is a side view of the base member coupled to the seat belt retractor in accordance with the present invention.

As shown in FIGS. 15 and 16, the base member 500 has an inner diameter 501 formed at its center, and a flange 501a formed around the inner diameter 501.

In addition, a plurality of projections, grooves, and holes may be formed at an outer surface of the base member 500.

The base member 500 in accordance with the present invention includes roller retainers 510 extending from one surface of the flange 501a formed around the center inner diameter 501. The cylindrical clutch rollers 540 are inserted into the roller retainers 510. In particular, the roller retainers 510 extend from the flange 501a around the center inner diameter 501 toward the connector 400, and project inward from the center inner diameter 501.

For this purpose, the roller retainer 510 has a substantially cylindrical hollow part. The roller retainer 510 has second openings 512 formed at a surface thereof through which the clutch rollers reciprocates, and first openings 511 opposite to the second openings 512 with connection parts 513 interposed therebetween.

Here, the second openings 512 are formed inside the center inner diameter 501, and the first openings 511 are formed outside the center inner diameter 501. The second openings 512 have an area larger than that of the first openings 511 such that the clutch rollers 540 are instead thereinto or separate therefrom. The first openings 511 have an area such that the clutch rollers 540 cannot escape therethrough.

In addition, as shown in FIG. 16, when the clutch rollers 540 are assembled to the roller retainer 510, outer peripheries of the clutch rollers 540 are exposed to the exterior through the second openings 512 and the first openings 511.

Figure 18:
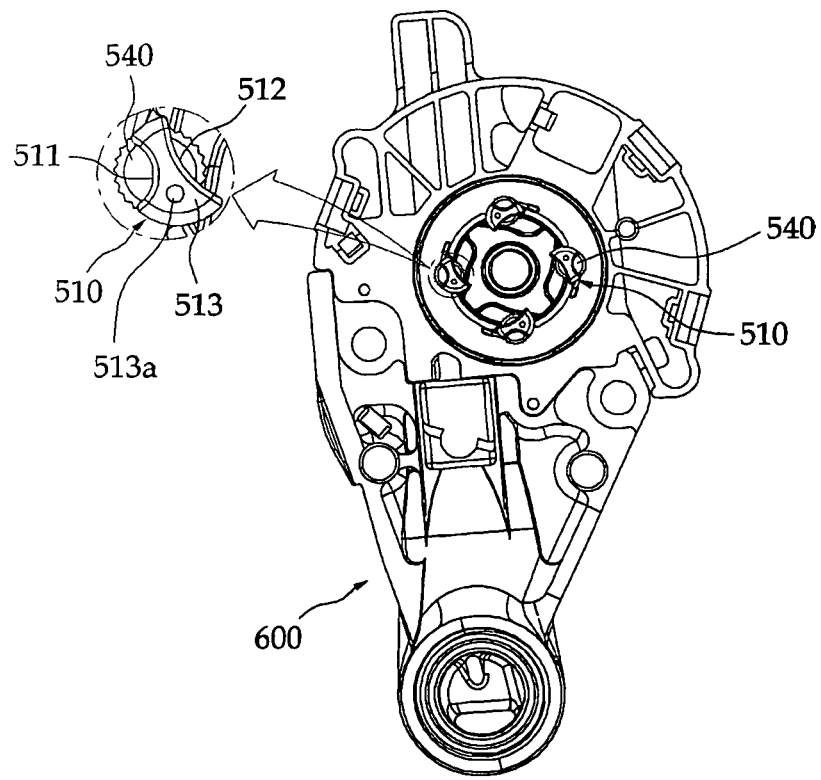
FIG. 18 is a side view of a gear member coupled to the base member of the seat belt retractor in accordance with the present invention, which has been rotated.

Further, as shown in FIG. 18, a portion of the clutch rollers 540 having teeth formed on the outer periphery thereof are in contact with the gear member 550, and the other portion of the clutch rollers 540 are spaced a predetermined distance from the internal gear 422 formed at an inner periphery of the connector 400.

That is, the first openings 511 are opposite to the connector 400 such that the clutch rollers 540 expand outward by the gear member 550 to be meshed with the connector 400 on vehicle collision and the second openings 512 are opened to be in contact with a slant gear 553 of the gear member 550.

In addition, the second openings 512 and the first openings 511 have arcuate shapes opposite to each other to form the connection part 513 interposed therebetween.

A projection 513a is formed at a surface of the connection past 513 to be in contact with a bottom of the connector 400 to appropriately support an axial load thereof. The projection 513a may have a semi-spherical shape.

Meanwhile, a support plate 513b is formed at the flange 501a around the center inner diameter 501 opposite to the connection part 513. Therefore, it is possible to prevent the clutch rollers 540 inserted into the second opening 512 from being slipped toward the gear member 550.

In this case, when seen from an axial direction, the support plate 513b may have an inwardly convex arcuate shape to support an object within a narrow space.

In addition, the roller retainer 510 has an extension rib 514 extending around the center inner diameter to prevent damage to the retainer 510 when the clutch rollers 540 expand outward.

Further, the gear member 550 includes the slant gear 553 disposed at one surface of a circular plate to move the clutch rollers 540 in a radial direction.

Figure 14:
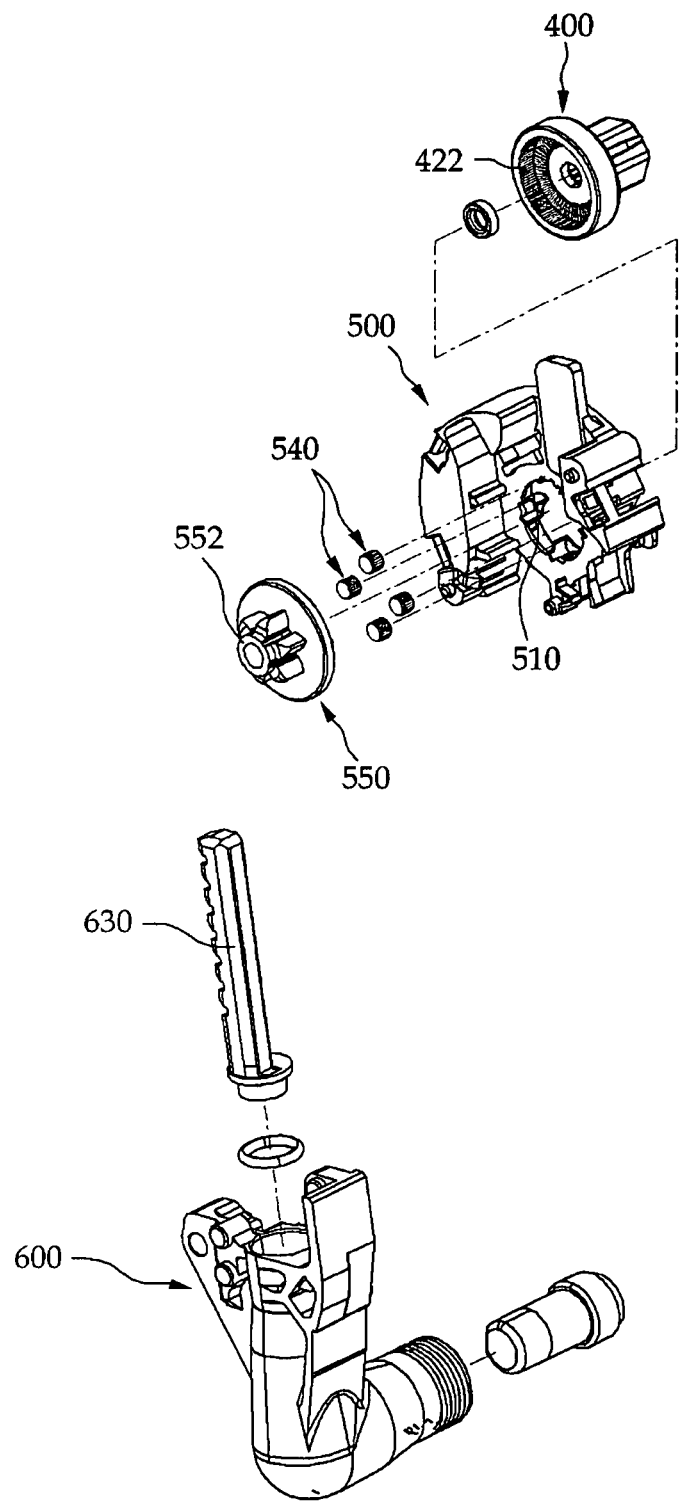
FIG. 14 is an exploded perspective view of a base member of the seat belt retractor in accordance with the present invention.

As shown in FIG. 14, the gear member 550 is installed in the cylinder 600 to be meshed with the piston 630.

The slant gear 553 has an arcuate surface 554 formed at a position in which the clutch rollers 540 installed in the roller retainer 510 of the base member 500 are disposed, and a slant surface 555 extending outward from the arcuate surface 554.

That is, the arcuate surface 554 is in contact with the clutch rollers 540 and the slant surface 555 moves the clutch rollers 540 outward from the inner diameter 501 of the base member 500 to rotate the clutch rollers 540 when the gear member 550 is rotated.

The connector 400 has an inner periphery in contact with the clutch rollers 540 fixed to the base member 500, and the inner periphery has the internal gear 422 meshed with the clutch rollers 540 when the clutch rollers 540 expand outward.

Operation of the base member and a pretensioner will be briefly described below.

First, when an impact is applied due to vehicle collision or roll, an electronic control unit (ECU) transmits a control signal to the cylinder 600 depending on the magnitude of the detected impact.

A gas generating agent contained in the cylinder 600 is ignited depending on the control signal from the electronic control unit, and the gas generating agent is combusted to generate a high pressure expansion gas, thereby raising the piston 630.

That is, the piston 630 is rapidly raised by the expansion gas to rotate the gear member 550. As the gear member 550 rotates, the slant gear 553 also rotates with the gear member 550 to press the roller retainer 510 of the base member 500 having a large elasticity such that the clutch rollers 540 disposed at the arcuate surface 554 expand outward from the center inner diameter 501.

As shown in FIG. 18, the clutch rollers 540 are rotated along the slant surface 555 of the slant gear 553, and the roller retainer 510 moves outward from the inner diameter 501 depending on movement of the clutch rollers 540.

The moved clutch rollers 540 are in contact with the internal gear 422 of the connector 400, and the clutch rollers 540 rotated along the slant surface 555 rotate the connector 400.

The connector 400 rotated in this manner rotates the guide drum 200 in a winding direction to rewind the webbing.

Therefore, the seat belt worn by a passenger is rewound in a rewinding direction of the retractor to reduce impact applied to the passenger.

As shown in FIGS. 19 to 22, a rotary structure in accordance with the present invention includes the base member 500 fixed to one side of the housing 100, the plurality of clutch rollers 540 coupled to the base member 500, and the gear member 550 for rotating the clutch rollers 540.

The seat belt retractor includes the housing 100 constituting a main body of the seat belt retractor, the guide drum 200 rotatably coupled to the housing 100, the connector 400 fixed to the guide drum 200, and the cylinder 600 for raising the piston 630 installed therein.

In addition, the base member 500 has a substantially "C" shape and is coupled to one side of the housing 100. The gear member 550 functions to rotate the clutch rollers 540 coupled to the base member 500.

Figure 19:
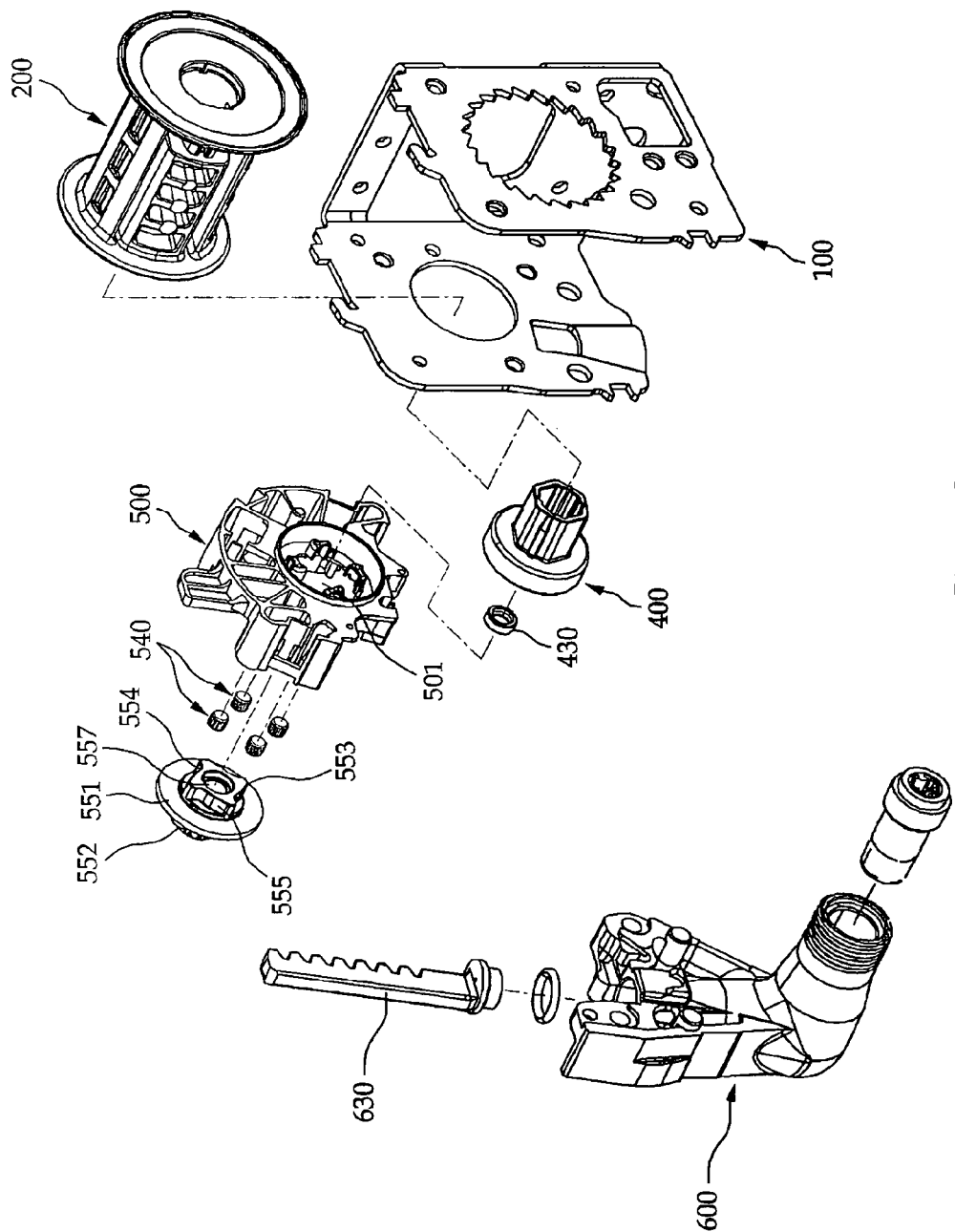
FIG. 19 is an exploded perspective view of the rotary structure of the seat belt retractor in accordance with the present invention.
Figure 20:
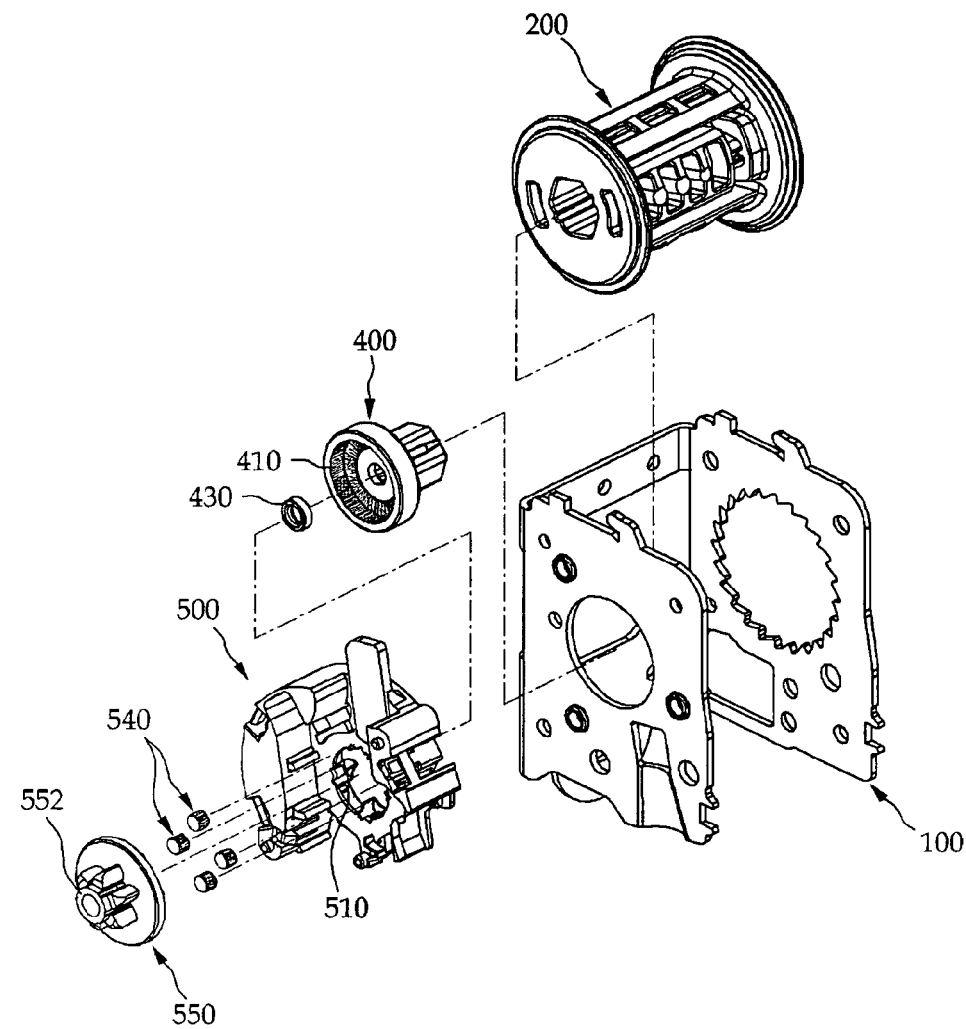
FIG. 20 is an exploded perspective view of the rotary structure of the seat belt retractor in accordance with the present invention.
Figure 20:
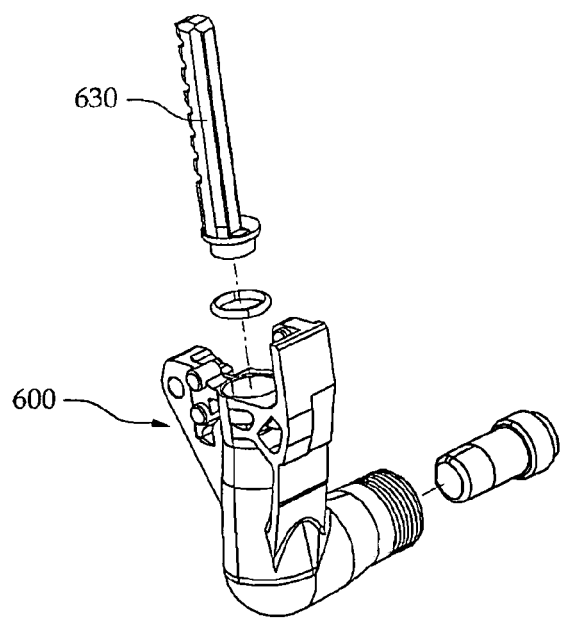

As shown in FIGS. 19 and 20, the base member 500 has a center inner diameter formed at its center. A plurality of projections, stoppers, and so on, project from an outer surface of the inner diameter 501 to stably fix the cylinder 600.

The projections and the stoppers provide a reference position when the base member 500 is coupled to the cylinder 600. Since the projections and the stoppers may be varied depending on necessity, a detailed description thereof will be omitted.

In addition, the base member 500 includes a roller retainer 510 extending from one surface of the inner diameter. The roller retainer 510 has a substantially cylindrical shape such that the clutch rollers 540 having a cylindrical shape can be inserted.

The roller retainer 510 has the first opening 511 and the second opening 512 such that an outer periphery of the clutch rollers 540 is exposed to the exterior. The first opening 511 is formed such that the clutch rollers 540 are partially exposed, and the second opening 512 is also formed such that the clutch rollers 540 are partially exposed.

That is, the first opening 511 is opened such that the clutch rollers 540 move outward from an initial position to be meshed with the connector 400, and the second opening 512 is opened to be in contact with the gear member 550.

The first opening 511 and the second opening 512 have an arcuate shape, and the connection part 513 is integrally formed with the first opening 511 and the second opening 512 to connect them.

Therefore, a portion of the clutch rollers 540 having teeth formed at an outer periphery are in contact with the gear member 550, and another portion of the clutch rollers 540 are spaced a predetermined distance from the teeth formed at an inner periphery of the connector 400.

In addition, in order to prevent damage to the roller retainer 510 when the clutch rollers 540 expand outward, the roller retainer 510 has an extension rib 514 extending from the inner diameter 501.

Further, the gear member 550 includes the pinion gear 552 formed at one surface of a circular plate 551, and the slant gear 553 integrally formed with the other surface of the circular plate 551. A bearing fixing groove 557 into which a bearing 430 is inserted is formed at the inner diameter 501 of the gear member 550, i.e., a position in which the slant gear 553 is formed.

Furthermore, the bearing 430 inserted into the bearing fixing groove 557 supports an axial load and moment caused by axial rotation. The bearing 430 may be formed of a synthetic resin material having strength and stiffness sufficient to reduce the weight of the retractor.

The pinion gear 552 is engaged with the piston 630 installed in the cylinder 600. At this time, a tip part of the piston 630 may be engaged with the gear member 550, or may be disposed at a lower end of the gear member 550 to rotate the pinion gear 552.

In addition, the slant gear 553 has the arcuate surface 554 formed at a portion in which the clutch rollers 540 fixed to the base member 500 are disposed, and the slant surface 555 extending outward form the arcuate surface 554.

That is, the arcuate surface 554 is in contact with the clutch rollers 540, and the slant surface 555 moves the clutch rollers 540 outward from the inner diameter 501 of the base member 500 to rotate the clutch rollers 540 when the gear member 550 is rotated.

The connector 400 includes the roller engagement part 420 having a larger diameter than the clutch rollers 540 fixed to the base member 500, and the roller engagement part 420 has the internal gear 422 engaged with the expanding clutch rollers 540.

Figure 21:
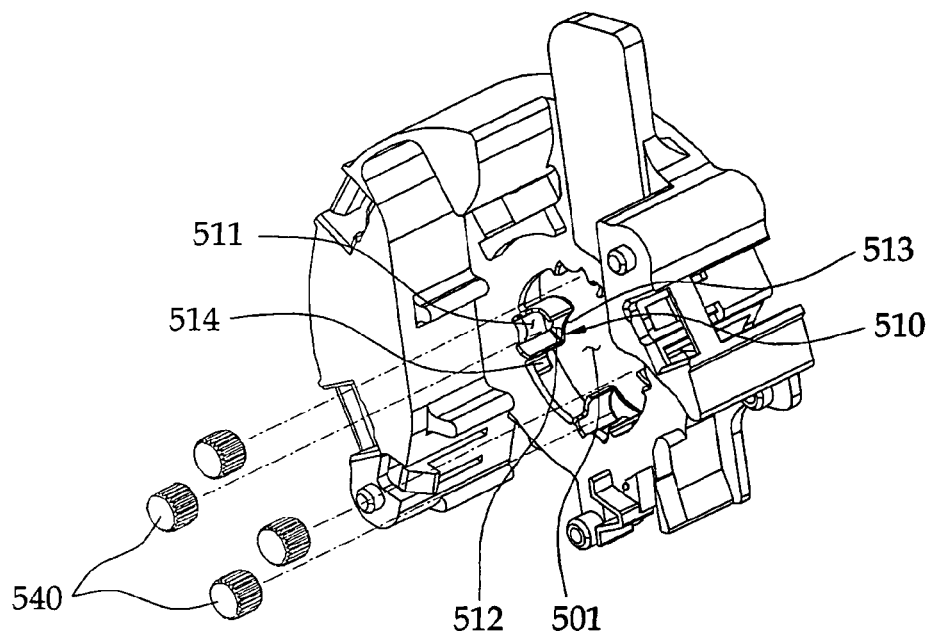
FIG. 21 is an enlarged perspective view of the base member of the seat belt retractor in accordance with the present invention.
Figure 22:
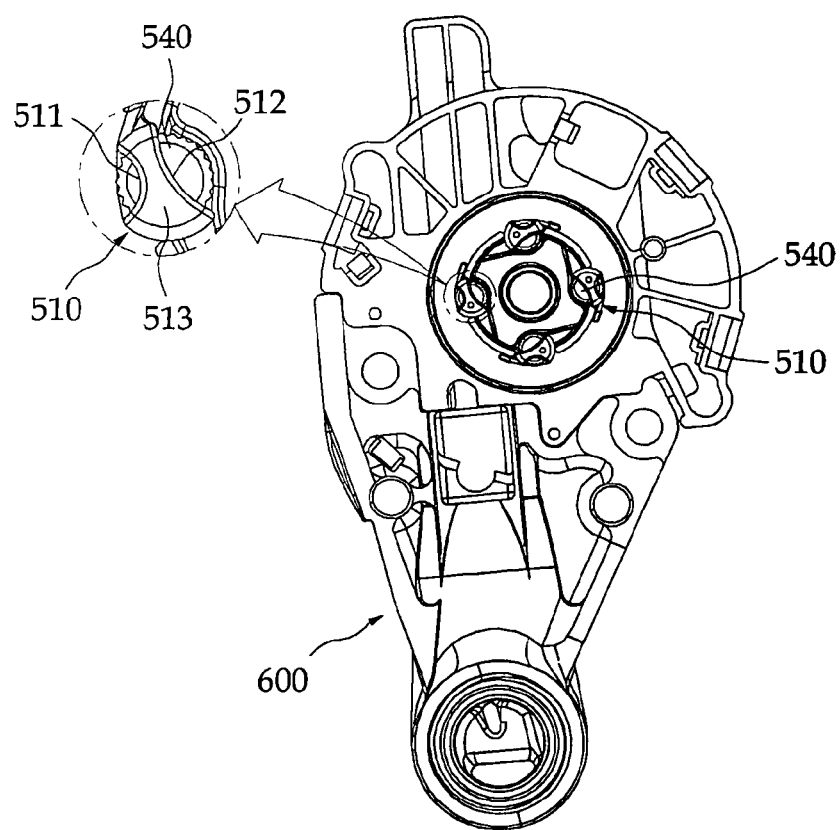
FIG. 22 is a side view of the rotary structure coupled to the seat belt retractor in accordance with the present invention.

As shown in FIG. 21, in the rotary structure of the seat belt retractor in accordance with the present invention, the clutch rollers 540 are fixed to the roller retainers 510 of the base member 500, and the slant gear 553 of the gear member 550 is inserted between the clutch rollers 540.

An operator grips the slant gear 553 of the gear member 550 in a direction that the slant gear is seen, and pushes the slant gear toward the roller retainer 510 of the base member 500, thereby assembling the gear member 550 to the base member 500.

That is, the operator grips the pinion gear 552 with his/her one hand and grips the base member 500 with the other hand, and rotates the pinion gear 552 or the base member 500, such that the slant gear 553 is disposed not to be interfered with the roller retainer 510 and to be inserted into the base member 500, thereby completing the assembly.

At this time, the arcuate surface 554 of the slant gear 553 is in contact with the clutch rollers 540, and the clutch rollers 540 are spaced a predetermined distance from the roller engagement part 420 of the connector 400.

In addition, the cylinder 600, in which the piston 630 is accommodated, is installed under the gear member 550.

The rotary structure smoothly releases the webbing as a passenger normally pulls the webbing, and winds the webbing using elasticity of a leaf spring (not shown) when the passenger removes his/her hand. Since the above winding and release operation is a basic operation of the seat belt retractor, a description thereof will be omitted.

Further, when an impact is applied to the rotary structure due to vehicle collision or roll, an electronic control unit detects the impact and transmits a control signal to the cylinder 600.

A gas generating agent contained in the cylinder 600 is ignited depending on the control signal from the electronic control unit, and the gas generating agent is combusted to generate a high pressure expansion gas, thereby raising the piston 630.

That is, the piston 630 is rapidly raised by the expansion gas to rotate the gear member 550. As the gear member 550 rotates, the slant gear 553 also rotates with the gear member 550 such that the clutch rollers 540 disposed at the arcuate surface 554 expand outward from the center inner diameter 501.

Figure 23:
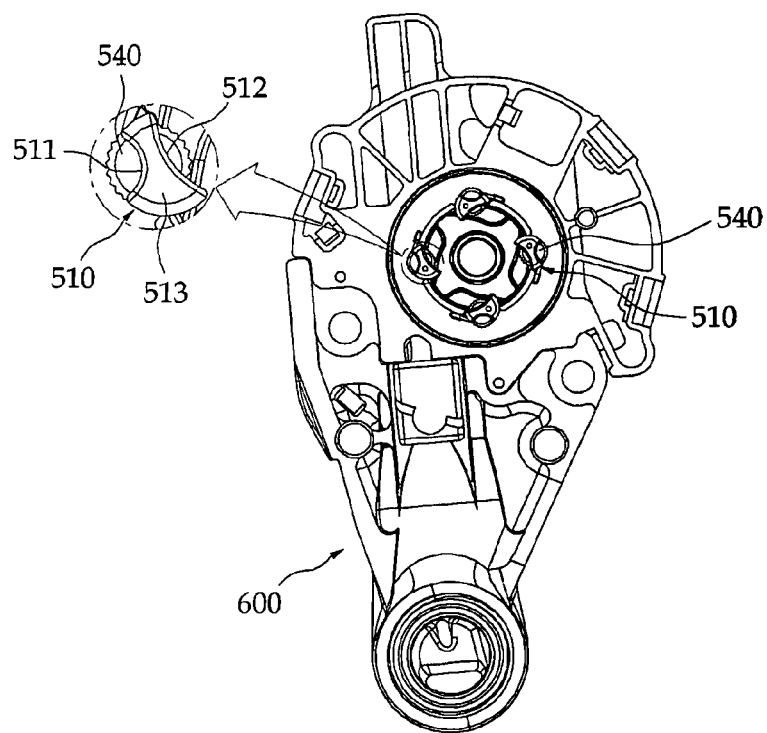
FIG. 23 is a side view of the rotary structure of the seat belt retractor in accordance with the present invention, which has been rotated.
Figure 24:
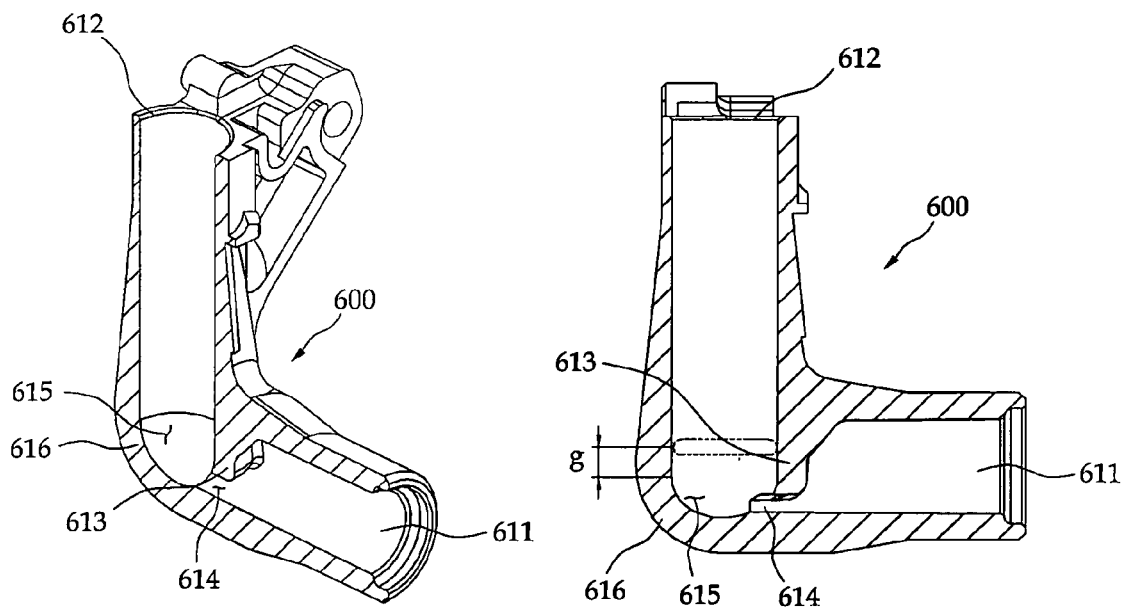
FIG. 24A is a partially cut perspective view of a cylinder structure of a pretensioner for the seat belt retractor in accordance with the present invention.
FIG. 24B is a longitudinal perspective view of the cylinder structure of the pretensioner for the seat belt retractor in accordance with the present invention.
Figure 25:
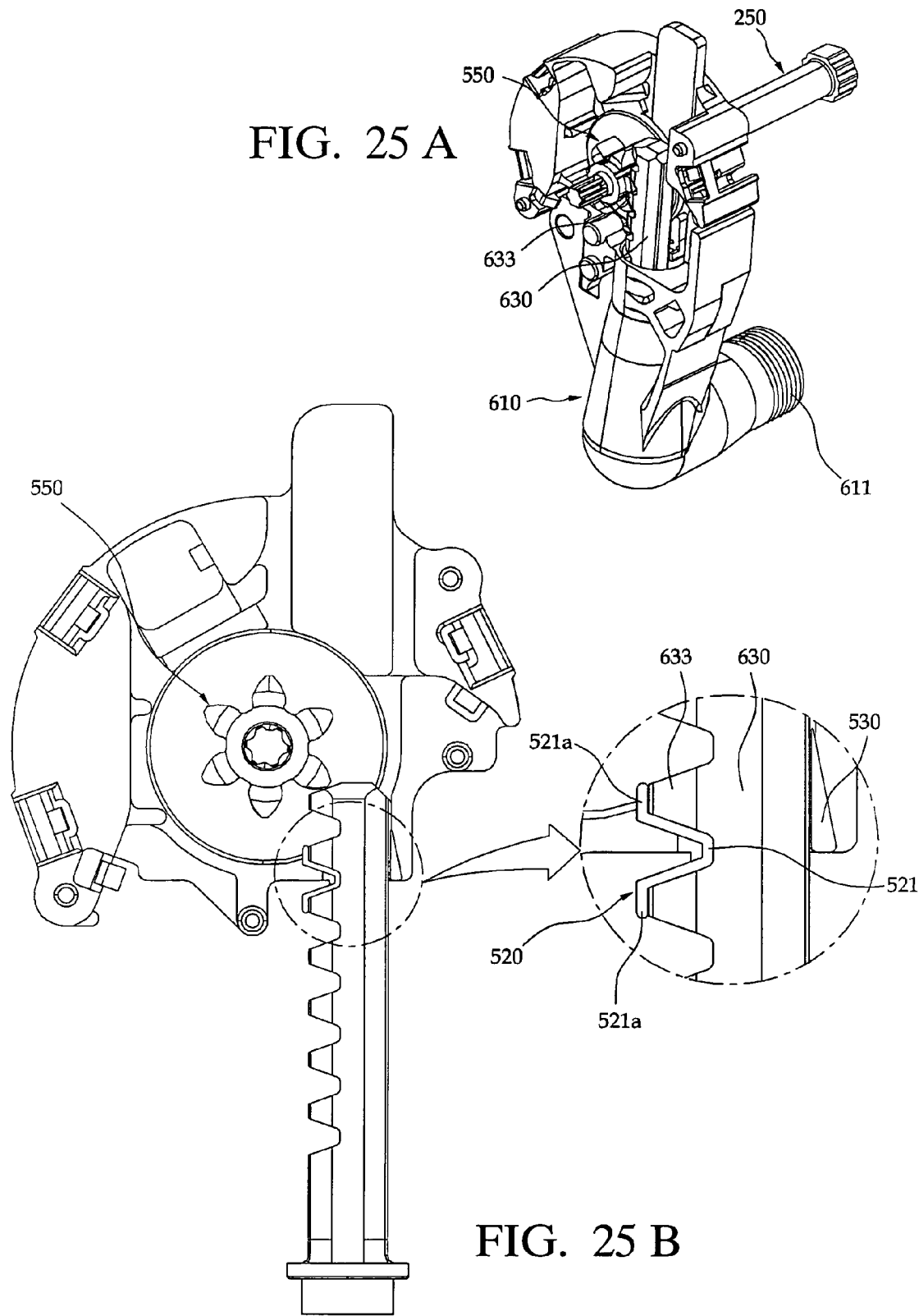
FIG. 25A is a perspective view of the pretensioner for the seat belt retractor in accordance with the present invention, the cylinder being mounted thereon.
FIG. 25B is a side view of the pretensioner for the seat belt retractor in accordance with the present invention, the cylinder being removed therefrom.
Figure 26:
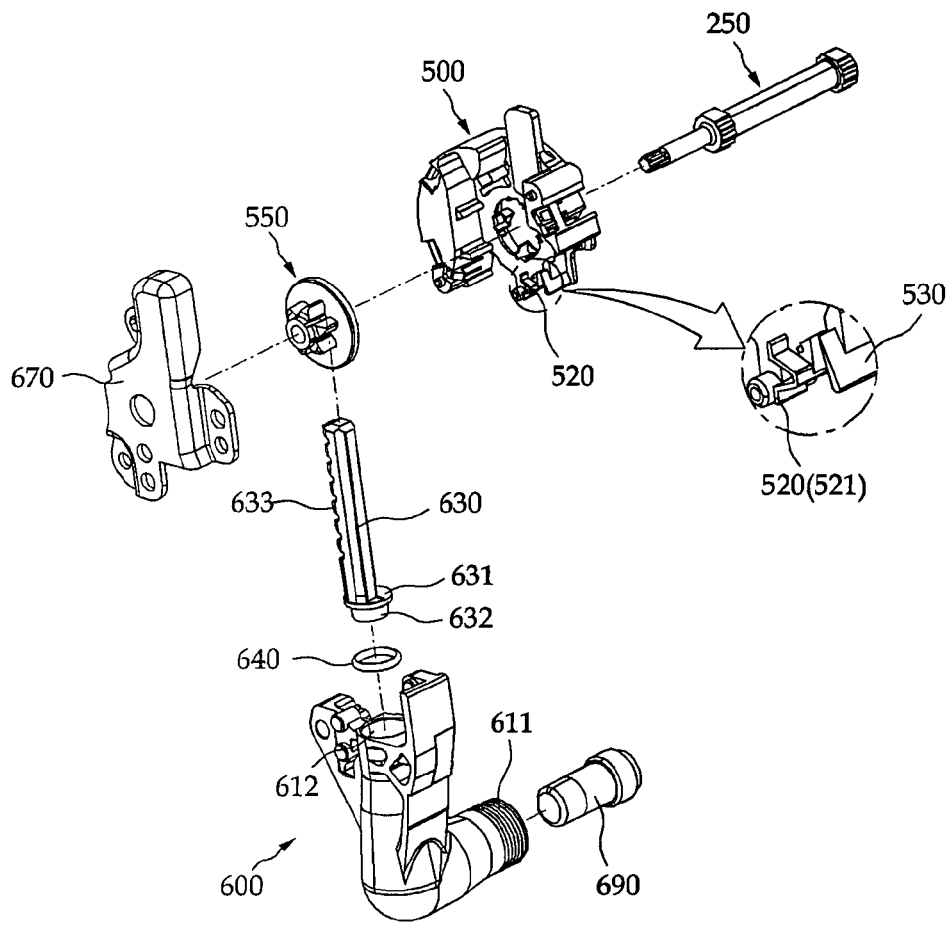
FIG. 26 is an exploded perspective view of FIG. 25.

As shown in FIG. 23, the clutch rollers 540 are rotated along the slant surface 555 of the slant gear 553, and the roller retainer 510 moves outward from the inner diameter 501 depending on movement of the clutch rollers 540.

The moved clutch rollers 540 are in contact with the roller engagement part 420 of the connector 400, and the clutch rollers 540 rotated along the slant surface 555 rotate the connector 400.

The connector 400 rotated in this manner rotates the guide drum 200 in a winding direction to rewind the webbing.

Therefore, the seat belt worn by a passenger is rewound in a rewinding direction of the retractor to reduce impact applied to the passenger.

As shown in FIGS. 24 to 27, the cylinder 600 of a pretensioner for a seat belt retractor has an L-shaped hollow part when seen from a side view. That is, a substantially L-shaped pipe is provided.

The L-shaped cylinder 600 has one hole acting as a gas supply port 611 connected to an inflator 690, and the other hole acting as a straight moving guide hole 612 through which a piston 630 reciprocates.

In accordance with the present invention, the straight moving guide hole 612 vertically extends, and a partially spherical rotation space 615 formed at a lower end of the moving guide hole 612 to be in communication with the gas supply port 611.

Upon assembly of the pretensioner, the sealing part 640 is positioned at a location in which a lower end of the moving guide hole 612 meets the partially spherical rotation space 615, and a rack 633 of the piston 630 is appropriately meshed with a gear member 550.

However, when the rack 633 of the piston 630 is coupled to a hooking means 520 in a state that the rack 633 is raised by one pitch, a gap (or a marginal space) corresponding to the pitch can be formed between the sealing part 640 and the moving guide hole 612.

In this case, a gas action space is increased by the gap to enlarge a space for temporarily storing a gas introduced into the moving guide hole 612, thereby providing margin time sufficient to apply an upward force.

The sealing part 640 may be formed of an O-ring or a plastic coating part.

Figure 27:
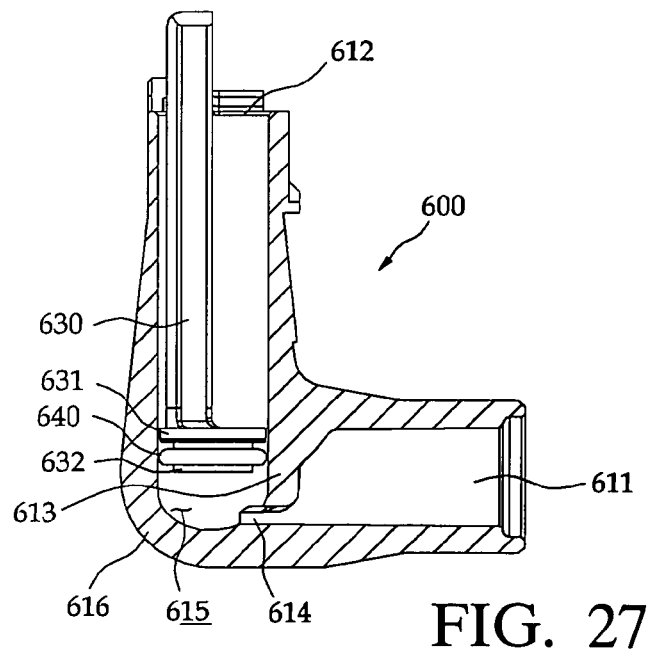
FIG. 27 is a cross-sectional view showing a piston assembled to the cylinder in accordance with the present invention.

In addition, since the piston 630 has a length of no more than 6-8 cm, in order to provide a substantial stroke to the piston, the straight moving guide hole 612 is required to have a length larger than that of the conventional art. For this purpose, as shown in FIG. 27, the straight moving guide hole 612 is formed to partially and vertically cross the gas supply port 611.

Further, the L-shaped cylinder 610 has a first thick part 613 disposed at an inner corner to form the straight moving guide hole 612, and an intermediate passage 614 formed between the first thick part 613 and the gas supply port 611. A gas passes through the intermediate passage 614 to press a lower end of the piston head 631 formed at a lower end of the piston 630.

Eventually, since the first thick part 613 causes the straight moving guide hole 612 to be deeper, a stroke of the piston 630 can be increased to sufficiently rotate the gear member 550.

Moreover, a partially spherical rotation space 615 is formed between a lower end of the straight moving guide hole 612 and the gas supply port 611 such that the gas passed through the gas supply port 611 and the intermediate passage 614 can be smoothly introduced into the moving guide hole 612.

A second thick part 616 may be formed around the partially spherical rotation space 615. Therefore, it is possible to prevent the outer corner part of the cylinder 600 from being broken by a high pressure gas.

The second thick part 616 may have a thickness gradually thinned from around the spherical rotation space 615 to both sides of the cylinder 600. Therefore, it is possible to reduce a volume of the cylinder 600 while maintaining its strength.

In the drawings, a structure of a pretensioner including a cylinder 600 in accordance with an exemplary embodiment of the present invention is partially illustrated.

As shown, the pretensioner in accordance with an exemplary embodiment of the present invention includes: a torsion bar 250 on which a webbing is wound, a gear member 550 connected to the torsion bar 250, the cylinder 600, a piston 630 moved along the moving guide hole 612 formed at a portion of the cylinder 600, and having a rack 633 formed at a side surface thereof in a longitudinal direction, a cylindrical sealing operation part 632 integrally formed with a bottom of the piston 630 and projecting therefrom; a sealing part 640 coupled to an outer periphery of the sealing operation part 632 to seal between the piston 630 and an inner wall of the cylinder 600; and a hooking means 520 for hooking the piston 630 at an initial hooking position.

In the drawings, reference numeral 690 designates an inflator 690 installed at a gas supply port 611 of the cylinder 600.

In the drawings, the sealing part 640 is an O-ring, but the sealing part 640 may be a plastic coating part.

The hooking means 520 is a position fixing piece 521 connected to the gear member 550, formed at a base member 500 through which the torsion bar 250 passes, and having a shape meshed with the rack 633 of the piston 630.

That is, the position fixing piece 521 is formed of a plate that is shaped to form the rack 633. Reinforcement plates 521a vertically extend upward and downward from upper and lower ends of the shaped plate.

Meanwhile, the base member 500 has a guide piece 530 opposite to the position fixing piece 521 with the piston 630 interposed therebetween. As shown, a surface of the guide piece 530 opposite to the piston 630 is parallel to the piston 630.

Moreover, a guide cover 670 is fixedly installed at the cylinder 600 to guide the piston 630. A guide surface parallel to the piston 630 is formed inside the guide cover 670.

As a result, when the vehicle is abruptly decelerated, e.g. due to collision, a gas is supplied into the cylinder 600 to move the piston 630 upward. Therefore, movement of the rack 633 formed at one side of the piston 630 causes rotation of the gear member 550 meshed with the rack 633 in a winding direction of the webbing.

When the gear member 550 is rotated in the winding direction of the webbing, the webbing is rewound on the torsion bar 250 to closely adhere a passenger to a seat.

Here, since a gas pressure is applied to an O-ring 640 when the piston 630 is moved by the gas pressure, there is no case that the sealing part 640 is pushed by the piston 630 to be separated from the sealing operation part 632. Therefore, the sealing part 640 seals between the piston 630 and the inner wall of the cylinder 600 to improve sealing performance between the piston 630 and the cylinder 600.

In addition, an insert groove (not shown) may be installed around the sealing operation part 632 to securely install the sealing part 640 therein.

Further, when a gap (or a marginal space) is formed between the sealing part and the lower end of the straight moving guide hole 612, a space for temporarily storing a gas introduced into the moving guide hole of the piston is expanded to provide marginal time to sufficiently apply an upward force. Therefore, the gas discharged from the gas supply port 611 causes an increase in the upward force by the gas pressure applied to the piston head 631.

Hereinafter, a leaf spring installed in the locking clutch in accordance with the present invention will be described.

Figure 28:
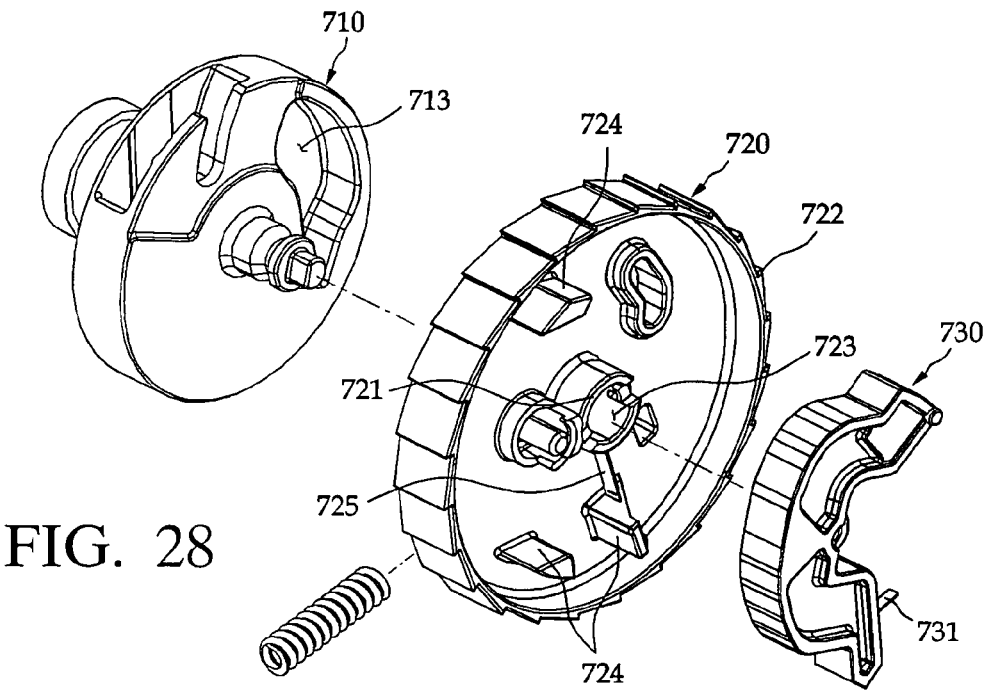
FIG. 28 is an exploded perspective view of a locking member coupling structure of the seat belt retractor in accordance with the present invention.
Figure 29:
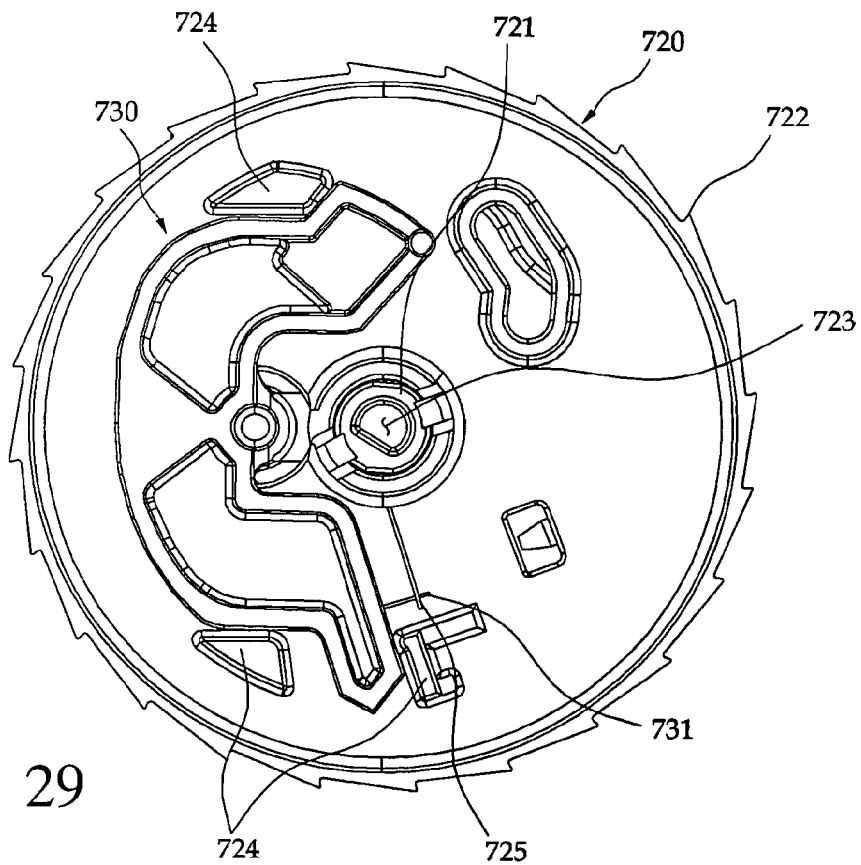
FIG. 29 is a side view of the locking member coupling structure of a seat belt retractor in accordance with a first exemplary embodiment of the present invention.

FIG. 28 is an exploded perspective view of a locking member coupling structure of the seat belt retractor in accordance with the present invention, and FIG. 29 is a side view of the locking member coupling structure of a seat belt retractor in accordance with a first exemplary embodiment of the present invention.

First Embodiment

As shown in FIGS. 28 and 29, a locking member coupling structure of the seat belt retractor in accordance with the present invention includes a leaf spring 725 fixed to a boss 721 of a locking clutch 720, and a fixing piece 731 projecting from a lock arm 730 to fix the leaf spring 725.

In this embodiment, a locking member 700 is installed at the seat belt retractor to allow a webbing to be smoothly released or rewound when the webbing is released with a normal speed, and prevent the webbing from being released or rewound when the webbing is rapidly released or rewound.

The locking member 700 includes a guide drum 200 rotatably installed at a housing 100 constituting a main body of the seat belt retractor, a locking base 710 fixed to one side of the guide drum 200, a locking clutch 720 rotatably engaged with one side of the locking base 710, and the lock arm 730 installed at one side of the locking clutch 720 to be pivoted to a limited angle.

As shown in FIGS. 28 and 29, the locking clutch 720 is formed of a circular plate having a predetermined thickness. A latch 722 is formed at an outer periphery of the cireular plate, a through-hole 723 is formed at a center of the locking clutch 720 to be inserted into the locking base 710, and a boss 721 is formed outside the through-hole 723 to project from one surface of the locking clutch 720.

One end of the leaf spring 725 having a predetermined length is fixed to the boss 721, and the other end of the leaf spring 725 extends toward a stopper 724 spaced apart therefrom. The other end of the leaf spring 725 is fixed to a fixing piece 731 of the lock arm 730, and the stopper 724 is formed at a predetermined position of one surface, from which the boss 721 projects, to limit rotation of the lock arm 730.

A projection piece (not shown) is formed at the other surface of the locking clutch 720 to be inserted into a groove 713 formed in the locking base 710, and a spring (not shown) having a predetermined elasticity is coupled to the projection piece.

In addition, the leaf spring 725 is fixed to the boss 721 at its one end. The leaf spring 725 may be fixedly inserted into a groove or a hole formed in the boss 721, or may be wound along an outer periphery of the boss 721 to be fixed to the groove or the hole formed at the boss 721 at its one end.

Further, the fixing piece 731 projecting toward the leaf spring 725 is formed at a predetermined position of the lock arm 730, i.e., a surface thereof in contact with the leaf spring 725. A hole or groove is formed in the fixing piece 731 to fix the leaf spring 725.

In the locking member coupling structure of the seat belt retractor in accordance with the present invention, the locking base 710 is fixedly inserted into one surface of the guide drum 200, and the locking clutch 720 is pivotally coupled to one surface of the locking base 710 to a predetermined angle.

In addition, the lock arm 730 is pivotally coupled to one surface of the locking clutch 720 to a predetermined angle, and a mechanism cover 900 is fixed to an outer side of the locking clutch 720.

One end of the leaf spring 725 coupled to the locking clutch 720 is fixedly inserted into the groove or hole formed in the boss 721, the other end of the leaf spring 725 is fixed to the groove or hole formed in the fixing piece 731.

Therefore, the webbing is rewound in a state that the webbing is pulled or extracted by a passenger. Since release and rewinding of the webbing is a basic operation of the seat belt retractor, it will be briefly described.

That is, when the passenger pulls the webbing with an appropriate force to wear the webbing, the guide drum 200 is rotated to extract the webbing. When the passenger removes his/her hand, the webbing is rewound by a recovering force of the spring installed in a spring case (not shown) coupled to the seat belt retractor.

When the guide drum is abruptly rotated while the webbing is released or rewound, the seat belt retractor limits the webbing release or rewinding operation.

The locking base 710 and the locking clutch 720 are rotated with the guide drum 200 when the webbing is released or rewound, and the lock arm 730 installed at the locking clutch 720 is pivoted within a limited angular range.

That is, when the passenger pulls the webbing with a normal speed, not an excessive speed, the locking base 710, the locking clutch 720 and the lock arm 730 of the locking member 700 are rotated with the rotation of the guide drum 200.

When the webbing is rapidly pulled on the rotation of the rocking member 700, rotational inertia (moment) is generated from the locking member 700 to rotate the lock arm 730 installed in the locking clutch 720.

The rotated lock arm 730 is hooked by the latch of the mechanism cover 900 to prevent the webbing from being released.

On the other hand, when the webbing extraction speed is increased on the rotation of the locking member 700, rotational inertia is generated from the locking member 700 to operate a pawl 740 coupled to the locking base 710.

The magnitude of the rotational inertia (moment) applied to the lock arm 730 and the pawl 740 of the locking base 710 is varied depending on a pulling speed and a rotational force. The lock arm 730 and the pawl 740 are separately operated depending on the moment to stop the winding and release of the webbing.

Second Embodiment

Figure 30:
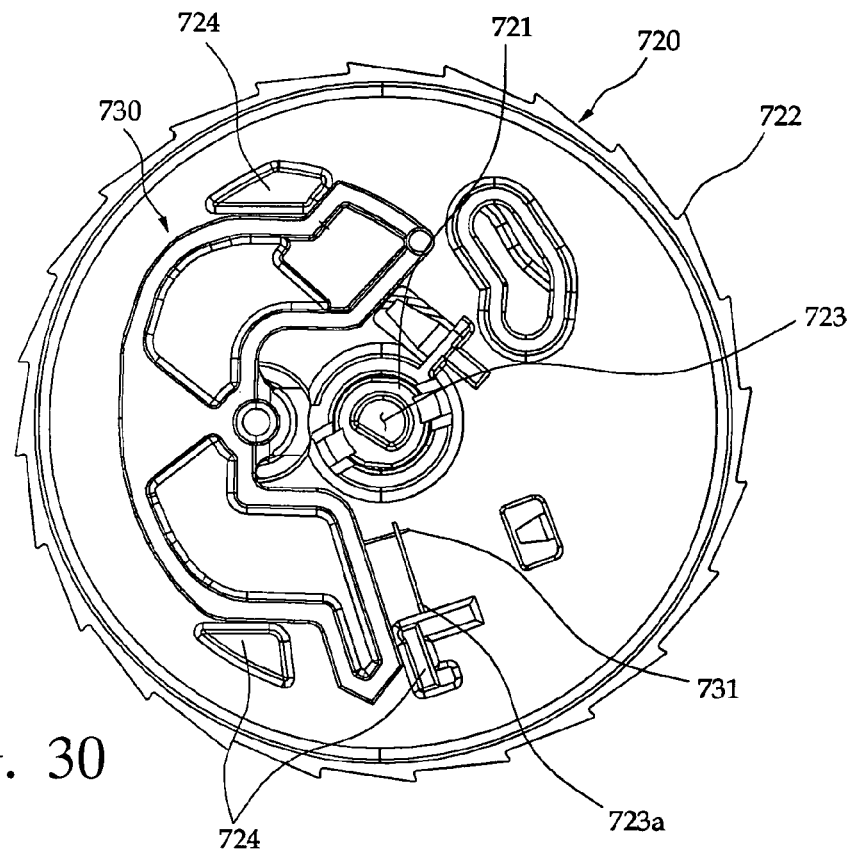
FIG. 30 is a side view of a locking member coupling structure of a seat belt retractor in accordance with a second exemplary embodiment of the present invention.

FIG. 30 is a side view of a locking member coupling structure of a seat belt retractor in accordance with a second exemplary embodiment of the present invention.

In this second embodiment, like reference numerals designate like components in the first embodiment, and descriptions thereof will be omitted.

In contrast to the first embodiment, one end of a leaf spring 725a of the second embodiment is fixed to a stopper 724 in the vicinity of a boss 721. That is, though one end of the leaf spring 725a of the first embodiment is fixed to the boss 721, one end of the leaf spring 725a of the second embodiment is fixed to the stopper 724, and the other end of the leaf spring 725a is fixed to a fixing piece 731 of a lock aim 730.

Since the leaf spring 725a of the second embodiment is fixed to a different position than the first embodiment and the locking clutch 720 and the lock arm 730 are operated in the same manner as the first embodiment, a description thereof will be omitted.

Third Embodiment

A third embodiment of the present invention will be described with reference to FIG. 31.

Figure 31:
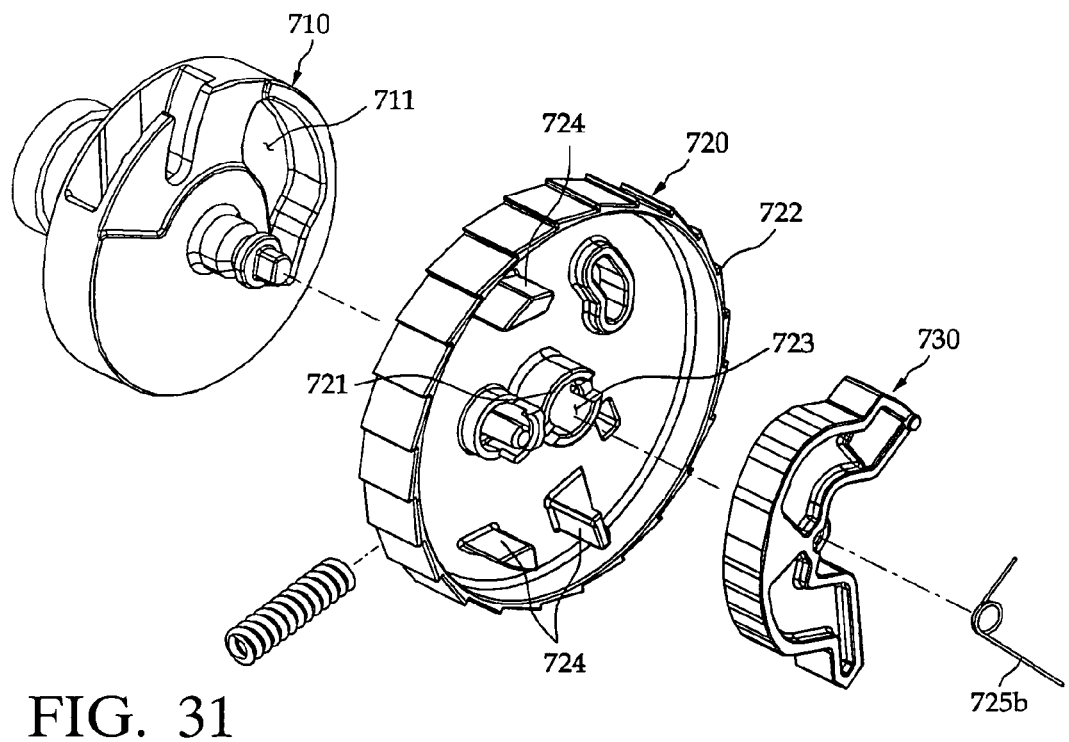
FIG. 31 is an exploded perspective view of a leaf spring in accordance with a third exemplary embodiment of the present invention.

As shown in FIG. 31, one end of a torsion spring 725b is in contact with one side of a lock arm 730. The torsion spring 725b extends in a rotation center direction of the lock arm 730 to be wound on a rotation center of the lock arm 730 at its intermediate portion in a circular or arcuate shape. The other end of the torsion spring 725b is fixed to one side of a stopper 724.

That is, the torsion spring 725b extends from both ends thereof to form a predetermined angle in a symmetrical manner with reference to a rotation center of the lock arm 730 such that one end is in contact with the lock arm 730 and the other end is fixed to the stopper 724.

The one end of the fixed torsion spring 725b is a free end such that the lock arm can be pivoted within a limited angular range, and the other end of the torsion spring 725b is an end securely fixed to the stopper 724.

Similar to the first embodiment, the one end of the torsion spring 725b is freely and resiliently moved depending on pivotal movement of the lock arm 730, and the other end is securely fixed to the stopper 724 to make it possible for the lock arm 730 to be operated by rotation inertia, thereby preventing the webbing from being rapidly released or rewound.

Operation of the lock arm 730 is similar to the first embodiment or the second embodiment, and thus a description thereof will not be repeated.

Fourth Embodiment

Figure 32:
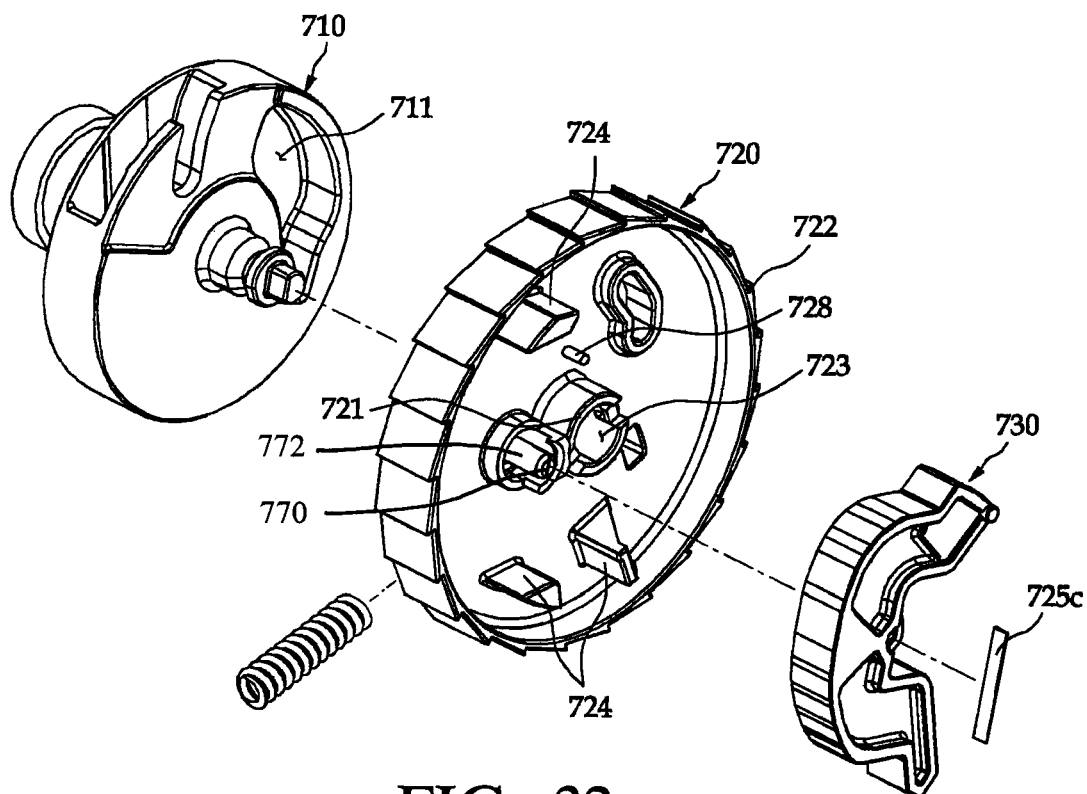
FIG. 32 is an exploded perspective view of a leaf spring in accordance with a fourth exemplary embodiment of the present invention.

A fourth embodiment in accordance with the present invention will be described with reference to FIG. 32, and description of components in this embodiment that are the same as above embodiments will not be repeated.

One end of a leaf spring 725c of the fourth embodiment engages a lock arm 730, and the other end of the leaf spring 725c crosses a rotation center of the lock arm 730 to be fixed to one side of a fixing projection 728 projecting from a locking clutch 720.

That is, the one end of the leaf spring 725c is engaged with the lock arm 730, and the leaf spring 725c passes the rotation center of the lock arm 730 to be fixed to one side of the fixing projection 728 projecting from the locking clutch 720 and is inserted into a straight slit 770 formed in a mounting boss 772 projecting from the surface of the locking clutch 720 and coinciding with the center of rotation of the lock arm 730.

The one end of the leaf spring 725c of the fourth embodiment is freely and resiliently moved depending on pivotal movement of the lock arm 730, and the other end is fixed to the fixing projection 728 to make it possible for the lock arm 730 to be operated by rotation inertia, thereby preventing the webbing from being rapidly released or rewound.

Fifth Embodiment

Figure 33:
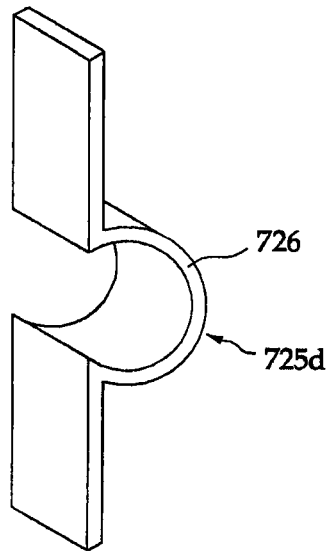
FIG. 33 is a perspective view of a leaf spring in accordance with a fifth exemplary embodiment of the present invention.

FIG. 33 is a perspective view of a leaf spring in accordance with a fifth exemplary embodiment of the present invention.

A leaf spring 725d of the fifth embodiment has an arcuate curved part 726 formed at its intermediate part.

The arcuate curved part 726 of the fifth embodiment may be formed at an intermediate part of the leaf spring 725, 725a or 725c of the above embodiment. In the third embodiment, the torsion spring 725b may have the curved part 726 formed between the rotation center of the lock arm 730 and a tip of the torsion spring 725b, in addition to a coiled part surrounding the rotation center of the lock arm 730.

The curved part 726 can increase resilience of the springs 725, 725a, 725b, and 725c, and prevent deformation of the springs 725, 725a, 725b, and 725c and maintain resilience thereof even though the springs 725, 725a, 725b, and 725c may be used for a long time.

Operation of the locking clutch 720 and the lock arm 730 of the fifth embodiment is similar to the above embodiments, and thus a description thereof will not be repeated.

Sixth Embodiment

Figure 34:
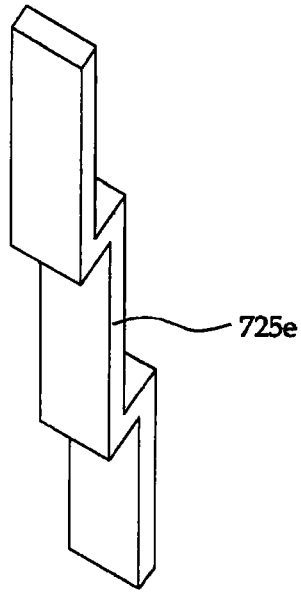
FIG. 34 is a perspective view of a leaf spring in accordance with a sixth exemplary embodiment of the present invention.

FIG. 34 is a perspective view of a leaf spring in accordance with a sixth exemplary embodiment of the present invention.

A leaf spring 725e of the sixth embodiment has a multi-stage structure. Operation of the locking clutch 720 and the lock arm 730 of the sixth embodiment is similar to the above embodiments, and thus a description thereof will not be repeated.

Figure 35:
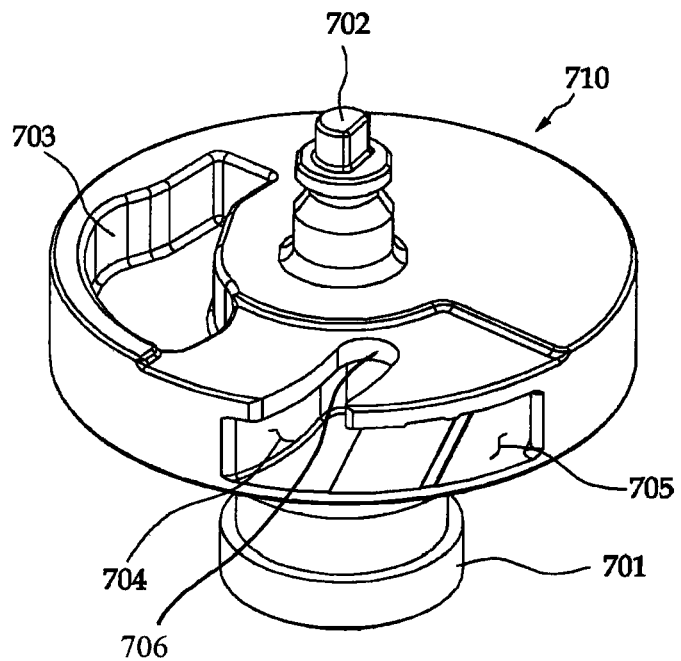
FIG. 35 is a perspective view of a locking base in accordance with the present invention.
Figure 36:
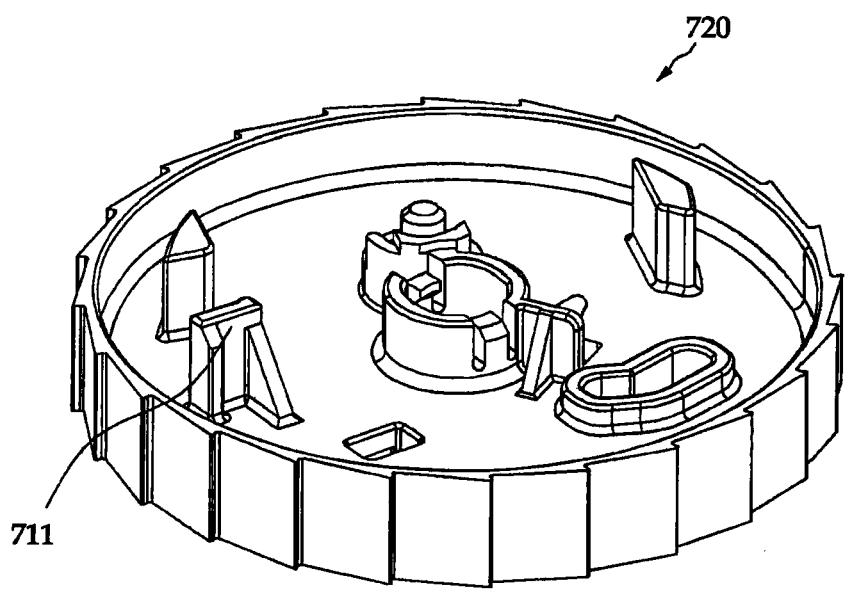
FIG. 36 is a perspective view of a locking clutch in accordance with the present invention.
Figure 37:
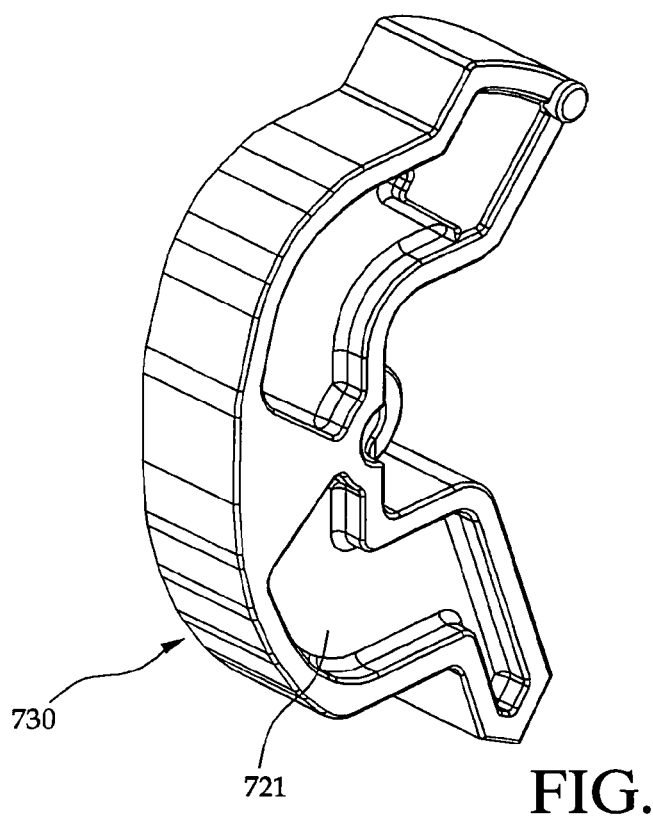
FIG. 37 is a perspective view of a lock arm in accordance with the present invention.
Figure 38:
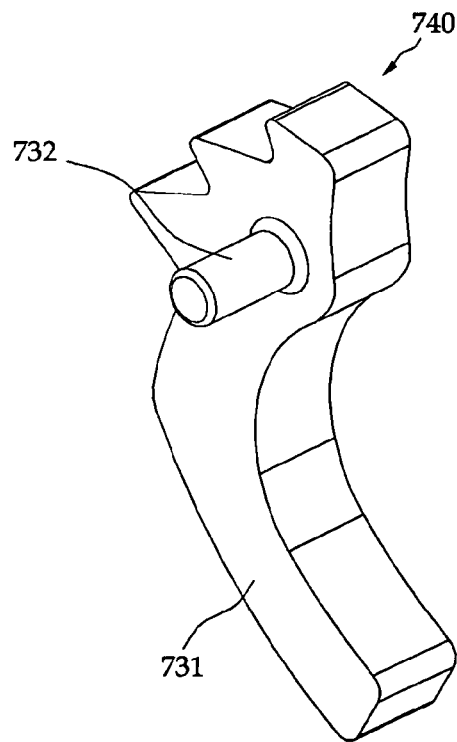
FIG. 38 is a perspective view of a pawl in accordance with the present invention.
Figure 39:
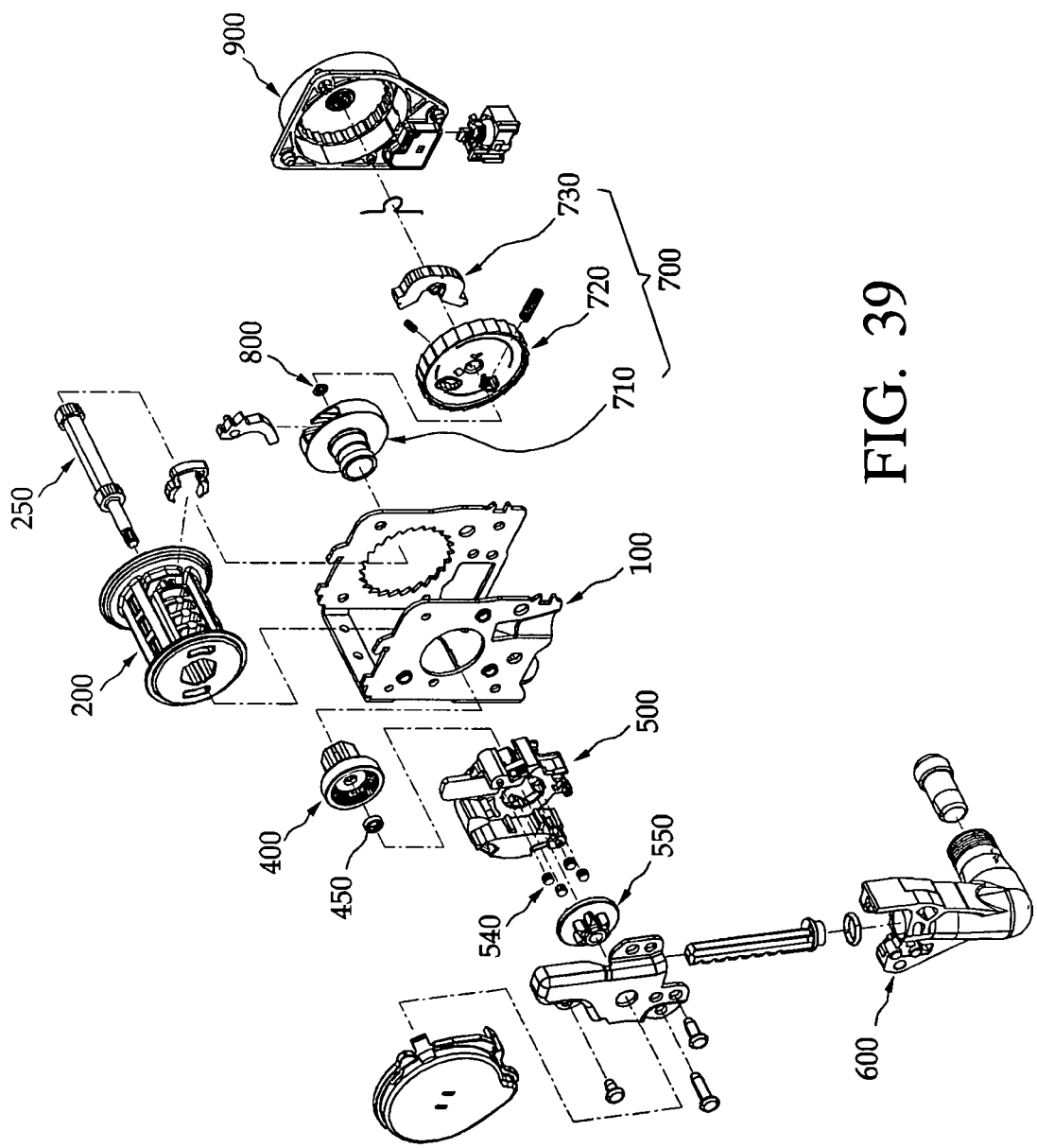
FIG. 39 is an exploded perspective view of a seat belt retractor in accordance with the present invention.
Figure 40:
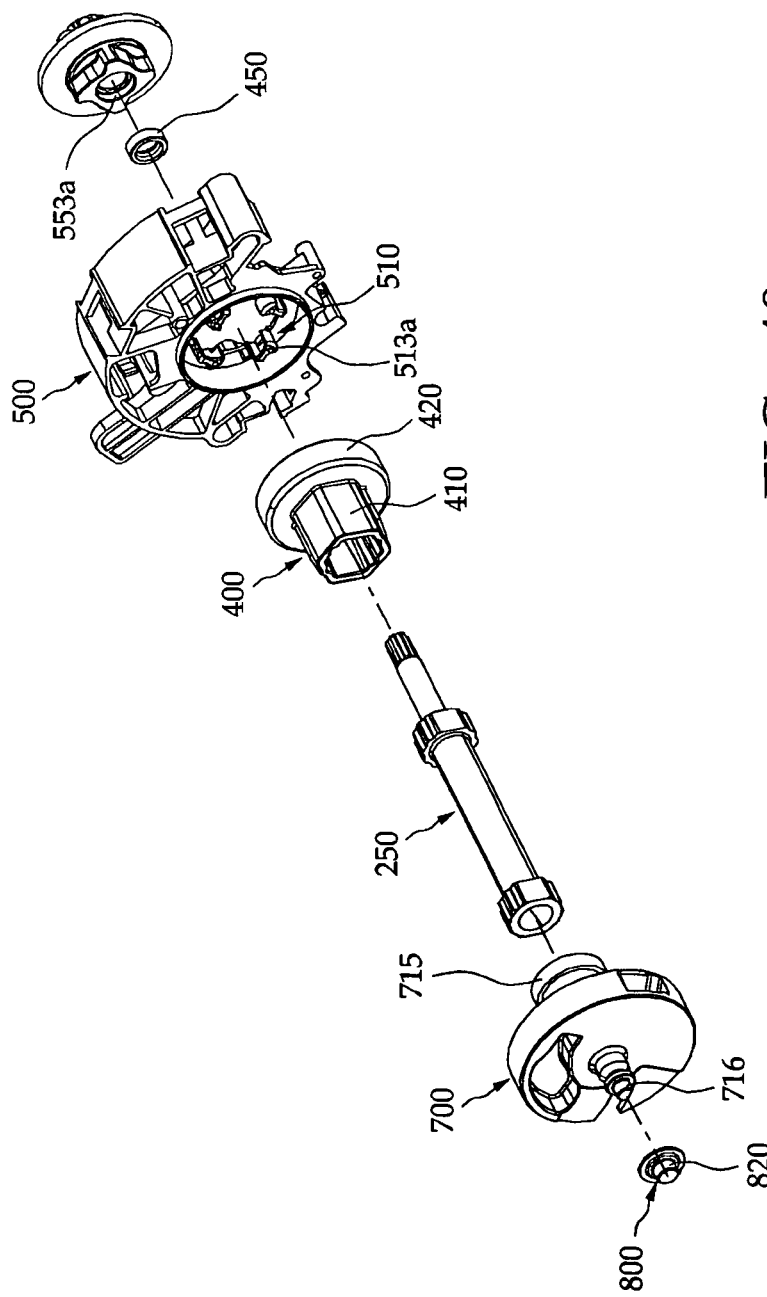
FIG. 40 is an exploded perspective view of a torsion bar support structure in accordance with the present invention.
Figure 41:
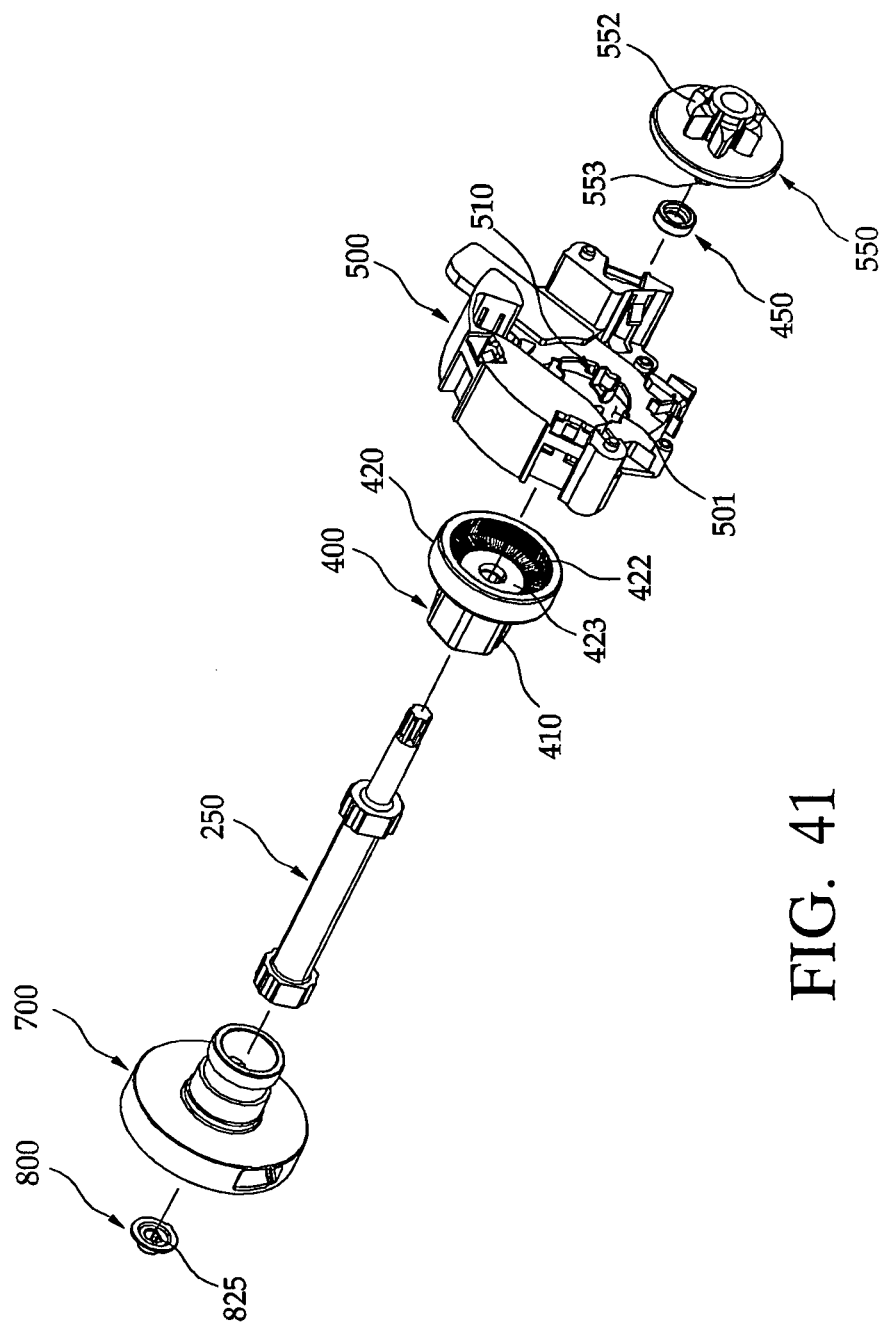
FIG. 41 is an exploded perspective view of the torsion bar support structure in accordance with the present invention.
Figure 42:
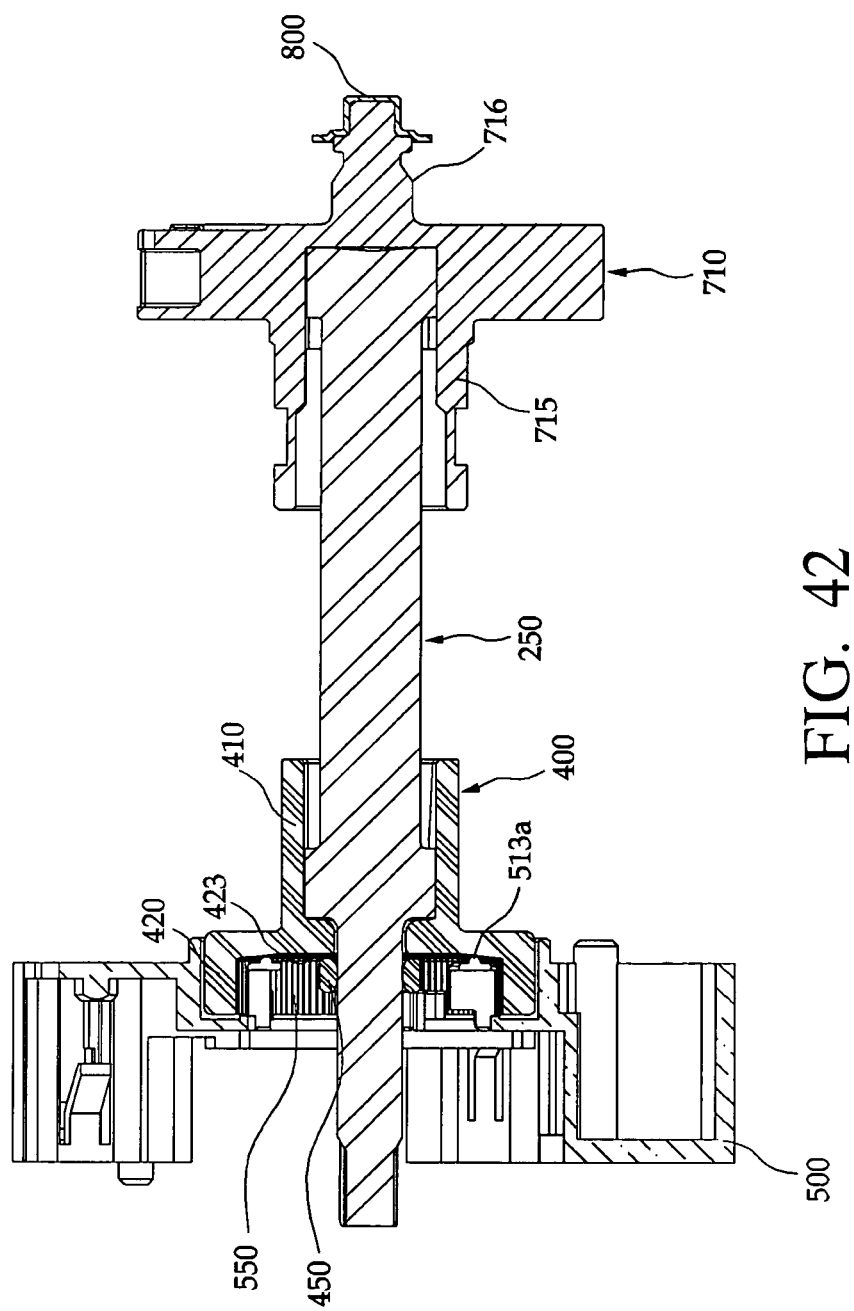
FIG. 42 is a cross-sectional view of the torsion bar support structure in accordance with the present invention.
Figure 43:
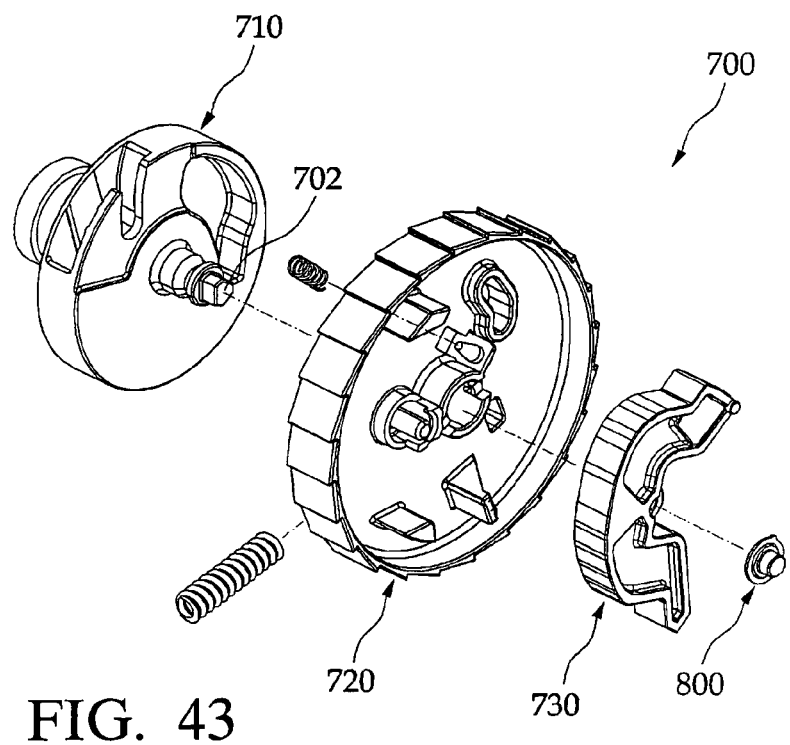
FIG. 43 is an exploded perspective view showing an assembly structure of a cap in accordance with the present invention.

FIG. 35 is a perspective view of a locking base 710 in accordance with the present invention, FIG. 36 is a perspective view of a locking clutch 720 in accordance with the present invention, FIG. 37 is a perspective view of a lock arm 730 in accordance with the present invention, and FIG. 38 is a perspective view of a pawl 740 in accordance with the present invention.

Descriptions similar to the conventional art will not be repeated, and only novel features of the present invention will be described.

The locking base 710 shown in FIG. 35 is coupled to a torsion bar through a coupling part 701, and a fixing part 702 is inserted into a through-hole of the locking clutch 720 shown in FIG. 36.

In addition, a return spring insert is formed in the locking base 710. In contrast to the conventional art, since the pawl operation part 704 has a guide groove 706 for inserting the pawl 740 to increase a reaction speed of the pawl 740 due to a small contact area of the pawl operation part 704 and the pawl 740, and a spoke reinforcement part 705, it is possible to increase strength of the locking base 710.

That is, since the spoke reinforcement part 705 is integrally formed with the locking base 710, rather than separately providing a cover for guiding the pawl 740, it is possible to prevent distortion breakage of the locking base interlocking with the rotation of the torsion bar.

Further, as shown in FIG. 38, the pawl 740 includes a pawl main body 741, and an interlocking pin 732 projecting from the pawl main body 741. In contrast to the conventional art providing a stopper projecting from the main body, the pawl main body 741 is formed of a single curved surface. In addition, the pawl main body 741 formed of the single curved surface has an outer diameter substantially equal to or slightly smaller than an inner diameter of the guide groove for inserting and guiding the pawl 740 in the pawl operation part 704.

Therefore, in contrast to the conventional art, since the pawl operation part 704 for providing a space, in which the pawl main body 741 is inserted and moved, is filled with a locking base forming member rather than forming a space for moving the stopper, it is possible to increase strength of the locking base.

Further, in the locking clutch 720 shown in FIG. 36 in accordance with the present invention, the locking base 710 is press fitted into a lower part of the locking clutch 720, the lock arm 730 is press fitted into an upper part, and a friction spring hooking part 711 is formed at a portion of the locking clutch 720 into which the lock arm 730 is press fitted, such that a friction spring 950 (see FIGS. 1 and 2) is hooked to be operated only when the webbing is rewound, and not operated when the webbing is extracted.

As shown in FIG. 36, the friction spring hooking part 711 has a "C" shape and integrally formed with a main body of the locking clutch 720.

As shown in FIG. 37, two grooves 721 are formed at a front surface and a rear surface of the lock arm 730 adapted to the emergency locking mechanism for a seat belt retractor in accordance with the present invention. The reason for forming only the two grooves 721 at the lock arm 730 is that the weight of the conventional lock arm can be decreased by omitting support parts formed between a plurality of grooves formed at the lock arm. As described above, reduction in the weight of the lock arm 730 decreases power applied to the release bias spring to maintain a resilient force of the spring for a long time.

Hereinafter, the coupling structure and operation of the emergency locking mechanism for a seat belt retractor shown in FIGS. 35 to 38 will be described.

The locking clutch 720 having a circular disc shape shown in FIG. 36 is rotatably coupled with one side of the locking base 710 through a fixing part 702, and the pawl 740 is inserted into the pawl operation part 704 formed in the locking base 710. That is, the pawl main body 741 formed of a single curved surface is inserted into the guide groove formed at the pawl operation part 704.

The friction spring hooking part 711 projects from one surface of the locking clutch 720, and the friction spring is hooked by the friction spring hooking part 711 to be operated only when the webbing is rewound, and not operated when the webbing is extracted.

In addition, the return spring is mounted on the other surface of the locking clutch 720 to be inserted into the return spring insert part 703 in a relatively movable manner. The return spring allows the locking clutch 720 to be synchronically rotated with the locking base 710 in a state that the locking clutch 720 applies power in an extraction direction of the webbing.

Further, the locking clutch 720 has the guide groove in which the interlocking pin 732 projecting from the pawl main body 741 of the pawl 740 is slidably guided, and relative rotation between the locking base 710 and the locking clutch 720 against the power of the return spring causes the interlocking pin 732 to be slidably guided along the guide groove.

Furthermore, the locking clutch 720 includes a swing stopper for defining a swing range of the lock arm 730, and a release bias spring installed between the locking clutch 720 and the lock arm 730 to bias power in a direction of hooking or releasing the lock arm 730. Since only two grooves 721 are formed at the lock arm 730, the weight of the lock arm 730 can be reduced to maintain a resilient force of the spring for a long time.

That is, when a user extracts the webbing to rotate the guide drum and therefore rotate the torsion bar and the locking base 710, the locking clutch 720 is synchronically rotated by a resilient force of the return spring.

In addition, when the webbing is rewound to rotate the locking base 710, pushing power of the returning spring causes the locking clutch 720 to be synchronically rotated.

Therefore, when the webbing is abruptly extracted and the locking clutch 720 is synchronically rotated, rotation of the lock arm 730 does not follow the synchronized rotation against the power applied by the spring to generate inertia delay behind the rotational direction, thereby preventing synchronized rotation of the locking clutch 720.

In addition, the constitution of the pawl operation part 704 reinforces strength of the locking base 710 to enable smooth extraction and rewinding of the webbing, and prevent the webbing from being hooked by the mechanism cover.

As shown in FIGS. 39 to 43, a torsion bar support structure of the seat belt retractor in accordance with the present invention includes a housing 100 constituting a main body of the seat belt retractor, a guide drum 200 rotatably coupled to the housing 100, and a torsion bar 250 inserted into the guide drum 200.

In addition, the torsion bar support structure of a seat belt retractor in accordance with the present invention includes a base member 500 fixed to one side of the housing 100, a locking member 700 fixed to the other side of the housing 100, a bearing member 450 installed to one side of the torsion bar 250, a cap 800 installed at one side of the locking member 700, and a mechanism cover 900 fixed to a tip of the torsion bar 250.

A webbing for restraining a passenger is wound on the guide drum 200, and the torsion bar is inserted into a center of the guide drum 200. The torsion bar 250 is rotated with the guide drum 200, and plastically deformed by distortion and rotation moment applied to the guide drum 200 in a state that the webbing is restrained, thereby absorbing energy applied to the seat belt retractor.

The torsion bar 250 is longer than the guide drum 200. The connector 400 is installed at one side of the torsion bar, and the locking member 700 is installed at the other side thereof.

The connector 400 includes a torsion bar coupling pipe 410 inserted into the torsion bar 250, and a roller engagement part 420 extending from the torsion bar coupling pipe 410.

The connector 400 is disposed at one side of the guide drum 200 to be rotated with the torsion bar 250.

The locking member 700 includes a locking base 710 installed at one side of the guide drum 200, a locking clutch 720 fixed to one side of the locking base 710, and a lock arm 730 coupled to one side of the locking clutch 720.

In addition, the torsion bar coupling pipe 410 is inserted into one side of the torsion bar 250, and the roller engagement part 420 is installed to surround clutch rollers 540 engaged with the base member 500.

Specifically, the roller engagement part 420 has an internal gear 422 formed at its inner periphery. The internal gear 422 has a diameter larger than that of the torsion bar coupling pipe 410 to form a vertical inner surface 423 between the torsion bar coupling pipe 410 and the internal gear 422.

In addition, the clutch roller 540 coupled to the base member 500 has teeth formed at its outer surface, and the base member 500 has a roller retainer 510 to stably fix the clutch roller 540.

The roller retainer 510 is formed to project from one surface thereof along an inner center diameter of the base member 500, and has projections 513*a* projecting from its surface to form a semi-spherical shape. The projections 513*a* is in close contact with an inner surface 423 of the connector 400.

In addition, the base member 500 is engaged with a gear member 550 to rotate the clutch rollers 540. The gear member 550 includes a pinion gear 552 projecting from one side surface of a circular plate, and a slant gear 553 formed at the other side surface and in contact with the clutch rollers 540.

The torsion bar 250 passes through the gear member 550, and a bearing insertion groove 553*a* is formed at an inner side of the slant gear to insert a bearing member 450.

Specifically, the bearing member 450 is fixedly inserted into the bearing insertion groove 553*a* such that the torsion bar 250 is rotatably engaged therewith. Since the bearing member 450 is disposed between the torsion bar 250 and the gear member 550, the bearing member 450 may be formed of a synthetic resin material in order to prevent noise during rotation of the torsion bar 250 and wearing due to friction thereof.

In addition, a cylinder 600 having a piston 630 therein is installed at the gear member 550 to raise the piston 630 and rotate the pinion gear 552 meshed with the piston 630.

Further, the locking member 700 is installed to the other side of the guide drum 200 to stop rotation of the guide drum 200, and the locking base 710 is inserted into the guide drum 200.

The locking base 710 and the locking clutch 720 are rotated with the guide drum 200. When the guide drum 200 is abruptly operated, a pawl coupled to the locking base 710 is hooked by a latch of the housing 100 to stop rotation of the guide drum 200.

In addition, the locking base 710 includes a drum fixing shaft 715 disposed at one side thereof and inserted into the guide drum 200, and a cover fixing shaft 716 disposed at the other side and coupled to the mechanism cover 900.

The cap 800 formed of a synthetic resin material is capped onto the cover fixing shaft 716. The cap 800 has a first projection 820 formed at one side thereof and rotatably inserted into a groove of the mechanism cover 900, and an insertion groove 825 formed at a surface opposite to the first projection 820 and fixed to the cover fixing shaft 716.

Therefore, the torsion bar support structure of a seat belt retractor in accordance with the present invention can allow a passenger to pull the webbing so that the webbing is released or rewound.

The guide drum 200 and the torsion bar 250 are rotated during normal operation of releasing or rewinding the webbing. At this time, both ends of the torsion bar 150 are supported and rotated by the gear member 550 and the locking member 700 installed to both sides of the housing 100.

The torsion bar 250 can be smoothly rotated by the bearing member 450 installed at the gear member 550 and the cap 800 installed at the locking base 710.

Specifically, the bearing member 450 is inserted between the torsion bar 250 and the gear member 550 such that they can be rotated without friction and wearing. The cap 800 is inserted between the locking base 710 and the mechanism cover 900 such that they can be rotated without friction and wearing, thereby smoothly rotating the torsion bar 250.

In addition, when the webbing is abruptly pulled to be fixed in a tensed state, that is, in a state that release of the webbing is stopped, strong tension is applied to the webbing, and the tension is transmitted to the rotary bodies, i.e., the guide drum 200 and the torsion bar 250.

At this time, since the guide drum 200 is fixed to the housing 100, the torque is transmitted to the guide drum 200, and the torsion bar 250 receives the tension force of the webbing to receive rotational displacement and torque.

Therefore, although the torsion bar 250 maintains an initial installation state due to its own strength, without deformation by the torque, when a stronger torque than the strength of the torsion bar 250 is applied to the torsion bar 250, the torsion bar 250 may be plastically deformed.

Although the torsion bar 250 is plastically deformed, the torsion bar 250 has to maintain the initial installation state. Therefore, one end of the torsion bar 250 should be rotated while maintaining the installation state by the bearing member 450 fixed to the gear member 550.

In addition, since the other end of the torsion bar 250 is fixed to the locking base 710 and rotated therewith, the torsion bar 250 may be plastically deformed in place without position variation.

At this time, rotation moment applied to the torsion bar 250 is applied on the line passing through the bearing member 450 and the cap 800 to prevent deformation of the torsion bar 250.

In addition, the projection 513a of the base member 500 is in contact with the inner surface 423 of the connector 400, and the torsion bar 250 can be smoothly rotated by the moment applied in an axial direction thereof.

Figure 44:
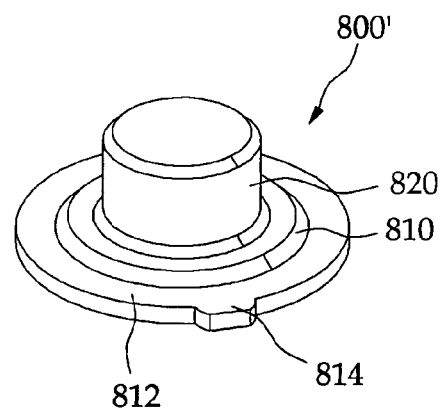
FIG. 44 is a perspective view of a cap in accordance with the present invention.
Figure 44:
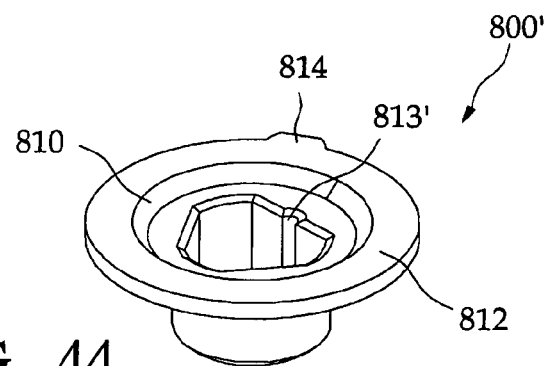
Figure 45:
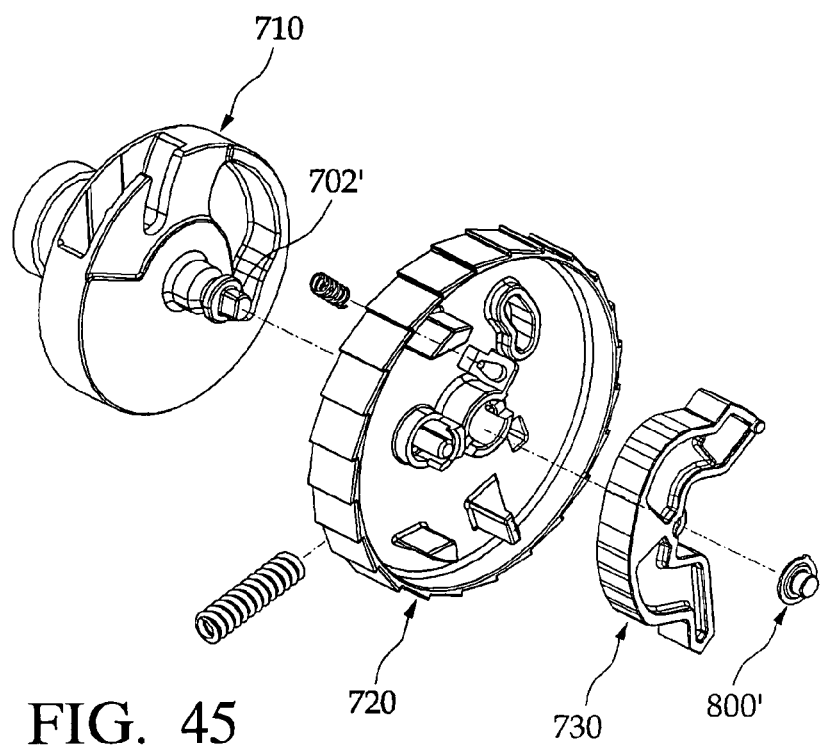
FIG. 45 is an exploded perspective view showing an assembly structure of a cap in accordance with another exemplary embodiment of the present invention.
Figure 46:
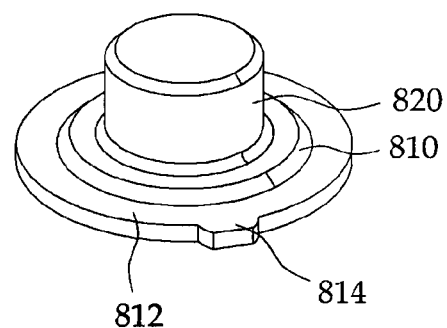
FIG. 46 is a perspective view of a cap in accordance with another exemplary embodiment of the present invention.
Figure 46:
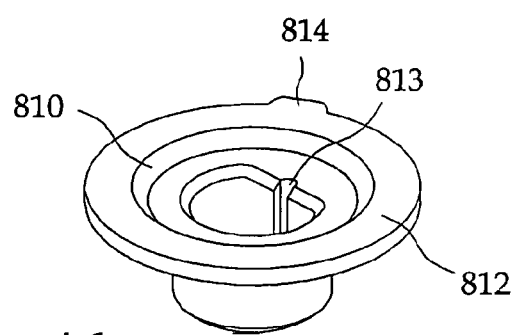
Figure 47:
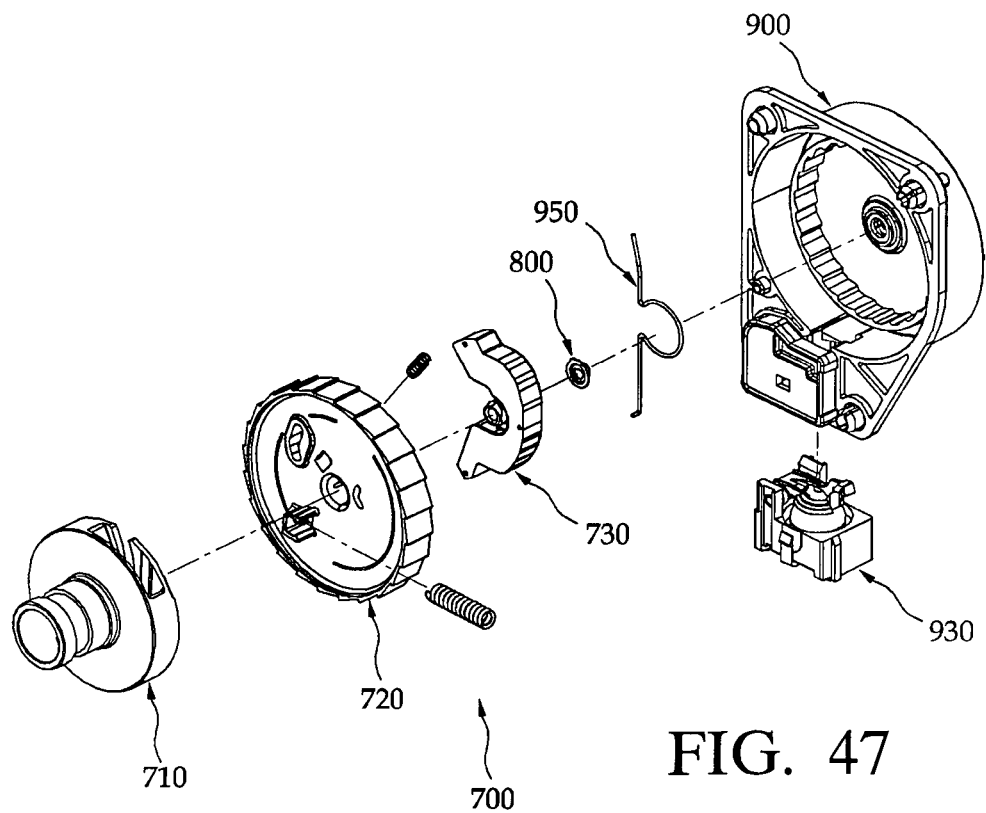
FIG. 47 is an exploded perspective view of a mechanism cover and its connection structure in accordance with the present invention.
Figure 48:
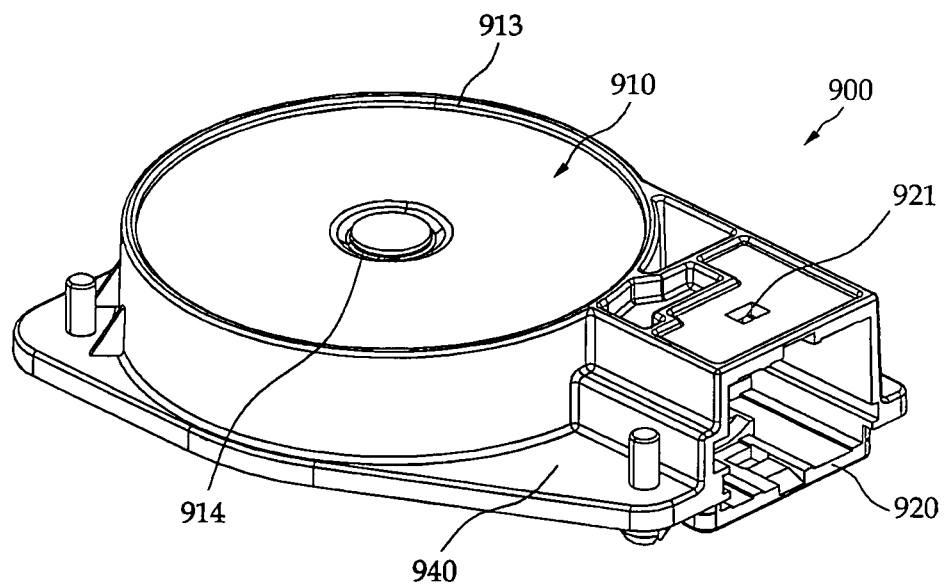
FIG. 48 is a perspective view of the mechanism cover in accordance with the present invention, when seen from one direction.
Figure 49:
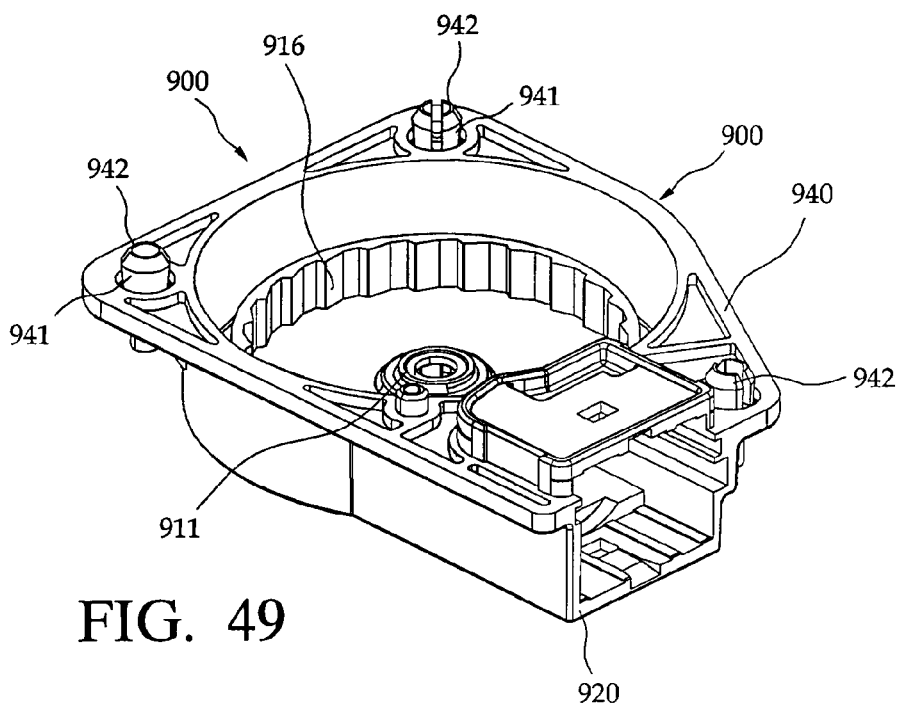
FIG. 49 is a perspective view of the mechanism cover in accordance with the present invention, when seen from the other direction.
Figure 50:
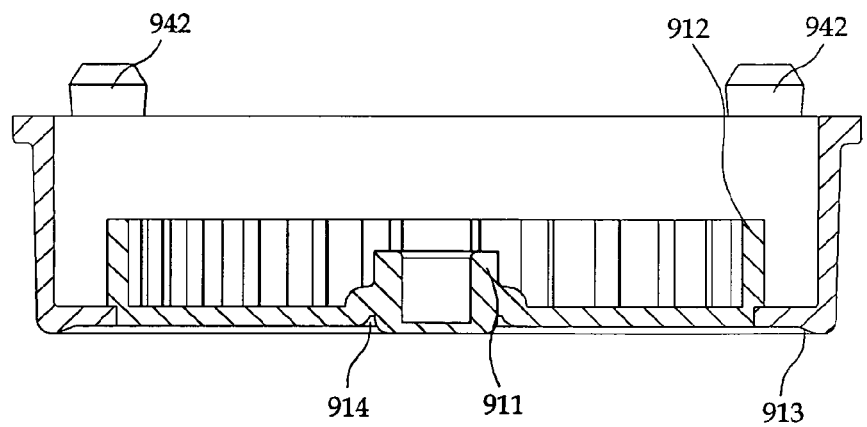
FIG. 50 is a cross-sectional view of a locking clutch assembly in accordance with the present invention.
Figure 50:
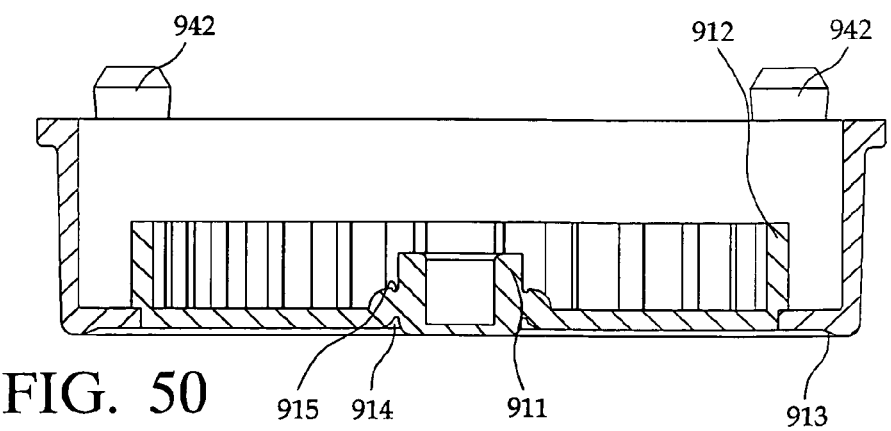

As shown in FIGS. 44 to 46, a cap 800 has a second projection 810 projecting from a circular base 812, and the first projection 820 projecting from the second projection 810. The circular base 812, the second projection 810, and the first projection 820 are disposed in a concentric manner.

In addition, the second projection 810 projecting from the base 812 of the cap 800 has a smaller diameter than the base 812, and the first projection 820 projecting from the second projection 810 has a smaller diameter than the second projection 810. The first projection 820 has a larger height that the second projection 810.

Further, as shown, the cap 800 is inserted into the fixing part 702 of the locking member 700 to which the locking clutch 720 is inserted. Here, the second projection 810 of the cap 800 is inserted into a center groove of the mechanism cover 900 assembled thereafter to prevent movement due to rotation thereof and support a friction spring 950 such that the friction spring 950 can be readily fixed.

Meanwhile, the projections 810 and 820 are hollow to be readily inserted into the fixing part 702 of the locking member 700, and a transition part between the projections 810 and 820 is chamfered such that the fixing part 702 can be readily inserted.

As shown in FIG. 44, an inner surface of the first projection 820 has three straight parts. The three straight parts are smoothly connected to each other to form a substantially triangular shape having curved corners, thereby preventing the first projection 820 of the cap 800 from being separately rotated or moved. At this time, a semi-circular groove 813 is formed at one of the inner straight parts such that the fixing part 702 can be readily assembled.

In addition, as shown in FIG. 46, a semi-circular hollow part may be formed in the cap 800' to conform to the fixing part 702'. At this time, a semi-circular groove 813' may be formed at an inner straight surface of the cap 800' such that the fixing part 702' can be readily inserted into the groove 813'.

In addition, a protrusion 814 protrudes outward from a portion of an outer periphery of the base 812.

Since the fixing part 702 or 702' can be assembled in a direction of the protrusion 814, it is possible to directly assemble the fixing part to the first projection to provide convenience to an assembly operator, thereby improving workability.

In addition, if the cap 800 is misassembled, the cap 800 can be readily separated using the protrusion 814.

In particular, if the protrusion 814 has a trapezoidal shape, the separation may be more readily performed.

As shown in FIGS. 47 to 50, the mechanism cover 900 includes a circular locking clutch assembly part 910 formed at an upper part thereof and into which the locking clutch 720 is inserted, and a vehicle sensor assembly part 920 formed at a lower side thereof and to which a vehicle sensor 930 is assembled.

A projection 911 projects from a center of the locking clutch assembly part 910 in a concentric manner. The projection 911 has a larger diameter than an upper periphery of the cap 800 such that the cap 800 can be assembled to the fixing part 702 of the locking member 700.

At this time, the friction spring 950 is inserted into the projection 911. In particular, a spring insert groove 915 may be formed around the projection 911 to securely fix the spring 950 thereto.

In addition, a hooking part 912 is formed at the locking clutch assembly part 910 in a concentric manner. The hooking part 912 has teeth formed along an inner periphery of the locking clutch assembly part 910, and has a smaller diameter than the locking clutch 720 such that a tip of the lock arm 730 is hooked by the hooking part 912.

A connection part 913 of the mechanism cover 900 has a gentle slope formed adjacent to an outer periphery of the mechanism cover 900 to form a shallow recess. Specifically, the outer surface of the mechanism cover 900 has a portion recessed inward around the projection 911.

In addition, a groove 914 is formed at a center of the outer surface of the locking clutch assembly part 910 to reduce the weight of the mechanism cover 900. The groove 914 has a larger diameter than the projection 911 disposed inside the locking clutch assembly part 910 to prevent shrinkage of the mechanism cover 900 due to increase in a resin thickness.

Meanwhile, the vehicle sensor assembly part 920 is connected to a lower side of the mechanism cover 900, and an extension part 940 is formed between one surface of the vehicle sensor assembly part 920 and the locking clutch 720 to more securely connect the vehicle sensor assembly part 920 and the locking clutch assembly part 910. In particular, the extension part 940 is parallelly formed at one side of the vehicle sensor assembly part 920 to increase connection strength between the locking clutch assembly part 910 and the vehicle sensor assembly part 920.

The mechanism cover 900 includes projection members 941 projecting outward from the mechanism cover 900 and having a plurality of assembly pins 942 for assembling the mechanism cover 900 to the housing 100. The assembly pins 942 are formed perpendicular to a surface of the extension part 940.

In particular, the assembly pins 942 are formed at corners of the extension part 940 to widen an assembly region (an area defined by connecting the assembly pins), thereby more securely assembling them.

The projection member 941 and the extension part 940 has a larger thickness than the locking clutch assembly part 910 to prevent damage and breakage of the mechanism cover upon separation due to misassembly.

The plurality of assembly pins 942 of the mechanism cover 900 are fixedly inserted into assembly holes formed in one side of the housing 100, the locking member 700 is inserted into the locking clutch assembly part 910, and the locking clutch 720 to which the lock arm 730 is assembled is mounted thereon.

At this time, the cap 800 fixed to the fixing part 702 of the locking member 700 supports the friction spring 950 assembled to the mechanism cover 900 to prevent the friction spring 950 from being separated therefrom due to movement, and so on.

Figure 51:
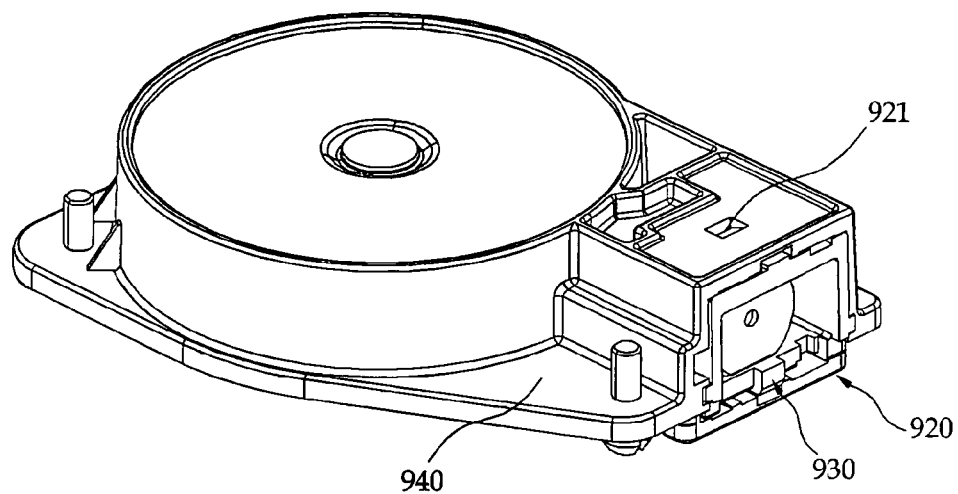
FIG. 51 is a perspective view of a cover structure of a seat belt retractor in accordance with the present invention.
Figure 52:
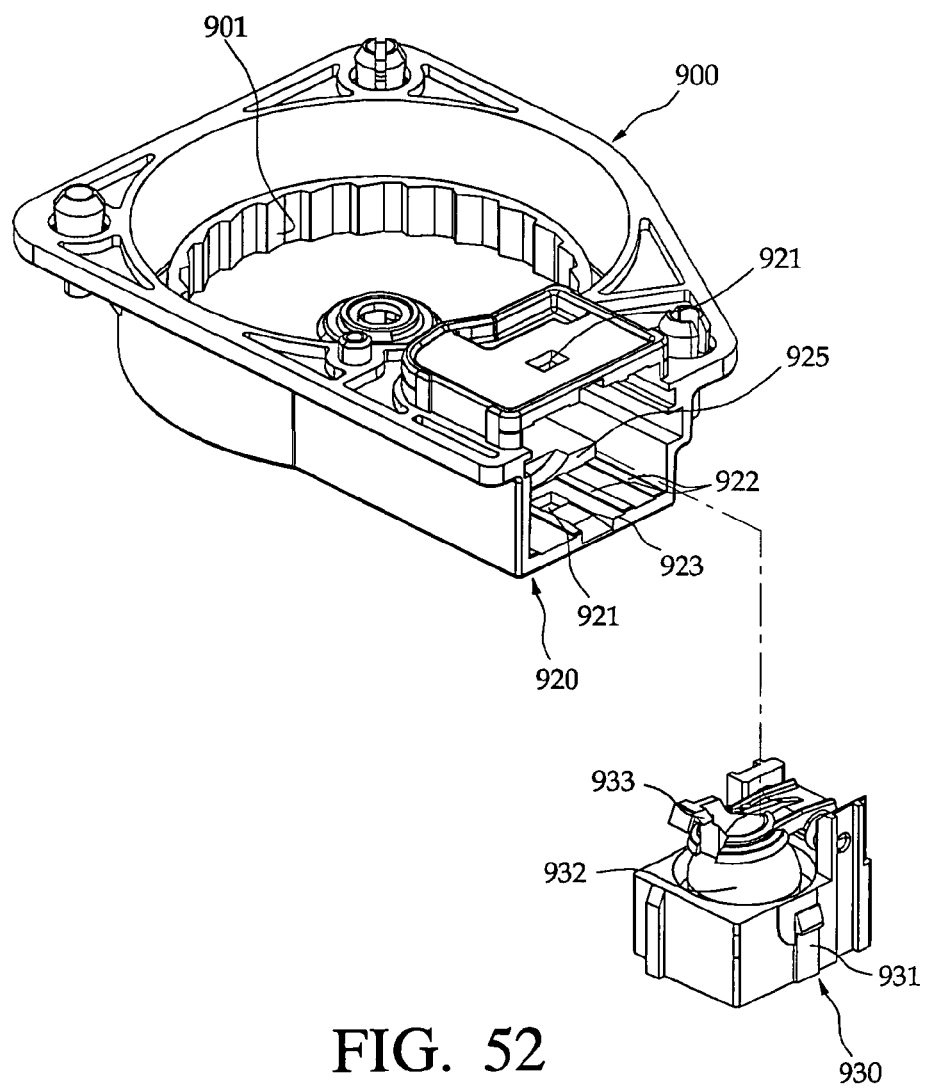
FIG. 52 is an exploded perspective view of the cover structure of the seat belt retractor in accordance with the present invention.

FIG. 51 is a perspective view of a cover structure of a seat belt retractor in accordance with the present invention, and FIG. 52 is an exploded perspective view of the cover structure of the seat belt retractor in accordance with the present invention.

As shown in FIGS. 51 and 52, the cover structure in accordance with the present invention includes a locking base for stopping operation of the seat belt retractor, a mechanism cover 900 coupled to one side surface of a locking member 700 constituted by a locking clutch and a lock arm, and a vehicle sensor 930 accommodated under the mechanism cover 900.

As shown in FIG. 51, the mechanism cover 900 includes a cylindrical part having a predetermined diameter and provided with one upper opened surface, and the other lower closed surface having a latch 910 having a smaller diameter than the cylindrical part. An accommodating part 920 is formed at a lower outer surface of the cylindrical part.

The mechanism cover 900 is installed at a position opposite to a leaf spring (not shown) installed at one side of the seat belt retractor. The locking member 700 is coupled to the interior of the mechanism cover 900 to be smoothly rotated when the webbing is naturally wound or released.

In addition, the locking member 700 includes the locking base 710 fixedly inserted into the guide drum 200 on which the webbing is wound, the locking clutch 720 coupled to one surface of the locking base 710 to be rotated to a predetermined angle, and the lock arm 730 coupled to one side of the locking clutch 720.

The locking member 700 is normally rotated with the webbing and the guide drum. Since the locking base 710 has a pawl coupled thereto and rotated by its rotation inertia, it is possible to prevent the webbing from being released or rewound by hooking the pawl 740 to the latch 910 depending on operation of the pawl 740 on vehicle impact.

In addition, the accommodating part 920 has a substantially hexagonal shape and includes a vehicle sensor 930 therein. The accommodating part 920 has an opened one surface, and upper and lower surfaces having fixing holes 921 opposite to each other. The fixing holes 921 may have a polygonal shape such as rectangular, pentagonal, hexagonal shapes, or any other shapes, without limitation.

Further, the accommodating part 920 has a guide 922 formed at an inner surface thereof and vertically projecting from the opened lower surface to the fixing holes 921, and a guide groove 923 formed between the guide 922 and the inner surface.

Furthermore, an extension part 940 is formed at an outer side of the accommodating part 920. The extension part 940 extends integrally with the mechanism cover 900 and the accommodating part 920 to maintain strength thereof, thereby preventing the accommodating part 920 from being bent or deformed.

The vehicle sensor 930 has a semi-spherical groove (not shown), and a fixing protrusion 931 protruding from an outer surface of the vehicle sensor 930, i.e., a position corresponding to the fixing hole 921. The fixing protrusion 931 has the same shape as the fixing hole 921 and inserted into the guide 922 and the guide groove 923 to facilitate assembly of the vehicle sensor 930.

In addition, a spherical ball 932 is disposed in the semi-spherical groove, and a hooking member 933 is formed over the vehicle sensor 930 to be operated depending on movement of the ball 932.

The hooking member 933 vertically or horizontally moves depending on movement of the ball 932 to be hooked by a latch 721 formed at an outer periphery of the locking clutch 720 of the locking member 700.

Meanwhile, as shown in FIG. 52, a threshold 925 is formed in the accommodating part 920 to project inward from the accommodating part 920. The threshold 925 may cause the vehicle sensor 930 to maintain a height lower than a lower surface of the accommodating part 920 with the threshold 925 being in contact with an upper surface of the vehicle sensor 930.

The threshold 925 drives the hooking part 933 projecting upward to be smoothly slid and inserted into the mechanism cover 900, when the vehicle sensor 930 is inserted.

If the hooking member 933 is not assembled in place, the hooking member 933, operated by movement of the ball 932, may be operated even when the hooking member 933 should not be operated, thereby making it impossible to release or rewind the webbing. In order to prevent this problem, the threshold 925 projects in place to be assembled to the vehicle sensor 930.

The cover structure in accordance with the present invention is assembled as follows. First, an operator grips the mechanism cover 900 with his/her one hand, grips the vehicle sensor 930 with the other hand, and disposes the fixing hole 921 and the fixing protrusion 931 in the same direction.

In this state, as shown in FIG. 51, the operator pushes the vehicle sensor 930 into the accommodating part 920 such that the fixing protrusion 931 of the vehicle sensor 930 can be slid along the guide 922 and the guide groove 923 and inserted into the fixing hole 921.

That is, the operator simply pushes the vehicle sensor 930 into the accommodating part 920 to complete assembly thereof.

Since the fixing protrusion 931 is fixedly inserted into the fixing hole 921, the assembled vehicle sensor 930 can stably maintain the assembled state without separation, even though a lower surface of the accommodating part 920 is opened.

In addition, since the accommodating part 920 and the mechanism cover 900 are integrally formed with each other by the extension part 940, it is possible to prevent the accommodating part 920 from being deformed.

As can be seen from the foregoing, a housing of a seat belt retractor in accordance with the present invention is configured to simplify its structure and reduce the total weight of the seat belt retractor. Therefore, its manufacturing process can be simplified to reduce the time taken to manufacture housing of said seat belt retractor. In addition, the housing can be closely adhered to a peripheral structure such as a cylinder to make it possible to securely fix the cylinder to the housing.

Further, the seat belt retractor can be securely fixed to a vehicle body, and components can be readily assembled to the housing.

Furthermore, a guide surface of a second fastening bar is sloped with respect to one surface of the first fastening bar such that a webbing can smoothly pass through the guide surface without any interference.

In addition, a simplified coupling structure of a connector coupling groove to which a connector is coupled provides convenient assembly performance to increase productivity.

Further, a predetermined size of recess is formed at a winding roller to reduce the total weight of the seat belt retractor and sufficiently receive larger rotational force and friction force.

Concavely curved interface parts are formed between an elastic piece and grip pieces to smoothly connect outer surfaces and inner surfaces of the elastic piece and the grip pieces, thereby preventing stress concentration due to dynamic behaviors such as rotation of a guide drum and a locking member and increasing durability thereof.

In addition, the elastic piece and the grip pieces have a specific feature to make it possible to securely fix the locking member to the guide drum, without forming a conventional reinforcement rib.

Further, it is possible to widely use the guide drum, regardless of existence of a fixing groove formed in a stopper coupling groove.

Furthermore, since a coupling structure of the guide drum and a torsion bar coupling pipe of a connector can be simplified, its assembly can be conveniently performed to improve productivity.

Since roller retainers into which clutch rollers are fixedly inserted are formed along a center inner diameter of a base member, and each roller retainer includes a second opening through which the clutch roller reciprocates and a first opening formed opposite to the second opening, it is possible to prevent separation of the hooking part outward even when the clutch roller is rotated by a gear member.

In particular, when seen from an axial direction, since the second opening is formed inside the center inner diameter, its assembly can be readily performed.

In addition, a curved projection formed at a surface of the connection part can readily support an axial load from a connector.

Further, since a support plate is formed at a flange around the center inner diameter and opposite to the connection part, it is possible to effectively suppress separation of the clutch roller toward the gear member.

Furthermore, since an extension rib is formed at a narrow part of the connection part around the inner center, it is possible to prevent breakage of the roller retainer and secure smooth rotation of the clutch roller.

Therefore, an operator can assemble the base member and the gear member while viewing them. Accordingly, assembling is very easy. Furthermore, the clutch rollers are stably fixed to the retainers so that they are separated. The clutch rollers rotate while moving outwardly along the slant surfaces of the slant gear to rotate the connector and rewind the webbing. Thus, shock applied to a passenger is lessened.

According to the present invention as constituted above, since a rack of a piston is hooked by a hooking means and then assembled, when an appropriate gap (or a marginal space) is formed between a sealing part and a lower end of the straight moving guide hole, a gas activity space can be enlarged.

Therefore, it is possible to secure marginal time for providing a sufficient upward force due to a temporary storage space for a gas introduced into the moving guide hole of the piston.

In addition, the conventional step in the moving guide hole can be removed to increase a pressure receiving area, thereby maintaining the sufficient upward force against the piston.

Further, a thick part is formed at an outer corner of a cylinder to maintain durability when a high pressure gas is injected.

Since a leaf spring can be conveniently assembled to return a lock arm installed at the locking clutch, an assembly time of the leaf spring is reduced to increase productivity. In addition, since the leaf spring has a curved part or a multi-state structure, it is possible to increase elasticity of the spring and prevent deformation of the spring.

In addition, the leaf spring has various shapes to be adapted to the locking clutch and the lock arm, even though shapes of the locking clutch and the lock arm are varied.

Further, it is possible to simplify components of an emergency locking mechanism for the seat belt retractor, thereby reducing manufacturing cost and readily performing an assembly process.

In addition, since weight of the lock arm can be reduced to maintain a resilient force of a spring for a long time and to prevent distortion breakage of a locking base interlocking with a torsion bar, lifespan of the product can be lengthened.

Since a torsion bar is rotatably supported by a bearing member and a cap, the torsion bar can be smoothly rotated by moment applied in an axial direction thereof. In addition, even though axial moment is applied, it is possible to absorb and attenuate position variation and deformation of the torsion bar. Further, contact resistance between a connector and a projection can be reduced when the torsion bar is rotated, and thus the torsion bar can be smoothly rotated.

In addition, a cap for a seat belt retractor can be readily attached to a locking member, and readily assembled thereto and disassembled therefrom.

Further, a mechanism cover of the seat belt retractor can readily stop operation of the lock arm when a webbing is wound.

Furthermore, the mechanism cover can be readily manufactured, and can be separated without any damage or breakage.

In addition, a vehicle sensor can be readily and conveniently assembled to the mechanism cover. Further, since an accommodating part is supported by an extension part, it is possible to prevent deformation of the accommodating part, despite prolonged use. Furthermore, an assembly time of the vehicle sensor can be reduced to increase productivity.

While this invention has been described with reference to exemplary embodiments thereof, it will be clear to those of ordinary skill in the art to which the invention pertains that various modifications may be made to the described embodiments without departing from the spirit and scope of the invention as defined in the appended claims and their equivalents.

What is claimed is:

1. A seat belt retractor comprising:
a housing constituting a main body of the seat belt retractor;
a guide drum rotatably installed in the housing;
a connector inserted into one side of the guide drum;
a base member surrounding the connector,
a gear member inserted into the base member,
a cylinder for operating the gear member,
a torsion bar inserted into the guide drum;
a locking member fixedly inserted between the torsion bar and the guide drum;
a locking clutch installed at one surface of the locking member;
a mechanism cover installed at one surface of the locking clutch; and
a spring installed between the mechanism cover and the locking clutch, the spring being a leaf spring, a lock arm attached to the locking clutch for rotational movement about a center of rotation of the lock arm, the spring having one end engaging to the locking clutch and another end engaging the lock arm, whereby the spring biases the lock arm into a position where an end of the lock arm is disengaged from a portion of the mechanism cover;
a plurality of cylindrical clutch rollers moveably connected to the base member, wherein the plurality of clutch rollers are configured to be moved outward by rotation of the gear member to be meshed with the connector;

wherein with respect to a center inner diameter, one surface of the base member is coupled to the gear member, and another surface of the base member is connected to the connector;

wherein the base member includes roller retainers into which the clutch rollers are inserted and maintained in a spaced apart relationship, and each of the roller retainers extending from a surface of a flange defining the center inner diameter of the base member, the roller retainers having a generally cylindrical hollow part with a first opening facing the center inner diameter of the base member and through which a portion of the clutch roller extends, the roller retainers having a second opening opposite the first opening and through which the clutch roller is inserted into the hollow part of the roller retainer, the second opening being larger than the first opening, and a connection part extending between the first and second openings and over the clutch roller.

2. The seat belt retractor according to claim 1, wherein the housing has a fixing part having an upper connection part and a lower connection part spaced apart from each other, and two side plates perpendicularly extending from both sides of the fixing part, wherein a connector insertion hole is formed at one of the two side plates to insert the connector, an assembly hole is formed under the connector insertion hole, an insertion hole is formed at one side of the other plate opposite to the side plate having the connector insertion hole, and a fixing hole and a bolt hole are formed at upper and lower parts of the lower connection part, respectively.

3. The seat belt retractor according to claim 2, wherein the fixing hole has a circular shape.

4. The seat belt retractor according to claim 2, wherein an empty space is defined between the upper and lower connection parts.

5. The seat belt refractor according to claim 2, wherein an upper part of the assembly hole is a stopper.

6. The seat belt retractor according to claim 2, wherein a vehicle sensor assembly part formed at a lower part of the mechanism cover is inserted into the insertion hole.

7. The seat belt retractor according to claim 1, wherein the guide drum has a winding roller having first, second and third fastening bars formed by two webbing through-holes, and flanges formed at both ends of the winding roller, wherein the second fastening bar has a guide surface sloped with respect to one surface of the first fastening bar and having a first webbing through-hole.

8. The seat belt retractor according to claim 7, wherein the sloped guide surface of the second fastening bar extends toward one surface of the first fastening bar and bent toward a corner of the first fastening part in a curved shape.

9. The seat belt retractor according to claim 8, wherein the curved shape is an arcuate shape.

10. The seat belt retractor according to claim 8, wherein a hexagonal connector coupling groove is formed at a center of an outer surface of the flange of the guide drum, and at least a pair of opposite coupling projection grooves are formed at an inner surface of the connector coupling groove.

11. The seat belt retractor according to claim 10, wherein the coupling projection groove has a semi-spherical shape.

12. The seat belt retractor according to claim 7, wherein a plurality of rectangular recesses are formed along an outer surface of each fastening bar, the recesses formed in the first fastening part have long sides disposed perpendicular to a longitudinal direction of the winding roller, and the recesses formed in the second and third fastening bars have long sides disposed in the same direction as the longitudinal direction of the winding roller.

13. The seat belt retractor according to claim 1, further comprising a base stopper having a "C"-shaped elastic piece, two grip pieces extending from the elastic piece and having arcuate inner surfaces, and support pieces extending from ends of the two grip pieces and having arcuate inner surfaces, to be coupled to the guide drum and the locking member, wherein concavely curved transition parts are formed between the elastic piece and the grip pieces, and the transition parts smoothly connect outer surfaces and inner surfaces of the elastic piece and the grip pieces.

14. The seat belt retractor according to claim 13, wherein the elastic piece has a web having an outwardly convex arcuate shape.

15. The seat belt retractor according to claim 13, wherein the elastic piece has the same width as the grip pieces.

16. The seat belt retractor according to claim 1, wherein the connector has a torsion bar coupling pipe coupled to the torsion bar, and a roller engagement part engaged with the plurality of clutch rollers, an internal gear is formed at a bottom and an inner periphery of the roller engagement part, the torsion bar coupling pipe is formed of a hollow hexagonal pipe, and at least one coupling projection is formed at an outer surface of the torsion bar coupling pipe.

17. The seat belt retractor according to claim 16, wherein the coupling projection is formed in a longitudinal direction of the torsion bar coupling pipe.

18. The seat belt retractor according to claim 17, wherein the coupling projection gradually thins down toward an opposite side of the roller engagement part.

19. The seat belt retractor according to claim 1, wherein the second opening is formed inside the center inner diameter, and the first opening is formed outside the center inner diameter.

20. The seat belt retractor according to claim 19, wherein when seen from an axial direction, the second opening and the first opening have arcuate shapes opposite to each other.

21. The seat belt retractor according to claim 20, wherein an extension rib is formed around the center inner diameter of the connection part.

22. The seat belt retractor according to claim 1, wherein the connection part has a semi-spherical projection formed on a surface thereof.

23. The seat belt retractor according to claim 1, wherein the gear member comprises a circular plate, a pinion gear projecting from one surface of the circular plate, and a slant gear projecting from the other surface of the circular plate.

24. The seat belt retractor according to claim 23, wherein the roller retainers extend from one surface of a center inner diameter thereof.

25. The seat belt retractor according to claim 24, wherein each of the roller retainers has:

the first opening through which an outer periphery of the clutch roller is meshed with the connector, the second opening through which the outer periphery of the clutch roller is in contact with the slant gear of the gear member, and the connection part connected between the first opening and the second opening to stably fix the clutch roller.

26. The seat belt retractor according to claim 25, wherein the gear member has a bearing fixing groove formed at its inner diameter, having a predetermined depth, and into which a bearing is inserted.

27. The seat belt retractor according to claim 1, further comprising:
a webbing wound on the torsion bar;
the gear member being connected to the torsion bar;
the torsion bar passing through the base member and with which the gear member is meshed;
the cylinder having a movement guide hole formed therein to supply a gas upon rapid deceleration of the vehicle;
a piston having a rack formed at a side surface thereof in a longitudinal direction to be meshed with the gear member and moved along the movement guide hole upon supply of a gas, and;
a cylindrical sealing operation part integrally formed with a bottom of the piston and projecting therefrom; and
a sealing part coupled to an outer periphery of the sealing operation part to seal between the piston and an inner wall of the cylinder,
wherein the base member has a hooking means for hooking a portion of the piston.

28. The seat belt retractor according to claim 27, wherein the sealing part is an O-ring.

29. The seat belt retractor according to claim 27, wherein the sealing part is a plastic coating part.

30. The seat belt retractor according to claim 27, wherein the hooking means is a position fixing piece having a shape meshed with the rack of the piston.

31. The seat belt retractor according to claim 30, wherein the base member has a guide piece disposed at a position opposite to the position fixing piece with the piston interposed therebetween, and has a surface parallel to the piston.

32. The seat belt refractor according to claim 31, wherein the cylinder has a guide cover fixed thereto to guide the piston.

33. The seat belt retractor according to claim 1, wherein one end of the spring is fixed to a center boss of the locking clutch, and another end is fixed to a fixing piece.

34. The seat belt retractor according to claim 1, wherein one end of the spring is fixed to a stopper formed at the locking clutch, and another end is fixed to a fixing piece.

35. The seat belt retractor according to claim 34, wherein the spring is a leaf spring.

36. The seat belt retractor according to claim 1 wherein the spring has an arcuate shape to be inserted into a boss disposed at a rotation center of the lock aim and extending toward both sides of the arcuate part.

37. The seat belt retractor according to claim 36, wherein the one end of the spring engaged to the lock arm is a free end rotated together with rotation of the lock arm.

38. The seat belt retractor according to claim 37, wherein the spring has a curved part formed at a middle part of the spring.

39. The seat belt retractor according to claim 38, wherein the spring has a multi-stage structure formed in a continuous manner.

40. The seat belt retractor according to claim 36, wherein the spring is a torsion spring.

41. The seat belt retractor according to claim 1 wherein a slit is straightly formed in a rotation center of the lock arm, and the spring is inserted into the slit and straightly fixed to one surface of the lock arm.

42. The seat belt retractor according to claim 41, wherein the bearing member and the cap are formed of a synthetic resin material.

43. The seat belt retractor according to claim 1, wherein the locking member includes the locking base which has a return spring insertion part and a pawl operation part, and a pawl is inserted into the pawl operation part,
the pawl includes a pawl main body and a link pin projecting from the pawl main body, and
the pawl main body is formed of a single curved surface.

44. The seat belt refractor according to claim 43, wherein a guide groove for inserting and guiding the pawl main body having a single curved surface is formed at the pawl operation part.

45. The seat belt retractor according to claim 44, wherein the locking base has a spoke reinforcement part integrally formed with the locking base.

46. The seat belt retractor according to claim 45, wherein the pawl main body has an outer diameter equal to or larger than an inner diameter of a guide groove formed at the pawl operation part.

47. The seat belt retractor according to claim 46, wherein the locking arm has two grooves formed at a front surface and a rear surface of the lock arm.

48. The seat belt retractor according to claim 47, wherein a spring hooking part is formed at the locking clutch part into which the lock arm is press fitted.

49. The seat belt retractor according to claim 48, wherein the spring hooking part has a "C" shape.

50. The seat belt retractor according to claim 1, further comprising a torsion bar support structure of the seat belt retractor including the housing constituting the main body of the seat belt refractor, the guide drum rotatably coupled to the housing, the torsion bar inserted into the guide drum, the base member fixed to one side of the housing, the locking member installed to the other side of the housing, and cylinder accommodating a piston therein to rotate a gear member fixed to the base member, and further comprising:
a bearing member coupled to an inner diameter part of the gear member,
wherein the locking member has a cover fixing shaft projecting from one end thereof and a cap is coupled to the end of the cover fixing shaft, and
one end of the torsion bar is supported by the bearing member and another end of the torsion bar is supported by the cap through the medium of the locking member.

51. The seat belt retractor according to claim 50, wherein the gear member is formed of a circular plate, and has a pinion gear projecting from one side surface of the circular plate and a slant gear projecting from the other side surface of the circular plate,
wherein the slant gear has a bearing insertion groove formed at its inner diameter and into which the bearing member is inserted.

52. The seat belt retractor according to claim 51, wherein the connector comprises an internal gear formed at an inner periphery of a roller engagement part to be meshed with a clutch roller moveably attached to the base member, and a torsion bar coupling pipe extending from one side of the roller engagement part to be fixed to the torsion bar.

53. The seat belt retractor according to claim 52, wherein the base member has a hooking part projecting from one surface of a flange formed around a center inner diameter thereof, and a projection projecting from a surface of the hooking part, and
a projection provided on an inner surface of the roller engagement part and contacting an inner surface of the connector to axially support the torsion bar.

54. The seat belt retractor according to claim 53, wherein the locking member comprises a locking base installed at one side of the guide drum, the locking clutch fixed to one side of the locking base, and the lock arm coupled to one side of the locking clutch, wherein the cover fixing shaft is formed at one side of the locking base.

55. The seat belt retractor according to claim 53, wherein the connector has a roller engagement part and a torsion bar coupling pipe extending toward one side of the roller engagement part to be fixed to the torsion bar, and the clutch rollers are meshed with an internal gear formed at an inner periphery of the roller engagement part.

56. The seat belt retractor according to claim 53, wherein the projection and the connector are in close contact with each other to support rotation moment applied to the torsion bar in its axial direction.

57. The seat belt retractor according to claim 53, wherein the bearing member and the cap are formed of a synthetic resin material.

58. The seat belt retractor according to claim 50, wherein the cap has an insertion groove into which the cover fixing shaft is inserted, and a first projection fixedly inserted into a groove formed at an inner center of a mechanism cover fixed to one side of the locking member.

59. The seat belt retractor according to claim 1, wherein the mechanism cover is assembled to one side of the housing, and has a locking clutch assembly part and a vehicle sensor assembly part.

60. The seat belt retractor according to claim 59, wherein a projection is formed at an inner center of the mechanism cover and a spring insert groove is formed around the projection.

61. The seat belt retractor according to claim 59, wherein an outer upper surface of the mechanism cover is inwardly recessed more than an outer periphery thereof.

62. The seat belt retractor according to claim 1, wherein the connector comprises an internal gear formed at an inner periphery of a roller engagement part to be meshed with a clutch roller fixed to the base member, and a torsion bar coupling pipe extending from one side of the roller engagement part to be fixed to the torsion bar, and
an inner surface of the guide drum is in contact with a coupling projection on the torsion bar coupling pipe.

63. A seat belt retractor comprising:
a housing constituting a main body of the seat belt retractor;
a guide drum rotatably installed in the housing;
a connector inserted into one side of the guide drum;
a base member surrounding the connector,
a gear member inserted into the base member,
a cylinder for operating the gear member,
a torsion bar inserted into the guide drum;
a locking member fixedly inserted between the torsion bar and the guide drum;
a locking clutch installed at one surface of the locking member;
a mechanism cover installed at one surface of the locking clutch; and
a spring installed between the mechanism cover and the locking clutch, the spring being a leaf spring, a lock arm attached to the locking clutch for rotational movement about a center of rotation of the lock arm, the spring having one end engaging to the locking clutch and another end engaging the lock arm, whereby the spring biases the lock arm into a position where an end of the lock arm is disengaged from a portion of the mechanism cover,
a locking base fixedly inserted into the locking member, and
a cap having a groove coupled to a fixing part of the locking member, and a first projection,
wherein a second projection has a circular shape, projects from one surface of the locking base, is disposed between the locking base and the first projection in a concentric manner, and projects in the same direction as the first projection;
wherein with respect to a center inner diameter, one surface of the base member is coupled to the gear member, and another surface of the base member is connected to the connector;
wherein the base member includes roller retainers with a generally cylindrical hollow part into which cylindrical clutch rollers are inserted and maintained in a spaced apart relationship, and each of the roller retainers extending from a surface of a flange formed around the center inner diameter of the base member and having a first opening facing the center inner diameter and through which a portion of the clutch roller extends, the roller retainers having a second opening opposite the first opening and through which the clutch roller is inserted into the cylindrical hollow part of the roller retainer, the second opening being larger than the first opening, and a connection part extending between the first and second openings and over the clutch roller.

64. The seat belt retractor according to claim 63, wherein inner surfaces of transition parts between the base member and the second projection and between the second projection and the first projection are chamfered.

65. The seat belt retractor according to claim 63, wherein a protrusion radially protrudes from one side of an outer periphery of the base.

66. The seat belt retractor according to claim 65, wherein the protrusion has a trapezoidal shape.

67. The seat belt retractor according to claim 65, wherein the first projection has at least one straight part having an inner groove, and the straight parts are smoothly connected by curved parts.

68. The seat belt retractor according to claim 65, wherein the first projection has a semi-circular inner groove with a straight part.

69. A seat belt retractor comprising:
a housing constituting a main body of the seat belt retractor;
a guide drum rotatably installed in the housing;
a connector inserted into one side of the guide drum;
a base member surrounding the connector,
a gear member inserted into the base member,
a cylinder for operating the gear member,
a torsion bar inserted into the guide drum;
a locking member fixedly inserted between the torsion bar and the guide drum;
a locking clutch installed at one surface of the locking member;
a mechanism cover installed at one surface of the locking clutch; and
a spring installed between the mechanism cover and the locking clutch, the spring being a leaf spring, a lock arm attached to the locking clutch for rotational movement about a center of rotation of the lock arm, the spring having one end engaging to the locking clutch and another end engaging the lock arm, whereby the spring biases the lock arm into a position where an end of the lock arm is disengaged from a portion of the mechanism cover,
further comprising a vehicle sensor, and a mechanism cover accommodating the vehicle sensor,
an accommodating part formed at a lower part of the mechanism cover and having one open surface in which the vehicle sensor is accommodated, fixing holes formed in upper and lower side surfaces of the accommodating part, and a fixing protrusion protruding from an outer surface of the vehicle sensor and coupled to the fixing hole, wherein the vehicle sensor is inserted into the accommodating part and fixed thereto, wherein with respect to a center inner diameter, one surface of the base member is coupled to the gear member, and another surface of the base member is connected to the connector;

wherein the base member includes roller retainers with a generally cylindrical hollow part into which cylindrical clutch rollers are inserted and maintained in a spaced apart relationship, and each of the roller retainers extending from a surface of a flange formed around the center inner diameter of the base member and having a first opening facing the center inner diameter and through which a portion of the clutch roller extends, the roller retainers having a second opening opposite the first opening and through which the clutch roller is inserted into cylindrical hollow part of the roller retainer, the second opening being larger than the first, and a connection part extending between the first and second openings and over the clutch roller.

70. The seat belt retractor according to claim 69, wherein a threshold projects inward in the accommodating part.

71. The seat belt retractor according to claim 70, wherein a guide groove is formed in an inner surface of the accommodating part from the fixing hole to a lower surface thereof; and a guide projects inward from the accommodating part with the guide groove interposed therebetween.

72. The seat belt retractor according to claim 69, wherein a guide groove is formed in an inner surface of the accommodating part from the fixing hole to a lower surface thereof, and a guide projects inward from the accommodating part with the guide groove interposed therebetween.

73. The seat belt retractor according to claim 72, wherein an extension part is formed at a portion of a side surface of the mechanism cover and one side of the accommodating part.

* * * * *

UNITED STATES PATENT AND TRADEMARK OFFICE
CERTIFICATE OF CORRECTION

PATENT NO. : 8,646,717 B2  
APPLICATION NO. : 12/152640  
DATED : February 11, 2014  
INVENTOR(S) : In-Su Choi et al.

Page 1 of 1

It is certified that error appears in the above-identified patent and that said Letters Patent is hereby corrected as shown below:

<u>In the Claims</u>

Column 35, line 38 (Claim 5, line 1) after "belt" delete "refractor" and insert --retractor--.

Column 37, line 32 (Claim 32, line 1) after "belt" delete "refractor" and insert --retractor--.

Column 38, line 4 (Claim 44, line 1) after "belt" delete "refractor" and insert --retractor--.

Column 38, line 26 (Claim 50, line 4) after "belt" delete "refractor" and insert --retractor--.

Signed and Sealed this  
Twentieth Day of May, 2014

Michelle K. Lee  
*Deputy Director of the United States Patent and Trademark Office*